US005598794A

United States Patent [19]
Harms et al.

[11] Patent Number: 5,598,794
[45] Date of Patent: Feb. 4, 1997

[54] HIGH ACCURACY AUTOMATICALLY CONTROLLED VARIABLE LINEAR SEED SPACING PLANTING APPARATUS

[75] Inventors: Louis C. Harms, Evanston, Ill.; Richard Rosenbrock, Bluffton, Ind.

[73] Assignee: Fluid Power Industries, Inc., Lincolnshire, Ill.

[21] Appl. No.: 388,214

[22] Filed: Feb. 13, 1995

[51] Int. Cl.⁶ .................................................. G06F 15/20
[52] U.S. Cl. .................. 111/177; 111/200; 111/903; 111/904; 111/922; 364/424.07
[58] Field of Search .................. 111/200, 177, 111/178, 903, 904, 921, 922; 364/424.07

[56] References Cited

U.S. PATENT DOCUMENTS

| | | | |
|---|---|---|---|
| 3,723,989 | 3/1973 | Fathauer et al. | 340/259 |
| 3,776,642 | 12/1973 | Anson et al. | 356/188 |
| 3,828,173 | 8/1974 | Knepler | 235/151.35 |
| 3,855,953 | 12/1974 | Fathauer et al. | 111/1 |
| 3,912,121 | 10/1975 | Steffen | 221/13 |
| 3,927,400 | 12/1975 | Knepler | 340/276 |
| 3,928,751 | 12/1975 | Fathauer | 235/92 |
| 3,974,377 | 8/1976 | Steffen | 250/222 R |
| 4,009,799 | 3/1977 | Fathauer | 221/3 |
| 4,023,020 | 5/1977 | Lestradet | 364/424.07 |
| 4,085,862 | 4/1978 | Steffen | 221/8 |
| 4,122,974 | 10/1978 | Harbert et al. | 221/13 |
| 4,149,163 | 4/1979 | Fathauer | 340/684 |
| 4,163,507 | 8/1979 | Bell | 221/2 |
| 4,225,930 | 9/1980 | Steffen | 364/555 |
| 4,239,010 | 12/1980 | Amburn | 111/1 |
| 4,246,469 | 1/1981 | Merlo | 235/92 PK |
| 4,253,766 | 3/1981 | Funk | 356/418 |
| 4,277,833 | 7/1981 | Steffen | 364/555 |
| 4,333,096 | 6/1982 | Jenkins et al. | 340/684 |
| 4,369,895 | 1/1983 | McCarty et al. | 221/3 |
| 4,401,909 | 8/1983 | Gorsek | 310/323 |
| 4,419,654 | 12/1983 | Funk | 340/52 |
| 4,491,241 | 1/1985 | Knepler et al. | 221/3 |
| 4,523,280 | 6/1985 | Bachman | 364/424 |
| 4,555,624 | 11/1985 | Steffen | 250/223 R |
| 4,630,733 | 12/1986 | Orlip . | |
| 4,782,282 | 11/1988 | Bachman | 324/61 R |
| 4,803,626 | 2/1989 | Bachman et al. | 364/424.07 |
| 4,924,418 | 5/1990 | Bachman et al. | 364/550 |
| 4,928,607 | 5/1990 | Luigi | 111/185 |
| 5,025,951 | 6/1991 | Hook et al. | 221/13 |
| 5,220,876 | 6/1993 | Monson et al. | 111/903 X |
| 5,260,875 | 11/1993 | Tofte et al. | 364/424.07 |
| 5,323,721 | 6/1994 | Tofte et al. | 111/200 |

FOREIGN PATENT DOCUMENTS

| | | | |
|---|---|---|---|
| 103169 | 6/1984 | Japan | 364/424.07 |
| 98405 | 5/1987 | Japan | 364/424.07 |

Primary Examiner—Terry Lee Melius
Assistant Examiner—Christopher J. Novosad
Attorney, Agent, or Firm—Roper & Quigg

[57] ABSTRACT

A control system for a mobile planting apparatus which permits discrete plant spacing to be determined and maintained independent of any wheel rotation on the planting apparatus or towing apparatus is disclosed, having: (1) a ground speed sensor wherein the rate of movement relative to the ground is determined independent of wheel rotation of the planting apparatus or towing apparatus; (2) an input/display device for inputting desired linear plant spacing; (3) a variable speed motor for mechanically driving seed metering devices on the planting apparatus at varying rates independent of any wheel rotation of the planting apparatus or towing apparatus, wherein the motor changes speeds in response to an electronic signal; (4) a programmable control circuit communicating electronically with the input/display device and ground speed sensor, wherein the programmable control circuit: (a) determines the number of seeds to be dispensed per linear unit of distance traveled based upon the desired spacing received from the input/display device; (b) determines the number of linear units of distance traveled based upon electronic signals from the ground speed sensor; and (c) determines the rate at which the variable speed motor should operate in order to dispense seeds to achieve the desired linear plant spacing, and sends an electronic signal to the variable speed motor to cause the motor to operate at the rate necessary to cause the seed metering devices to dispense seeds so as to achieve the desired linear plant spacing.

25 Claims, 22 Drawing Sheets

EVENT DRIVEN BACKGROUND TASKS (INTERRUPTS)

HIGH ACCURACY AUTOMATICALLY CONTROLLED VARIABLE LINEAR SEED SPACING PLANTING APPARATUS

BACKGROUND OF THE INVENTION

This invention relates generally to a planting apparatus, and more particularly to a planting apparatus wherein the preselected linear seed or plant spacing in the growing medium (hereinafter the "field") is adjustable while the planting apparatus is in motion, and is accurately determined and delivered to the field irrespective of any wheel slippage or sliding by the planting apparatus that ordinarily occurs in planting operations.

Farming is a highly labor intensive and cost driven activity, and the farming industry is constantly striving to decrease farm labor, decrease related farm costs, and increase farm yields (often measured on a yield per area, such as on a yield per acre basis). As a consequence, present day farming techniques employ, among other things, the automated planting or transplanting (collectively "planting") of crops.

Present day automated planting is ordinarily accomplished by having a moving vehicle (hereinafter "tractor") pull a planting apparatus having one or more seed or plant dispensing devices (collectively "seed dispensers") across a field. The seed dispensers are often arranged in one or more rows on the frame of the planting apparatus, and the rows on the frame are oriented transversely to the direction of travel by the tractor. The seed dispensers are ordinarily arranged at distances corresponding to the width of furrows in the portion field to be planted by the planting apparatus.

The rate at which seeds or plants (collectively "seeds") are dispensed by the seed dispensers is generally determined by a drive mechanism which operates a seed metering apparatus, such as a rotating seed dispensing disc, which has a discrete number of holes or pockets ("holes") which in turn dispense a discrete number of seeds per revolution of the drive mechanism or seed metering device. The drive mechanism, in turn, typically is rotatably connected to a free-rolling wheel, for example, via a power transmission system such as gears, chains and sprockets, or pulleys. The free-rolling wheel is typically mounted on an axle connected to the frame of the planting apparatus on which the seed dispensers are mounted. Other means of directly or indirectly driving a seed metering device directly or indirectly off of a free-rolling wheel are known in the art as well, and will not be discussed herein in detail.

The rate at which seeds are dispensed may be and often is determined by manually adjusting the drive mechanism connection (such as a gear or chain and sprocket ratio adjustment), which in turn determines the rate of revolution of the drive mechanism, and, as a result, the seed dispensing disc, per revolution of the free-rolling wheel. By manually adjusting the drive mechanism connection, the operator can determine the number of seeds to be delivered per linear distance travelled by the planting apparatus, assuming a substantially pure rolling motion (i.e., absolutely no slippage or sliding) by the free-rolling wheel of the planting apparatus.

In order to economically obtain the maximum crop yield per acre while minimizing costs from, for example, seed waste from planting more seeds than a particular portion of the field will have nutrients to support, the operator of the planting apparatus (hereinafter "farmer") must be able to accurately control and accurately adjust (preferably while the planting apparatus is in motion) the number of seeds planted per linear distance of travel by the planting apparatus.

It has been determined that different portions of a field being planted by a farmer may vary widely in ability to supply nutrients to support a crop; i.e., a farmer's field may have a wide spectrum of high yield, medium yield, and low yield areas scattered throughout the acreage to be farmed. Ideally, a farmer would like to accurately plant seeds closer together linearly in a high yield area, and farther apart linearly in a low yield area, and to be able to do so without stopping the planting apparatus and, e.g., dismantling and readjusting the drive mechanism each time the planting apparatus travels from high to medium to low yield areas of a particular field. Because of the farmer's inability with many prior art planting devices to accurately vary linear seed spacing without the time-consuming and labor intensive practice of stopping and adjusting, e.g., the drive mechanism for the seed dispensers, farmers often set the linear plant spacing at a predetermined constant rate (sometimes referred to as an "average rate") for the field. This practice resulted in (1) lower than optimum crop yield in high yield areas of the field due to underplanting, or (2) overplanting (resulting in seed waste) in low yield areas of the field, or (3) both. These outcomes had adverse economic impacts on the farmer.

In order to optimize crop yield by accurately dispensing seeds at predetermined linear spacings, a farmer would prefer to be able to accurately control the distance between seeds. For example, when planting corn, farmers may prefer the nominal linear distance between seeds in a medium yield portion of the field to be 8.0 inches, in high yield portions to be 6.0 inches, and in low yield portions to be 12.0 inches. The farmer might prefer a wide spectrum of other spacings to be available as well, depending upon, among other things, soil conditions. Consequently, a farmer would prefer to be able to accurately control nominal linear seed spacing within increments of 0.125 inches or less in such applications. The nominal spacing and increments may, of course, vary, depending upon, among other things, the crop.

Prior art automated planting apparatus in which the seed dispensing rate depended upon a drive mechanism coupled to a free-rolling wheel of the planting apparatus lacked the ability to control linear seed spacing with the accuracy desired. This is due, in part, to the fact that in ordinary farming conditions the free-rolling wheel connected to the drive mechanism of the planting apparatus does not operate with a pure rolling motion, and unless the free-rolling wheel connected to the drive mechanism purely rolls, seeds are dispensed at a rate that will not accurately and consistently achieve the desired spacing per linear distance travelled by the planting apparatus.

For example, in the crumbling topsoil typically encountered in many farming applications, the free-rolling wheel of the planting apparatus pulled by the tractor may slide intermittently and at unpredictable intervals. When the wheel slides instead of rolls, the rotating drive mechanism connected to the aforesaid wheel which operates the seed dispenser will not drive the seed dispenser (or will drive it at a slower rate than if it were purely rolling) which results in less seeds being dispensed than desired per linear distance travelled by the planting apparatus. This is because the planting apparatus may travel forward despite the non-rotation of the free-rolling wheel as a result of the sliding mode of travel. Similarly, as the free-rolling wheel encounters crumbling topsoil beneath it, the wheel may over-rotate, or slip (i.e., although the wheel rotates, the planting apparatus does not move relative to the ground, similar to an automobile spinning its wheels in the snow), resulting in the seed dispenser dispensing seeds at a rate greater than that desired per linear distance travelled by the planting apparatus.

SUMMARY OF THE INVENTION

Accordingly, it is an object of this invention to provide a new and improved planting apparatus that enables a farmer to accurately preselect and adjust linear seed spacing to be delivered to the field without the need to stop or manually adjust the drive mechanism connection to the seed dispensers.

Another object of this invention is to provide a planting apparatus that dispenses seeds at a rate determined independently of wheel rotation of the planting apparatus or the tractor, thus alleviating any inaccuracies in linear seed spacing inherent in prior art systems as a result of wheel sliding or slippage.

Another object of the invention is to provide a planting apparatus with a speed or distance sensing device that is highly accurate as compared to those previously available in the art, as a result of the combination of a low-speed Doppler effect radar unit and a signal conditioning circuit which "locks" on desired signals and filters out unwanted signals that ordinarily limit the accuracy of low-speed Doppler effect radars in low speed applications.

Still another object of this invention is to provide a readily operable planting apparatus wherein linear seed spacing can be controlled and monitored during operation from a remote location, such as from the seat or cab of a tractor, via a display unit without resort to manual manipulation of the seed dispensers, the drive mechanism, the gearing for the drive mechanism, or other related components for the planting apparatus.

Yet another object of the invention is to provide a new and improved planting apparatus that has the capability of accurately controlling or regulating linear seed spacing to within 0.125 inches or less in appropriate applications.

A further object of this invention is to provide a new and improved planting apparatus which achieves the foregoing and other objects readily discernable to one skilled in the art, and which is readily operable, efficient, and reliable in operation from the farmer's standpoint.

The present invention alleviates problems associated with prior art planting apparatus by, among other things, determining linear seed spacing independently of the rotation of the free-rolling wheel of the planting apparatus. The invention does so by, other things, (1) accurately determining the speed or distance of travel of the planting apparatus relative to the field independently of the rotational speed of the aforesaid wheel; and (2) utilizing a drive mechanism for the seed metering devices within the seed dispenser which is operable independent of the rotational speed of the aforesaid wheel. In the embodiment of the invention described herein (1) the speed of the planting apparatus relative to the field is determined by a low speed capability Doppler effect radar unit (hereinafter "low speed radar") such as that manufactured by Entra Corporation, model number LR100 (or other devices that similarly are capable of sensing vehicle speed or distance travelled relative to the ground, independent of wheel rotation) coupled with a signal conditioning circuit that filters out unwanted signals so as to provide a highly accurate low speed sensitive radar signal; and (2) the driving mechanism for the seed metering device of the seed dispensers is a highly responsive proportionally controlled hydraulic motor circuit that is further controlled and monitored by a feedback mechanism via a programmable control circuit device.

In general terms, the rate of speed or distance travelled is accurately determined by the low speed radar and signal conditioning circuit, and is fed into a programmable control circuit (hereinafter "microprocessor") together with the desired linear seed spacing as selected by the farmer and as ordinarily input by the farmer through an input mechanism such as a display unit located remotely from the planting apparatus, for example, in the vicinity of the cab of the tractor. Those inputs are used by the microprocessor to determine (despite the changing ground speed of the planting apparatus) the desired rate of flow of hydraulic fluid to the hydraulic motor (which, in turn, determines the desired hydraulic motor speed) which, in turn, operates the seed metering devices in the seed dispensers at the appropriate rate so as to dispense seeds at highly precise and consistent intervals heretofore unattainable in prior art devices, all independent of any sliding and slippage that the wheels of the planting apparatus or tractor encounter in the field.

An active speed sensor monitors the rate of operation of the hydraulic motor (or other elements of the device operatively engaged to rotate therewith) and provides that information to the microprocessor which determines whether there is any deviation from the desired rate of operation. If so, the microprocessor sends the appropriate signal to the hydraulic proportional valve to adjust the amount of hydraulic fluid therethrough, and thus refines the speed of the hydraulic motor accordingly.

The linear seed spacing can be varied by the farmer without stopping the planting operation and adjusting, e.g., the drive mechanism, or other mechanical features of the planting apparatus. The farmer may simply input the new desired seed spacing via the display unit and, because of the combined quick response and calculation rate of the microprocessor, the proportional hydraulic valve, the hydraulic motor, and the radar, the resulting spacing of the seeds is changed quickly "on the fly," a highly desirable result.

DETAILED DESCRIPTION OF THE ILLUSTRATED EMBODIMENTS

Figure 1:
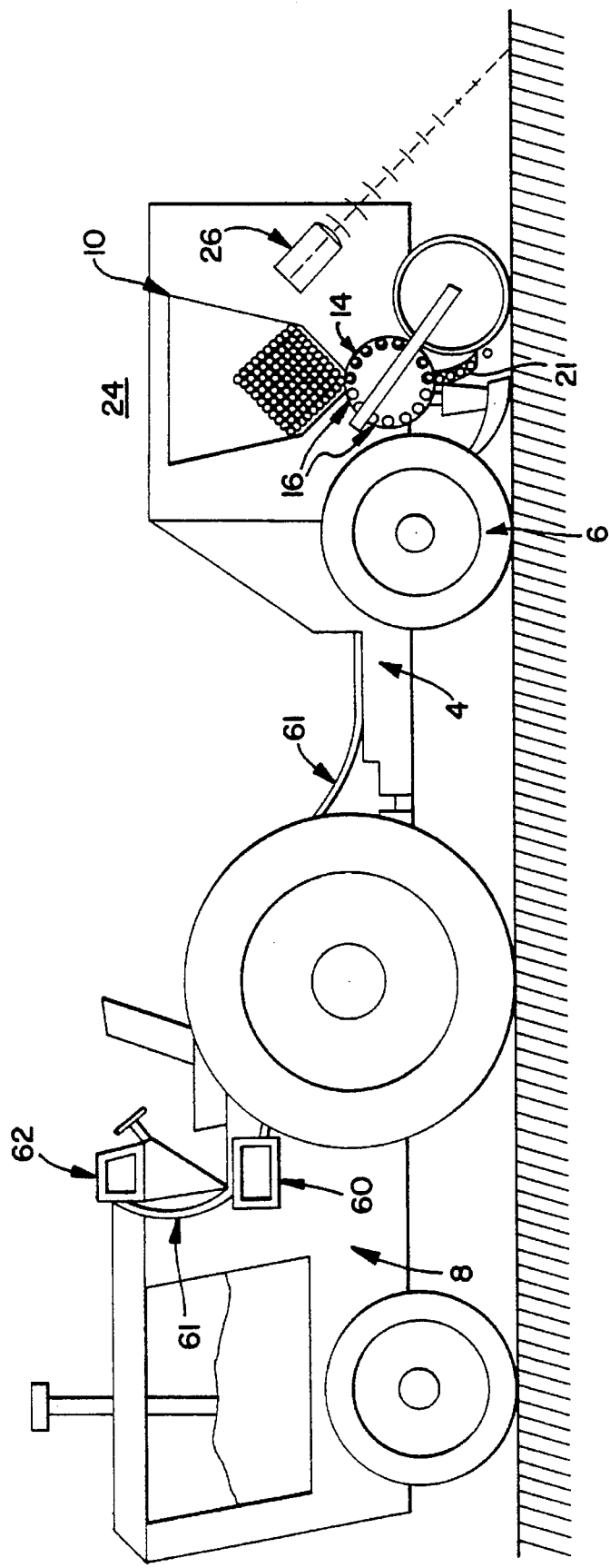
FIG. 1 is a side view of a tractor coupled to the planting apparatus, including a partial cutaway view of the planting apparatus of the described embodiment.
Figure 2:
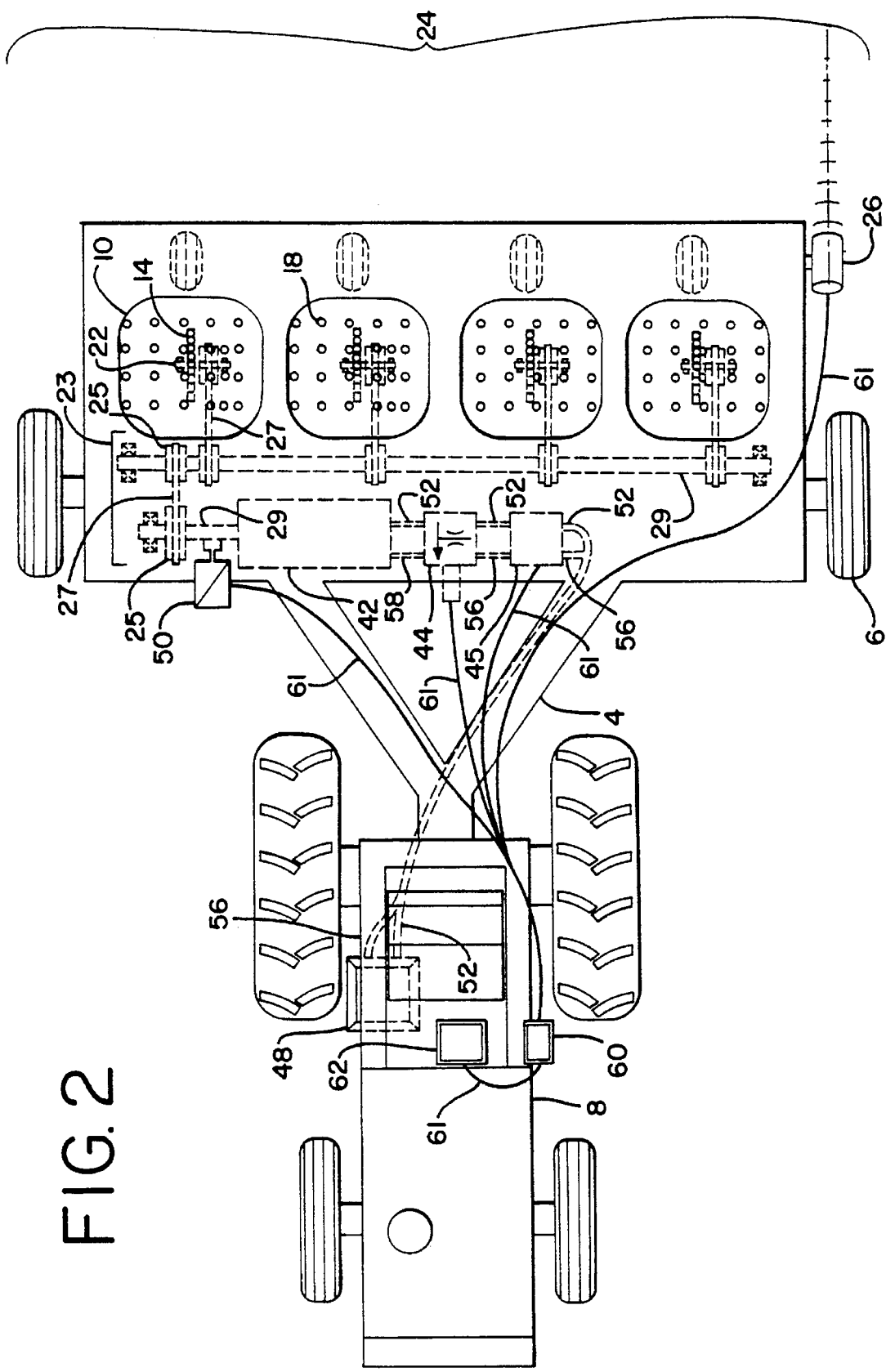
FIG. 2 is a top view of a tractor coupled to the planting apparatus of the described embodiment.
Figure 3:
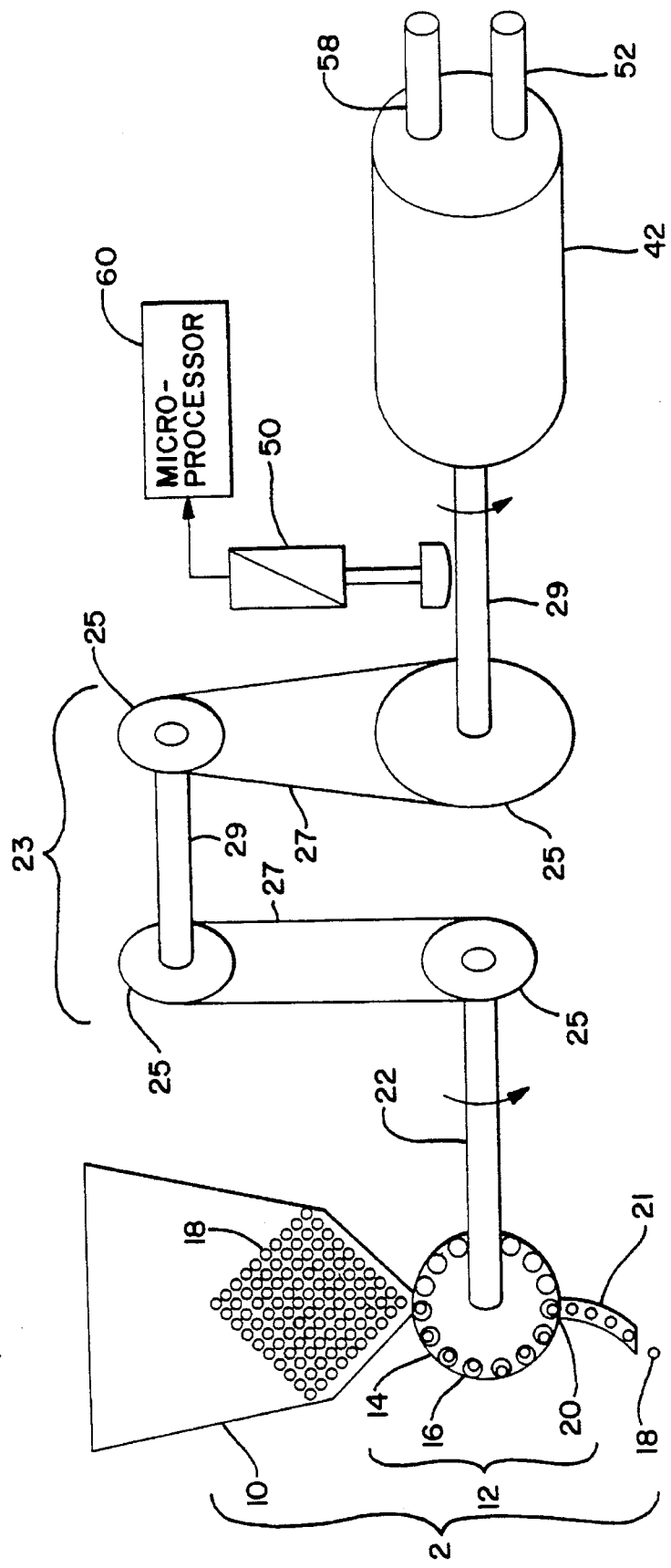
FIG. 3 is an exploded view of a portion of the planting apparatus, including the hydraulic motor, an active speed sensor, a single transmission, and a single seed dispenser, including a partial cutaway view of the seed dispenser of the described embodiment.

Referring generally throughout to the Figures, and specifically here to FIGS. 1, 2, and 3, the planting apparatus 24 includes one or more seed dispensers 2 that are located on a frame 4 which, in turn, is typically mounted on free-rolling wheels 6, but can be mounted on any other known means of transporting such frames, for example, on skids (not illustrated). The frame is ordinarily pulled or pushed by a vehicle, typically pulled by a tractor 8. The seed dispensers may be of various known constructions and need not be described in detail. Those skilled in the art will recognize that various seed dispensers may be used in conjunction with the invention without departing from the teachings of the invention.

One common seed dispenser design includes a seed hopper 10, and includes seed metering devices 12 capable of dispensing seeds intermittently. For example, a seed metering device 12 may be a typical device wherein a plurality of seeds 18 are gravity-fed or vacuum-fed into a rotating disc 14 with one or more evenly-spaced holes 16, which are larger than the seed 18 to be planted and which are capable of capturing gravity-fed or vacuum-fed seeds 18, which are then released to the field below when the rotating disc rotates to a position wherein the hole 16 in the disc 14 holding an individual seed 18 aligns itself with the release point 20 above the seed chute 21 of the seed dispenser 2. Thus, it will be recognized that the rate at which seeds are dispensed to the ground below in this exemplary seed dispenser can be adjusted by regulating among other things, the number of holes in the rotating disc 14, or the rotational speed of the disc in the seed metering device 12, or both. Seed monitoring devices or seed counting devices of known construction (not illustrated) may be included in the seed dispensers to detect, for example, jamming of or other malfunctions of the seed dispensers, or to further monitor seed dispensing.

Figure 4:
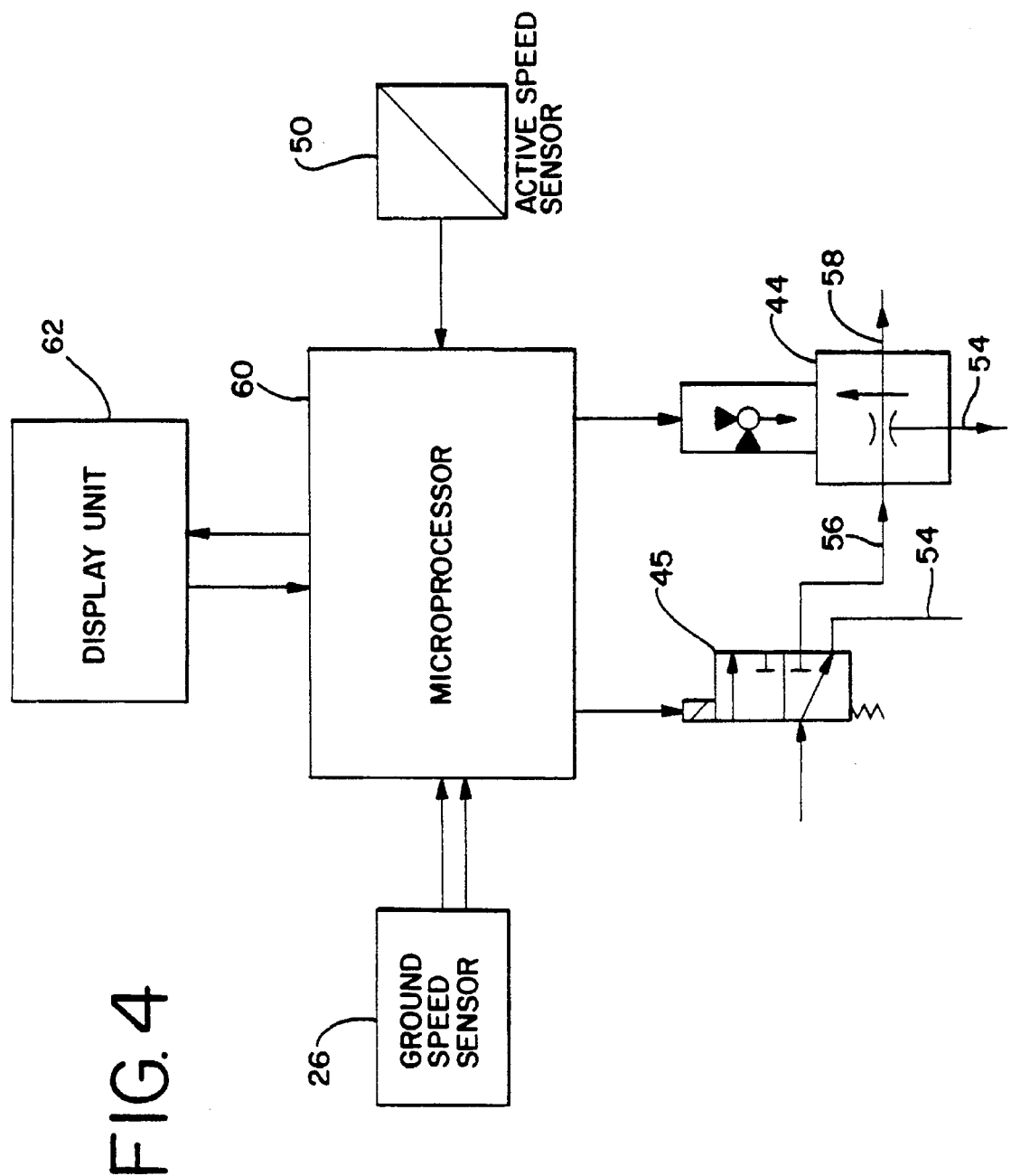
FIG. 4 is a block diagram of the major electrical components of the planting apparatus, illustrating their electrical communication with each other and with the hydraulic safety valve and hydraulic proportional valve, including a partial schematic view of the hydraulic circuit for the described embodiment.
Figure 5:
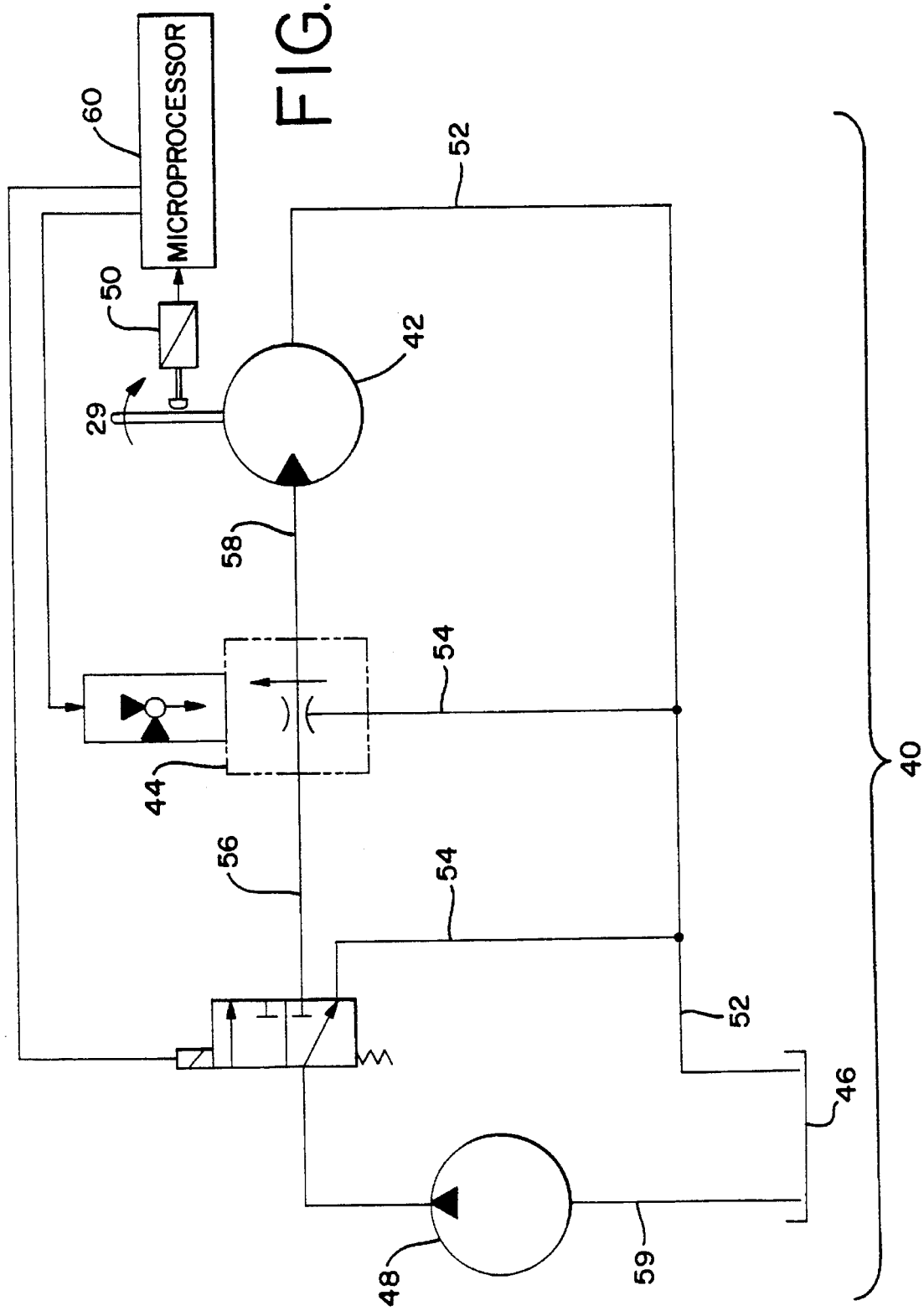
FIG. 5 is a schematic diagram of the hydraulic motor circuit, including the electrical communication between elements of the hydraulic motor circuit and the microprocessor for the described embodiment.

Referring to FIGS. 2, 3, 4, in the described example of one embodiment of the invention, the operating rate of the seed metering devices of the seed dispensers, e.g., the speed of rotation of the discs, may be regulated by a proportionally controlled hydraulic motor 42. While other proportionally controlled motors operable at the direction a microprocessor 60 may be used, the inventors have determined at this time that the relative simplicity, reliability, and quick reaction or response time of a proportionally controlled hydraulic motor 42 having a fast-reacting and accurately controlled hydraulic proportional valve 44 make such a motor and hydraulic motor circuit 40 a desirable choice. In the described embodiment, the hydraulic motor may be a motor such as the R-series motor manufactured by the Char-Lyn division of Eaton Corporation.

A proportionally controlled hydraulic motor circuit 40 useful in carrying out the invention is described below. A hydraulic motor 42 is connected directly or indirectly (e.g., via gears, chain and sprockets, pulleys, or other known power transmission linkages) to the seed metering devices 12 via, for example, a rotatable shaft 22, with the linear rate of dispensing the seeds 18 per unit of distance travelled being a function, in part, of the speed of rotation of the shaft 22 and the number of holes 16 in the rotating discs 14. The rotational speed of the shaft 22 is, in turn, a function of the rotational speed of the hydraulic motor 42. In the illustrated embodiment, the rotational motion of the hydraulic motor 42 is transmitted to the rotatable shaft 22 through a transmission device 23 including a series of shafts 29, sprockets 25, and chains 27 in a manner known to those skilled in the art such that rotation of the hydraulic motor 42 will cause a corresponding rotation at a determinate rate in the rotatable shaft 22 and the rotating disc 14.

The hydraulic motor 42 is connected hydraulically to a fast-reacting and accurately controlled hydraulic proportional valve 44, for example, a hydraulic proportional valve such as the valve sold by Fluid Power Industries as model number 8352105, or as described in U.S. Pat. No. 4,121,610. Such a hydraulic proportional valve 44 is capable of adjusting the rate of flow of hydraulic fluid therethrough very quickly (on the order of 0.150 seconds, or less) in response to an electrical signal; i.e., the proportional valve 44 will quickly adjust to allow more or less hydraulic fluid to pass through to the hydraulic motor in response to an electrical signal. The electrical signal input to the proportional hydraulic valve is received from the microprocessor 60, through electrical lines 61, as will be discussed further herein.

A quantity of hydraulic fluid is supplied to the hydraulic proportional valve 44 via a supply circuit 56. The hydraulic proportional valve 44 determines, depending on the electrical signal arriving from the microprocessor 60 via electrical lines 61 (which proportionally opens or closes the hydraulic proportional valve 44), the amount of hydraulic fluid that will pass therethrough via the operating circuit 58 to the hydraulic motor 42. The rotational speed at which the hydraulic motor 42 operates (which, in turn, helps to determine the rate of dispensing seed) is a function of the amount of flow of hydraulic fluid through the hydraulic motor 42, as determined by the proportional valve 44. After hydraulic fluid passes through the hydraulic motor 42, the hydraulic fluid in the described embodiment flows through a return circuit 52, and may pass to a reservoir 46. Similarly, hydraulic fluid that is not allowed to pass through the proportional valve 44 to the hydraulic motor 42 may be diverted through a diversion circuit 54 to the return circuit 52, and may pass to the reservoir 46. A hydraulic pump 48 is connected hydraulically to pump hydraulic fluid between the reservoir 46 and the proportional valve 44, and may be connected between the reservoir 46 and the supply circuit 56 via a replenishing circuit 59, pumping hydraulic fluid at a relatively constant rate in the described embodiment.

In addition to the hydraulic proportional valve 44, a safety valve 45 may be interposed in the hydraulic circuit between the hydraulic proportional valve 44 and the hydraulic pump 48. The safety valve 45 can take the form of a two-position, three way valve such as that manufactured by Fluid Power Industries as model number MV4-24-12VDC. The placement of the safety valve 45 is such that if the planting apparatus 24 is not in motion as determined by the ground speed sensor 26 and the signal conditioning circuit 102 via the microprocessor 60, the microprocessor 60 sends a signal to cause the safety valve 45 to divert the hydraulic fluid through a diversion circuit 54 (i.e., the hydraulic motor circuit 40 is closed); if, on the other hand, the planting apparatus 24 is in motion, the microprocessor 60 sends a signal to cause the safety valve 45 to direct the hydraulic fluid through (i.e., open) the supply circuit 56. Those skilled in the art will recognize that the safety valve 45 may be omitted, or may be combined with the proportional valve 44 into a single valve without departing from the teachings of the invention.

Referring to FIGS. 1 and 2, a highly-accurate ground speed sensor 26 coupled with a signal conditioning circuit 102 (FIGS. 8A, 8B, 8C, 8D, 8E, and 10) capable of determining the speed of or distance travelled by the planting apparatus 24 relative to the field to be planted and independent of the rotation of the wheels 6 of the planting apparatus 24 (or the wheels 28 of the tractor 8) is connected to the planting apparatus 24 or the tractor 8. In the embodiment illustrated, the ground speed sensor 26 is connected to the planting apparatus 24. As previously noted, the described embodiment of the invention utilizes as a ground speed sensor 26 a low speed radar capable of operating over the preferred operating speed of a planting apparatus 24 (e.g., between 0.10 and 12.0 miles per hour ("mph")), and when coupled with a signal conditioning circuit 102 through a radar pre-amp 101, is capable of determining relative ground speed with high accuracy (preferably within at least 0.01 mph). The ground speed sensor 26 provides periodic input concerning the relative ground speed of or distance travelled by the planting apparatus 24 on an ongoing basis by communicating, preferably electronically, with the microprocessor 60, via the circuitry referenced above.

Figure 6:
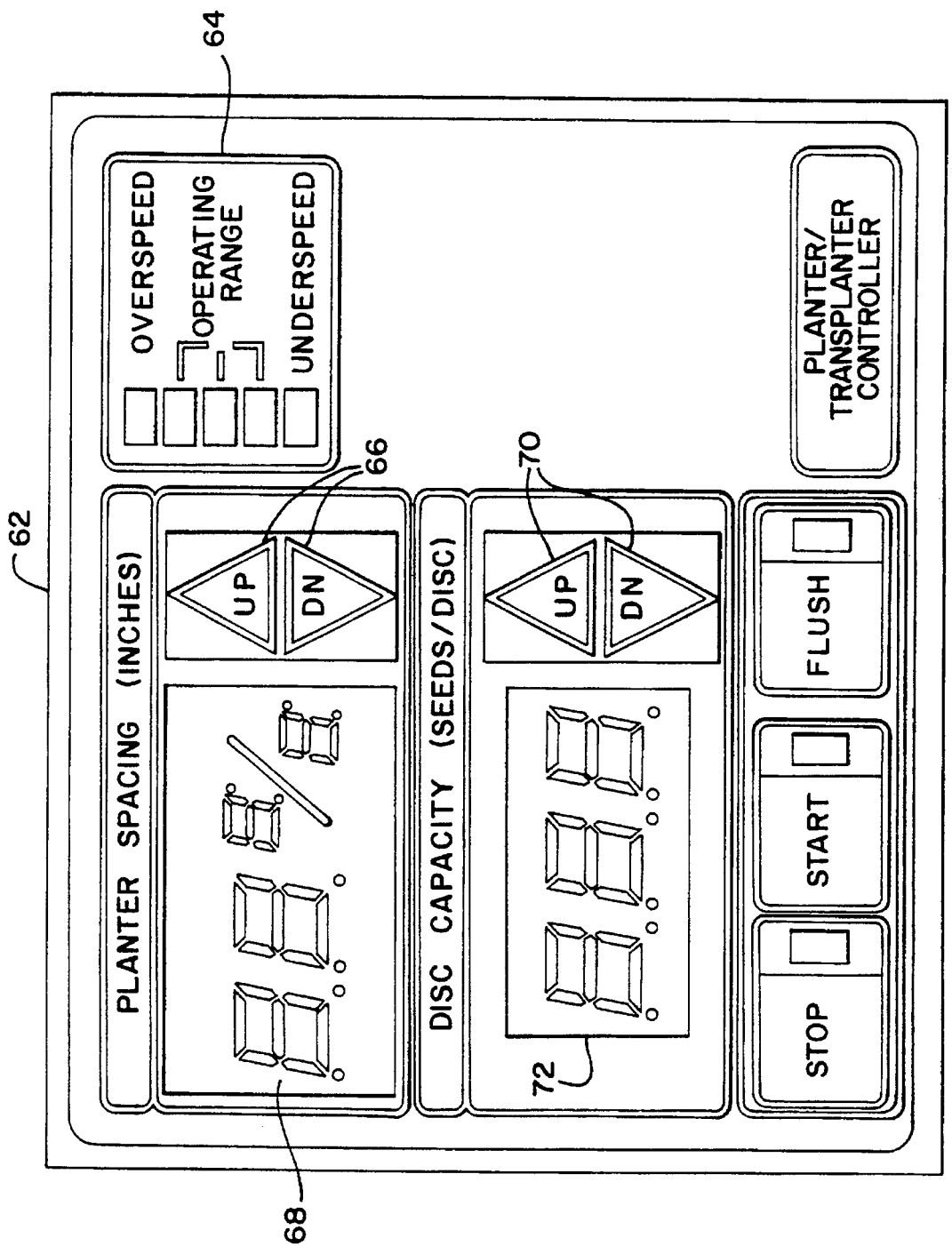
FIG. 6 is a front view of the display unit of the described embodiment.
Figure 7A:
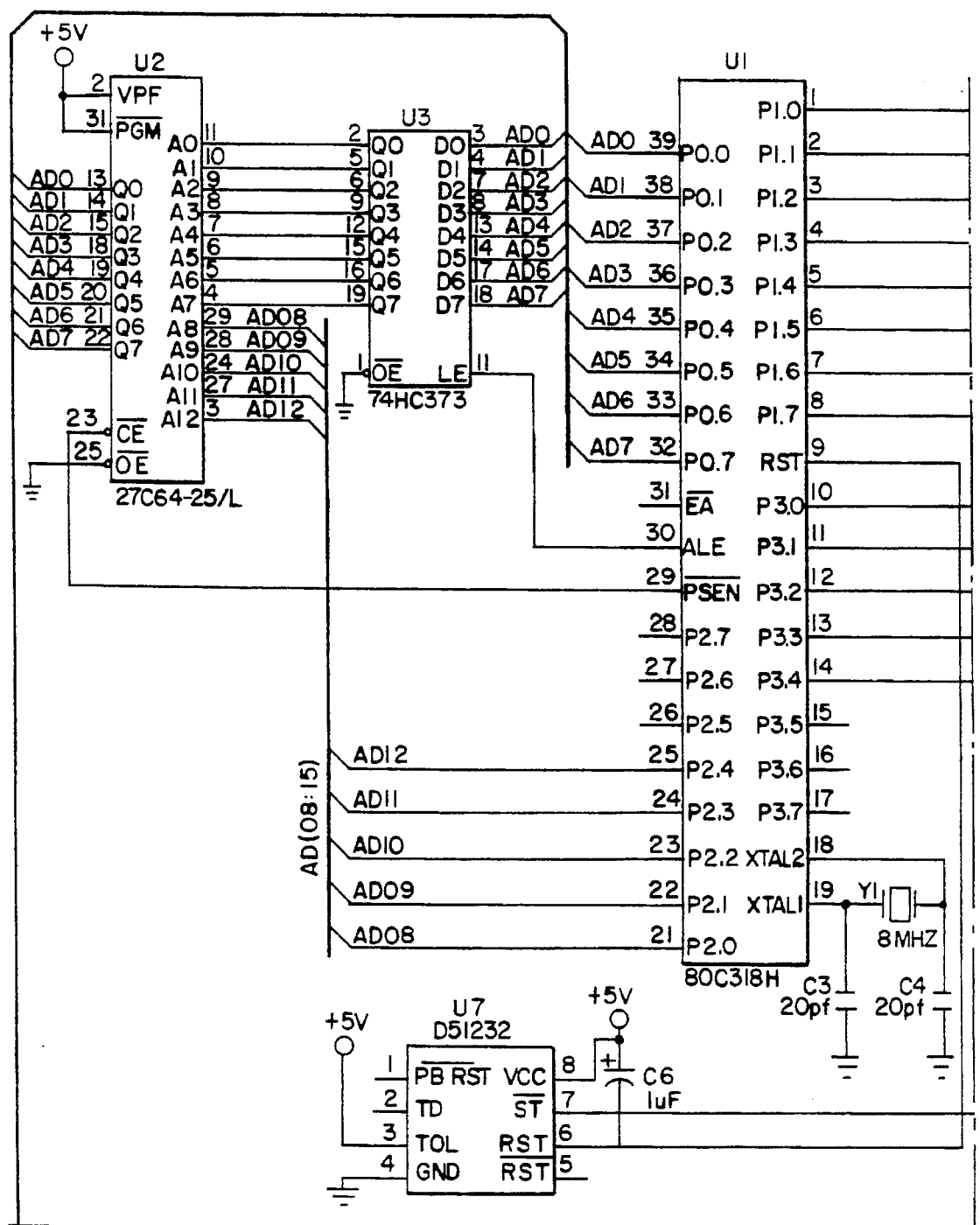
FIGS. 7A, 7B, and 7C are a schematic diagram of the electrical components of the display unit of the described embodiment.
Figure 7B:
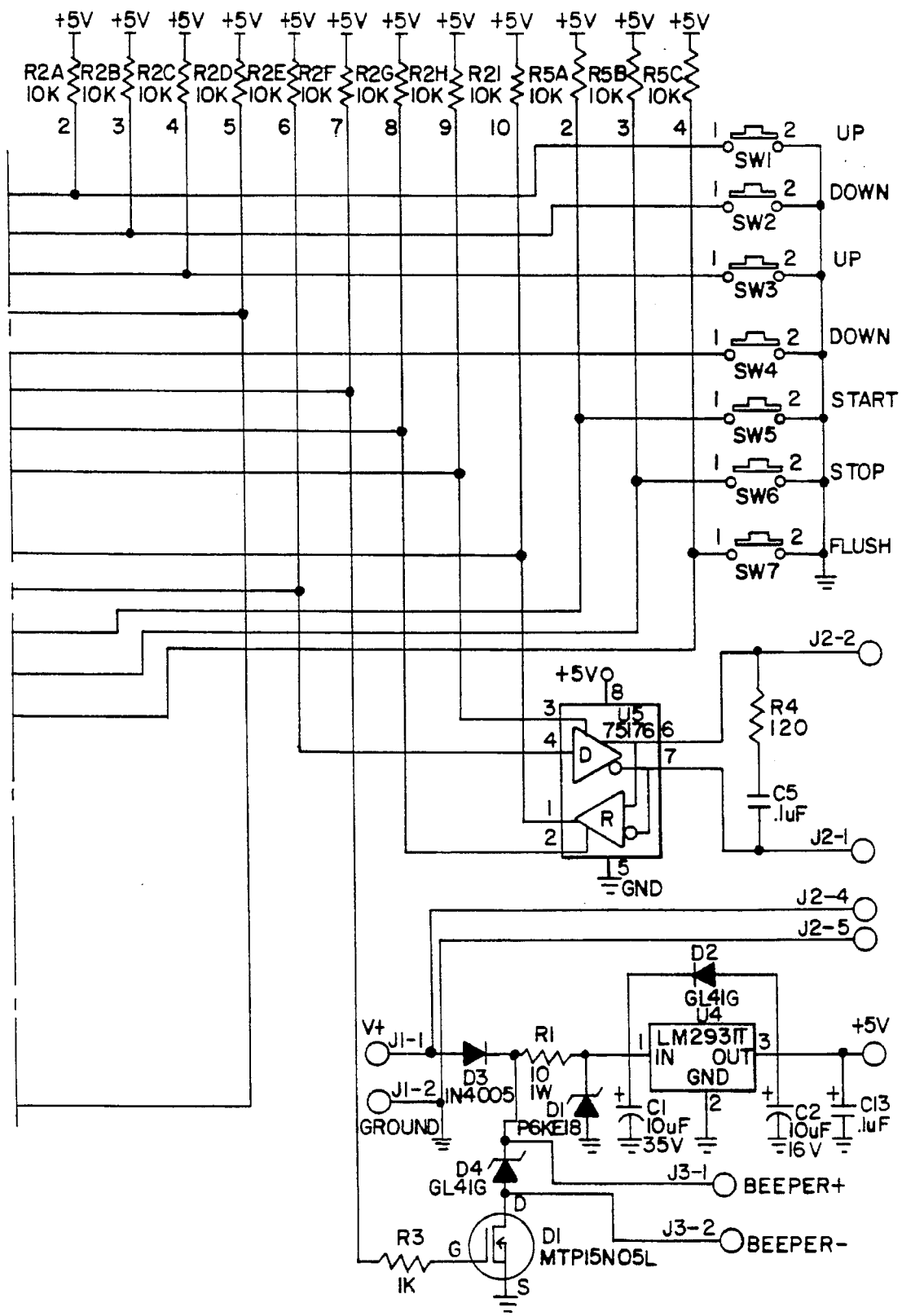
Figure 7C:
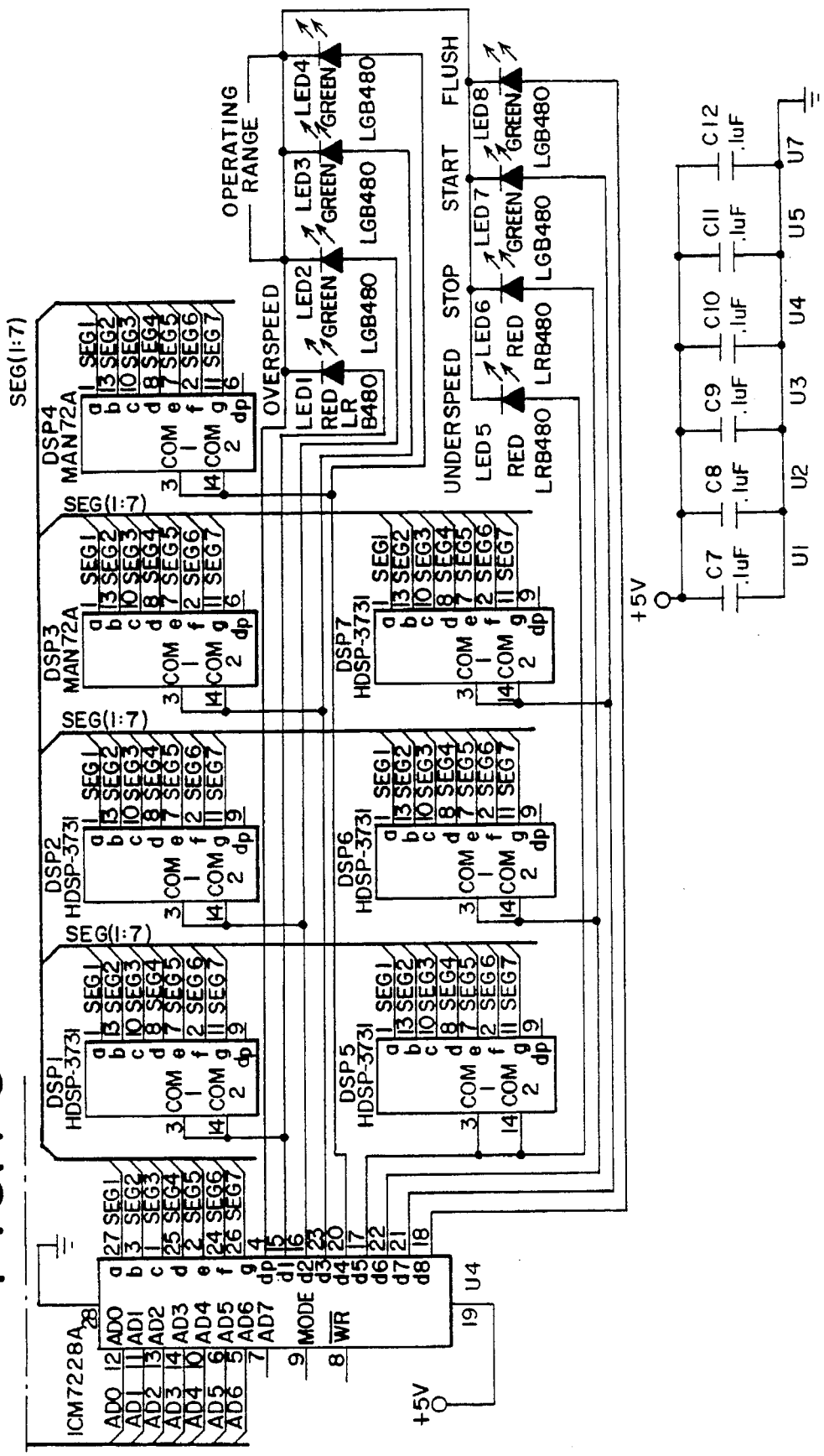
Figure 8A:
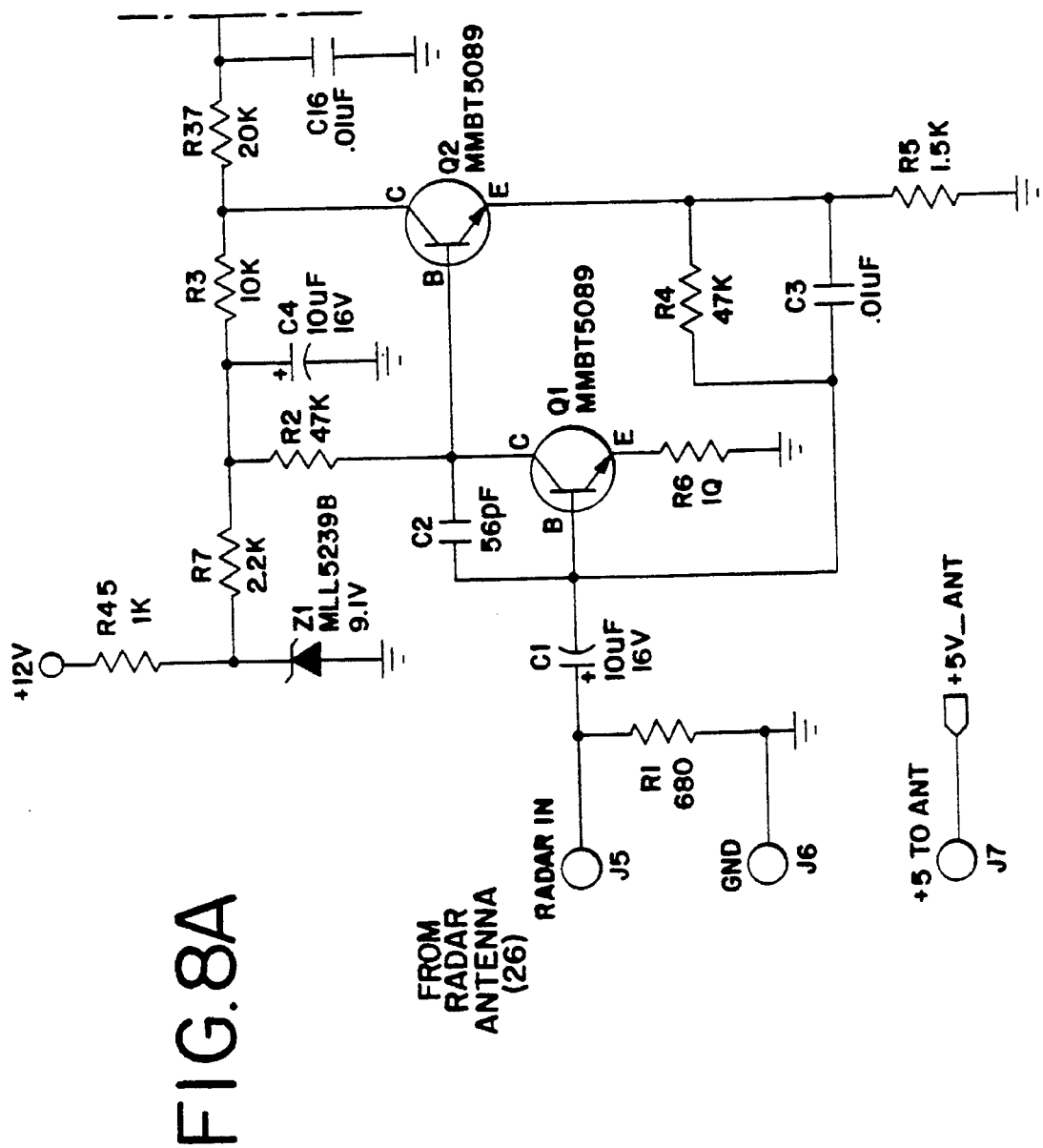
FIGS. 8A, 8B, 8C, 8D, and 8E are a schematic diagram of the electrical components of the microprocessor circuit of the described embodiment.
Figure 8B:
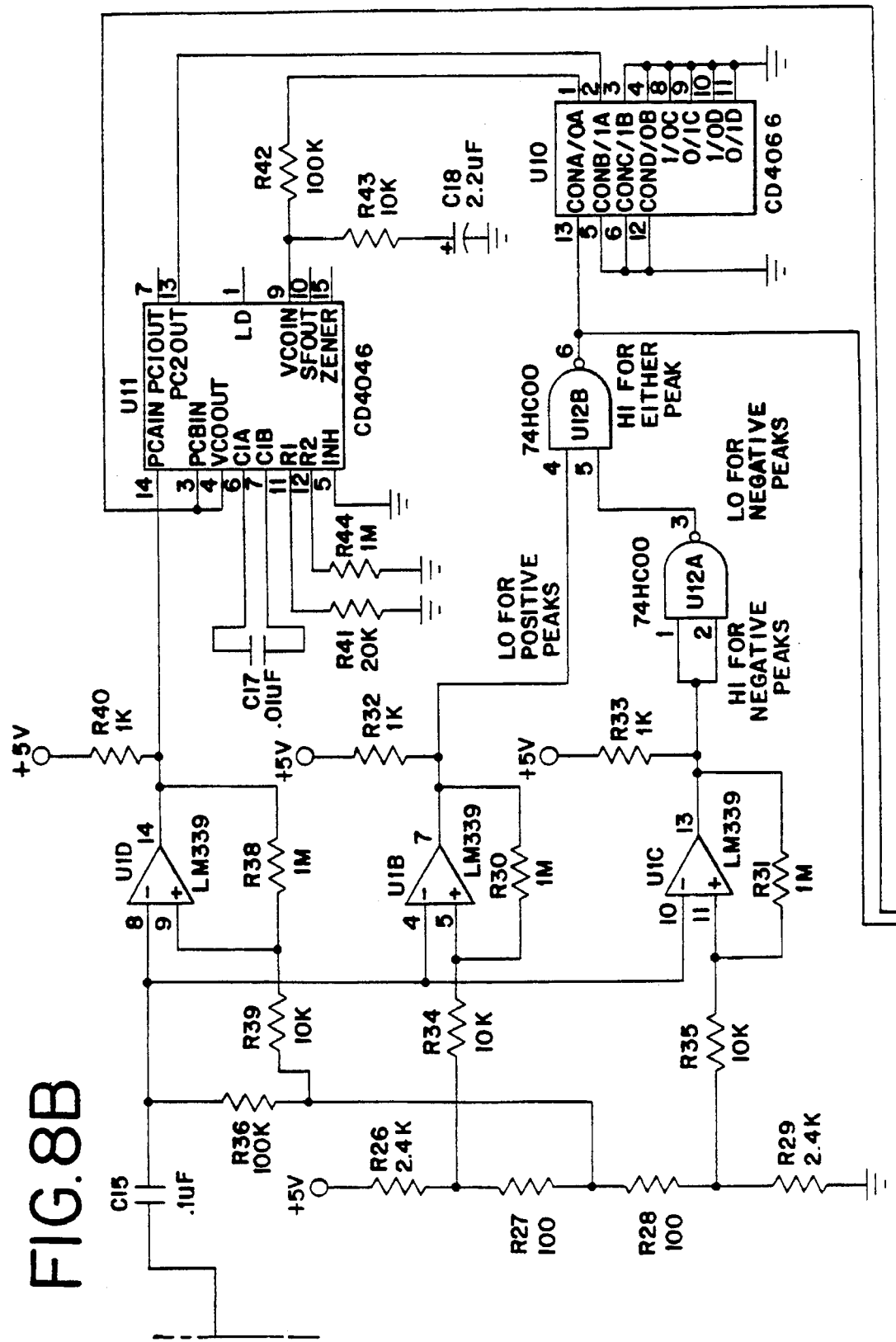
Figure 8C:
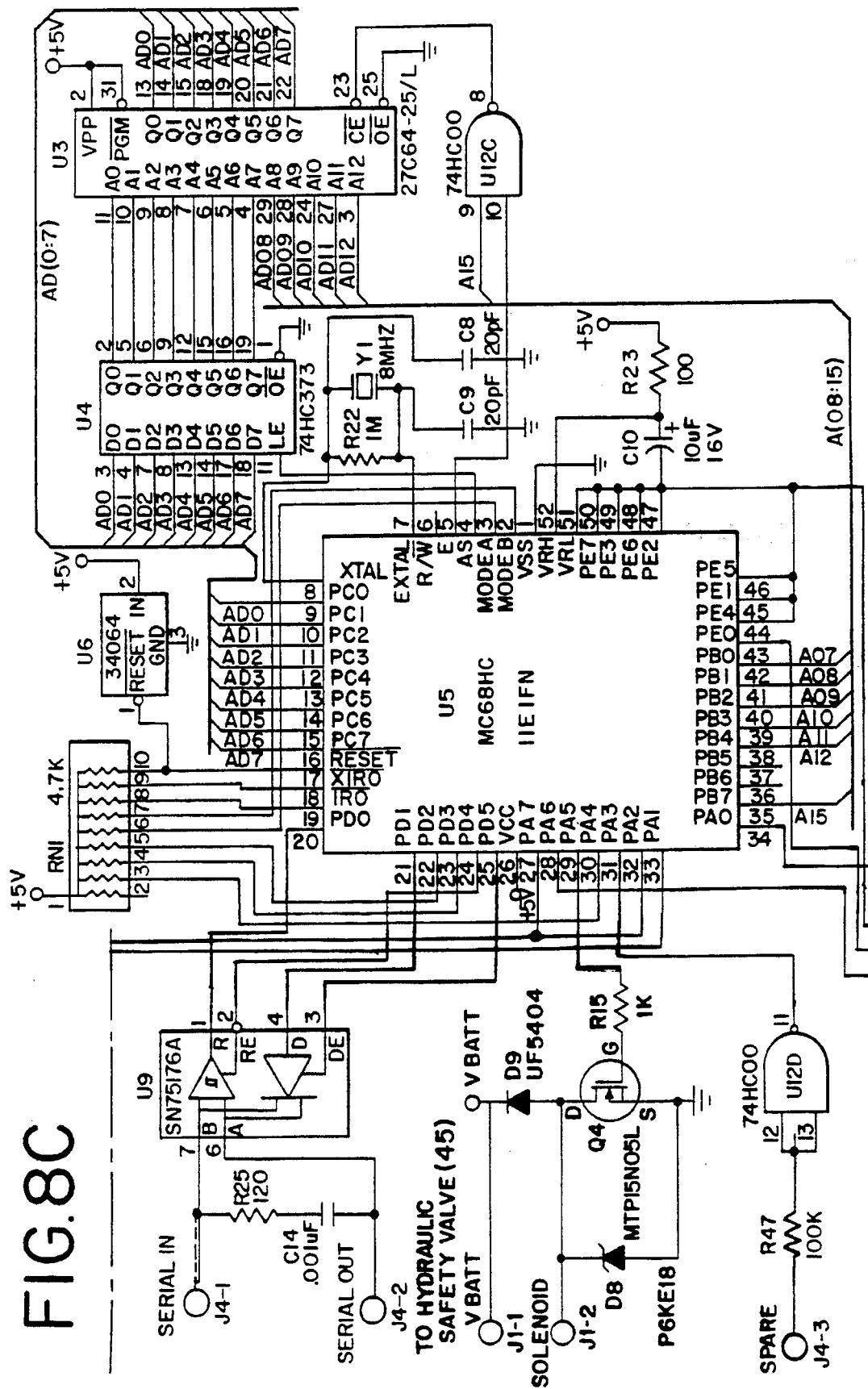
Figure 8D:
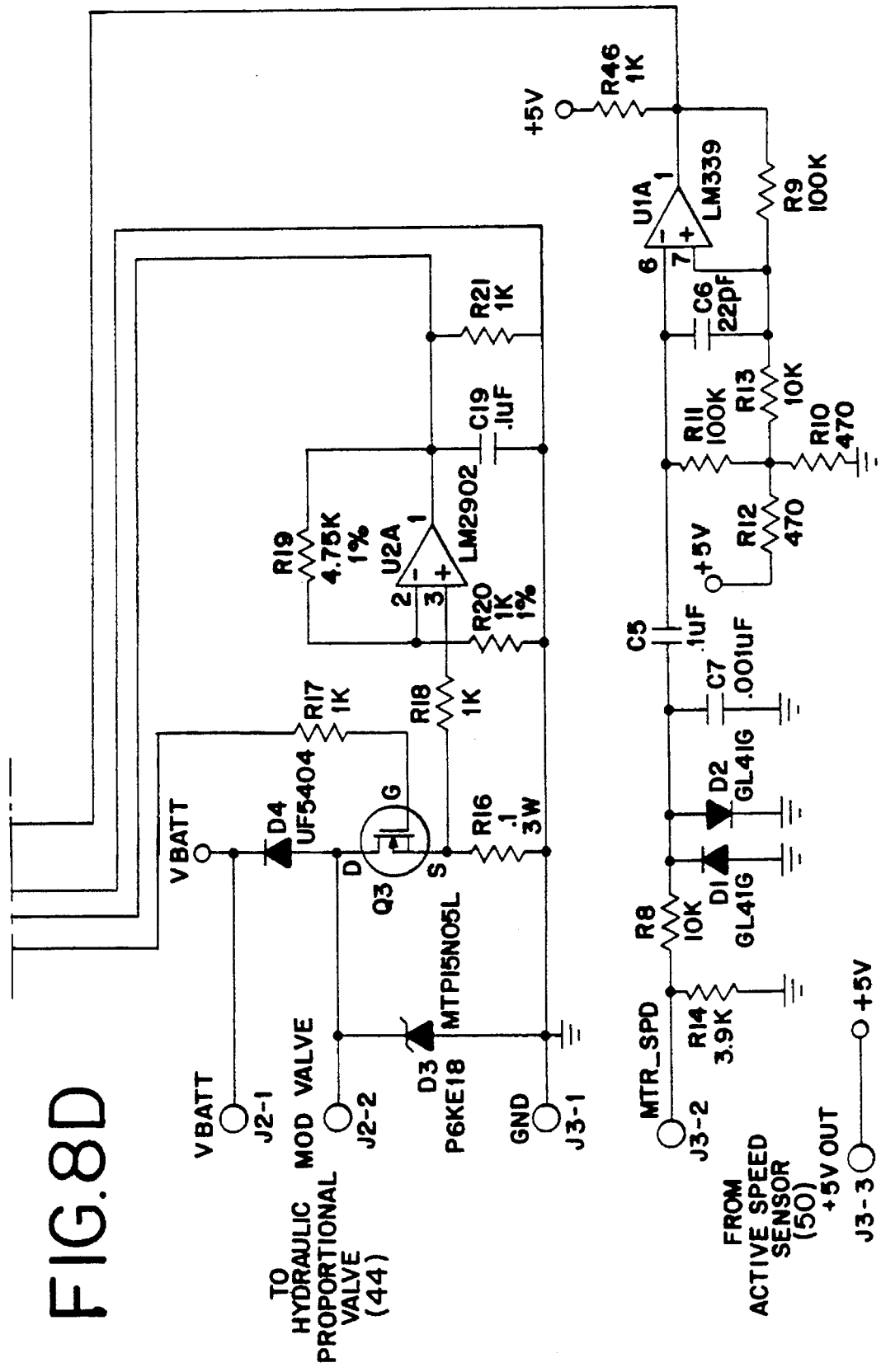
Figure 8E:
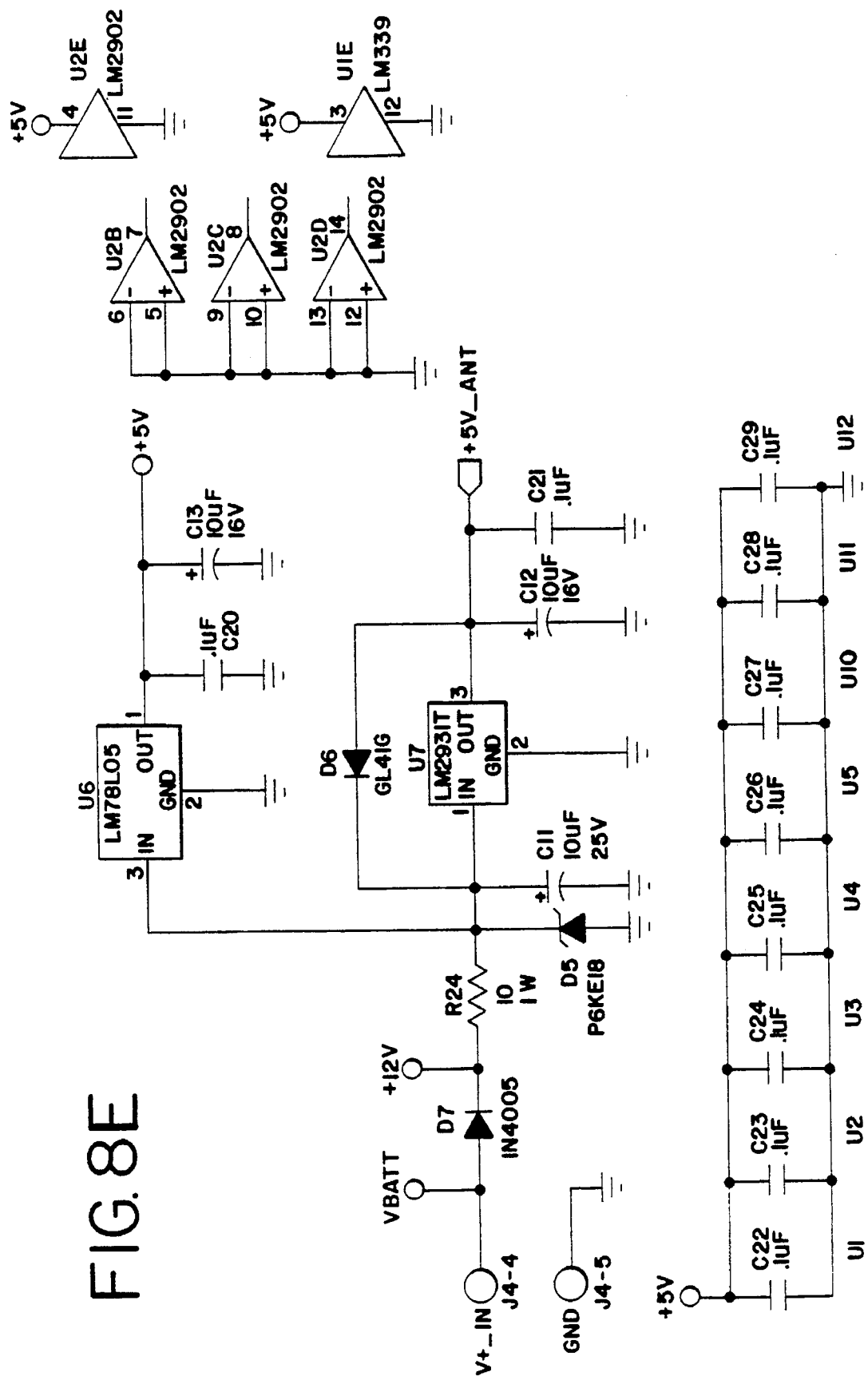

Referring to FIGS. 1, 2, and 6, the described embodiment of the invention also utilizes an input device, such as the display unit 62 shown in the illustrated embodiment, which permits the farmer, for example, to use plant spacing inputs 66 to select (or to change) a desired linear seed spacing of the dispensed seeds 18. The plant spacing selected may be shown on plant spacing display 68. The display unit 62 may also allow the farmer to input other information, such as the number of seeds dispensed per rotation of each individual rotating disc 14 (ordinarily the number of holes 16 in the disc 14) by using disc capacity inputs 70. The disc capacity selected may be shown on disc capacity display 72. The inputs may take the form of electronic switches known in the art, and the displays may take the form of LED's, LCD's or other display means known in the art, and will not be discussed in detail here. The circuitry of the display unit for the described embodiment is shown schematically in FIGS. 7A, 7B, and 7C; however, those skilled in the art will recognize that an input or display unit using circuitry different from that described and illustrated herein could be utilized without departing from the teachings of the invention.

Referring again to FIGS. 1, 2, and 6, the display unit 62, in turn, communicates this information, preferably electronically, to the microprocessor 60 via electrical lines 61. The display unit 62 may also include monitors to ensure correct operation of the planting apparatus, such as monitors to detect seed jams or other malfunctions in the seed dispensers (not illustrated), or operational speed alarms 64 capable of monitoring the ground speed of, e.g., the tractor as operated by the farmer to ensure that it is within the appropriate operational range of the planting apparatus 24, etc.

Referring to FIGS. 2, 3, and 4, operationally engaged with (and, in the illustrated embodiment, adjacent to) the hydraulic motor 42 in the described embodiment is an active speed sensor 50, which in turn communicates, preferably electronically, with the microprocessor 60 as well. In the illustrated embodiment, the active speed sensor 50 senses the rotational speed of the shaft 29 connected to the hydraulic motor 42 (which in turn determines, in part, the seed dispensing rate of the seed metering devices); however, it will be recognized in the art that the active speed sensor may be used to sense the rotational speed of other components directly or indirectly engaged with the hydraulic motor 42, for example, the shaft 22 or the rotating disc 14. One embodiment of an active speed sensor 50 known in the art and useful in carrying out the invention is a so-called Hall effect sensor wherein one or more magnets in the shaft 29 create a magnetic flux that results in an electrical pulse as the magnet rotates past the active speed sensor 50 (e.g., the Hall effect sensor), although other appropriate active speed sensors such as transducers may be used as well.

The active speed sensor 50 sends a signal to the microprocessor 60 which allows the microprocessor to determine whether the disc 14 is dispensing seeds 18 at the appropriate rate determined by the microprocessor to achieve proper linear seed spacing at the then-current operational speed of the planting apparatus 24 as determined via the ground speed sensor 26. If the microprocessor 60 determines that the rate of dispensing seeds 18 detected by the active speed sensor 50 is too fast (i.e., that the seeds are being dispensed too closely), then the microprocessor adjusts the flow of hydraulic fluid by sending an electronic signal proportionally closing the hydraulic proportional valve 44, thus slowing the hydraulic motor 42, the rotating shaft 22, rotating disc 14, and ultimately the seed dispensing rate. The converse would, of course, be true where the seed dispensing rate detected by the active speed sensor 50 is determined to be faster than appropriate.

The microprocessor 60 may take the form of microprocessors currently available from a number of manufacturers, such as the Motorola model no. MC68HC11EFN and serves to calculate the appropriate electrical signal to be provided to the hydraulic proportional valve 44 (and safety valve 45), which, in turn, determines the rate of hydraulic fluid passing through to the hydraulic motor 42, which in turn controls the rate of operation of the seed metering devices 12, which thereupon controls the linear spacing at which seeds 18 are dispensed to the field by the planting apparatus 24.

Because the microprocessor quickly and accurately correlates the rate at which seeds 18 are dispensed by the seed metering devices 12 to the ground, as well as the ground speed or distance travelled of the planting apparatus 24 as determined by the ground speed sensor 26 through the radar pre-amp 101 and the signal conditioning circuit 102, (i.e., ground speed is determined independent of wheel rotation, with the inherent slippage and sliding), the seeds are accurately and consistently dispensed at the predetermined plant spacing set by the farmer, and may be changed by the farmer "on the fly" via the display unit 62.

The microprocessor takes the selected linear spacing of the seeds that the farmer preselects (or changes) and inputs this information through the display unit 62, and using the relative ground speed or distance travelled of the planting apparatus 24 as an input from the ground speed sensor 26 through the radar pre-amp 101 and the signal conditioning circuit 102, calculates the appropriate rate at which the hydraulic motor 42 should operate to cause the seed metering devices 12 to dispense seeds 18 at the desired intervals. A signal is then sent by the microprocessor 60 to the hydraulic proportional valve 44 to increase, decrease, or maintain the flow of hydraulic fluid therethrough in order to achieve the appropriate hydraulic motor speed.

The active speed sensor 50 operationally engaged with the hydraulic motor 42 ensures further accuracy and more responsive control by providing input to the microprocessor 60 as to whether the hydraulic motor 42 is in fact operating at the rate determined by the microprocessor; if it is not, the microprocessor 60 calculates the differential and sends a signal to the hydraulic proportional valve 44 to further increase or decrease the flow of hydraulic fluid, which in turn further refines the operating speed of the hydraulic motor 42 and the resultant seed dispensing rate and linear seed spacing.

Figure 9:
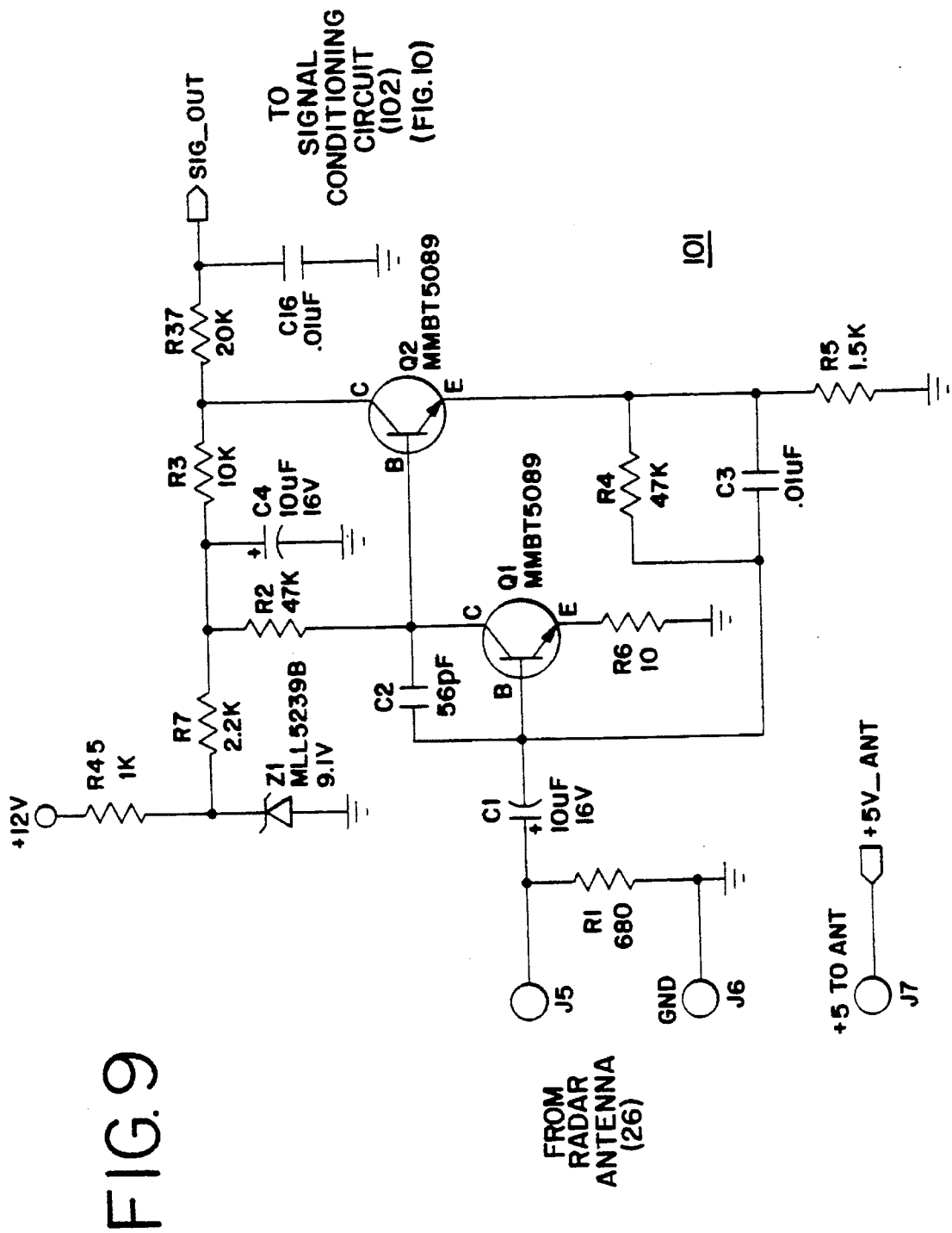
FIG. 9 is a schematic diagram of the electrical components of the radar pre-amp for the described embodiment.

As noted above, the ground speed sensor 26 provides a signal that is filtered via a signal conditioning circuit 102 (FIG. 10) after passing through the radar pre-amp 101 (FIG. 9). The radar pre-amp 101 is a pre-amp circuit such as that shown in FIG. 9. As will be recognized by those skilled in the art, other pre-amp circuits could be substituted for the circuit shown in FIG. 9 without departing from the teachings of the invention.

Figure 10:
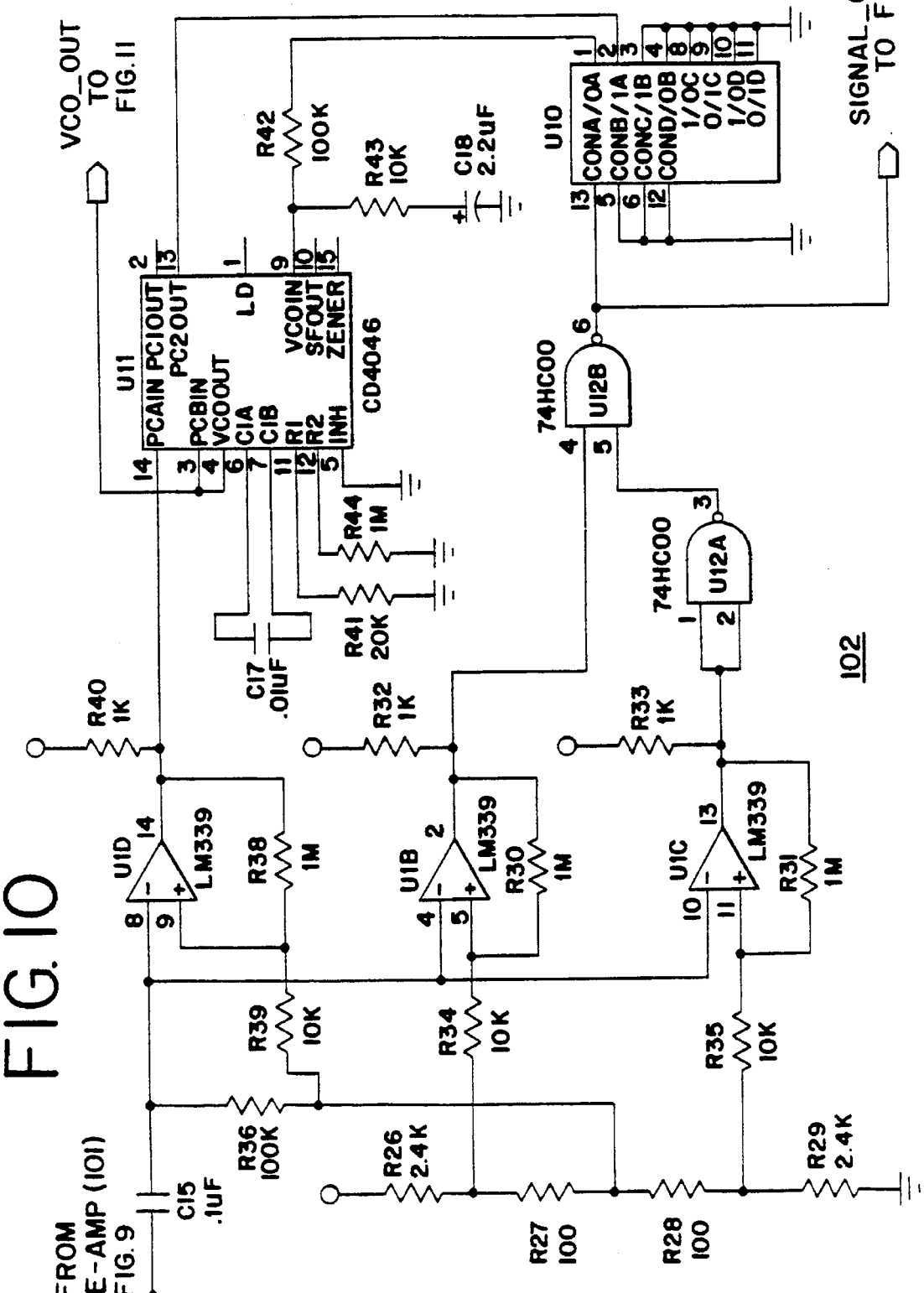
FIG. 10 is a schematic diagram of the electrical components of the signal conditioning circuit for the described embodiment.

A signal conditioning circuit 102, such as that shown in FIG. 10, is desirable to determine the ground speed or distance travelled with sufficient accuracy to achieve the goal of achieving accurate plant spacing over the operable range of planting apparatus 24, for example, in the described embodiment, over a range of plant spacings between 1 inch to 24 inches in ⅛ inch increments. Given that a typical K band radar antenna useful in low speed Doppler radars returns a substantially accurate signal frequency in the range near 72 Hz (per mile per hour of the moving vehicle), that means that at 0.1 mph, the low end of the described embodiment of the operational speed of the planting apparatus 24, the period of the signal would be 7.2 Hz. For a radar unit to sample 10 waveforms under such circumstances would take 1.4 seconds. Because it would be preferable to sample more than 10 waveforms to obtain a statistically significant sample and achieve the accuracy and reliability desirable for the invention to carry out accurate seed planting, and because doing such sampling would result in separate samples being taken at intervals too infrequent to accurately control the rotational speed of the hydraulic motor, the signal conditioning circuit 102 such as that shown in FIG. 10 is desirable.

Moreover, the signal conditioning circuit 102 also aids in processing the radar signal to eliminate extraneous signal noise. For example, when the ground speed sensor 26 in the form of a low speed Doppler effect radar is mounted on a slow moving vehicle and pointed toward the ground, the return signal may be a composite signal that appears to be of constantly changing magnitude and symmetry, and which may result in periods of nearly complete signal cancellation, resulting intermittently in a return signal that may be loaded with extraneous signals unrelated to the ground speed or distance travelled. The desired return signal consists of multiple images of the same frequency which do relate to the speed of the vehicle, and hence, the distance travelled, even though such signals too vary in phase and magnitude. Those return signals truly related to the ground speed or distance travelled are selected by the signal conditioning circuit 102, as opposed to those signals unrelated to ground speed, with the signal conditioning circuit 102 adjusting for those occasions where the return signal fades or drops out altogether at intermittent intervals.

Prior to this invention, attempts to deal with the problems described above with low speed Doppler effect radar signals have involved the use of tracking filters or phase-locked loop circuits. While tracking filters may eliminate signals that are significantly out-of-band, they are less effective in dealing with the very low frequencies that would be associated with radars mounted on agricultural equipment, and are largely ineffective in reducing measurement uncertainty.

Phase-locked loops ("PLLs") are known in the art, and need not be described in detail here; PLLs typically utilize a Voltage Controlled Oscillator ("VCO"), a frequency/phase detector for generating an error or control signal, and a VCO control filter arranged in a closed-loop system. Such systems operate as frequency filters and may operate at very low frequencies; however, typical PLL implementations have a property that is very undesirable in connection with the invention. In the absence of a significant return signal, e.g., when a return signal from the radar intermittently fades, decreases in strength, or disappears, the PLL will migrate to the VCO center frequency or to the VCO's lowest operating frequency, and will transmit a signal accordingly. Thereafter, each time the radar return signal reappears, the PLL attempts to acquire a "lock" on that return signal, and this sometimes requires several signal periods. Frequently, the signal will fade or disappear again before the PLL can adequately lock on the signal. This results in the signal in the PLL migrating to varying degrees intermittently between the VCO frequency, which is not related to ground speed or distance travelled, and the return signal frequency; in the context of the invention, this would result in inaccurate rotational speed modulation for the rotating discs 14 in the seed metering devices 12. In other words, the rotational speed of the rotating discs 14 would migrate intermittently as well due to the PLL's signal migration, resulting in inaccurate linear plant spacing.

Figure 15:
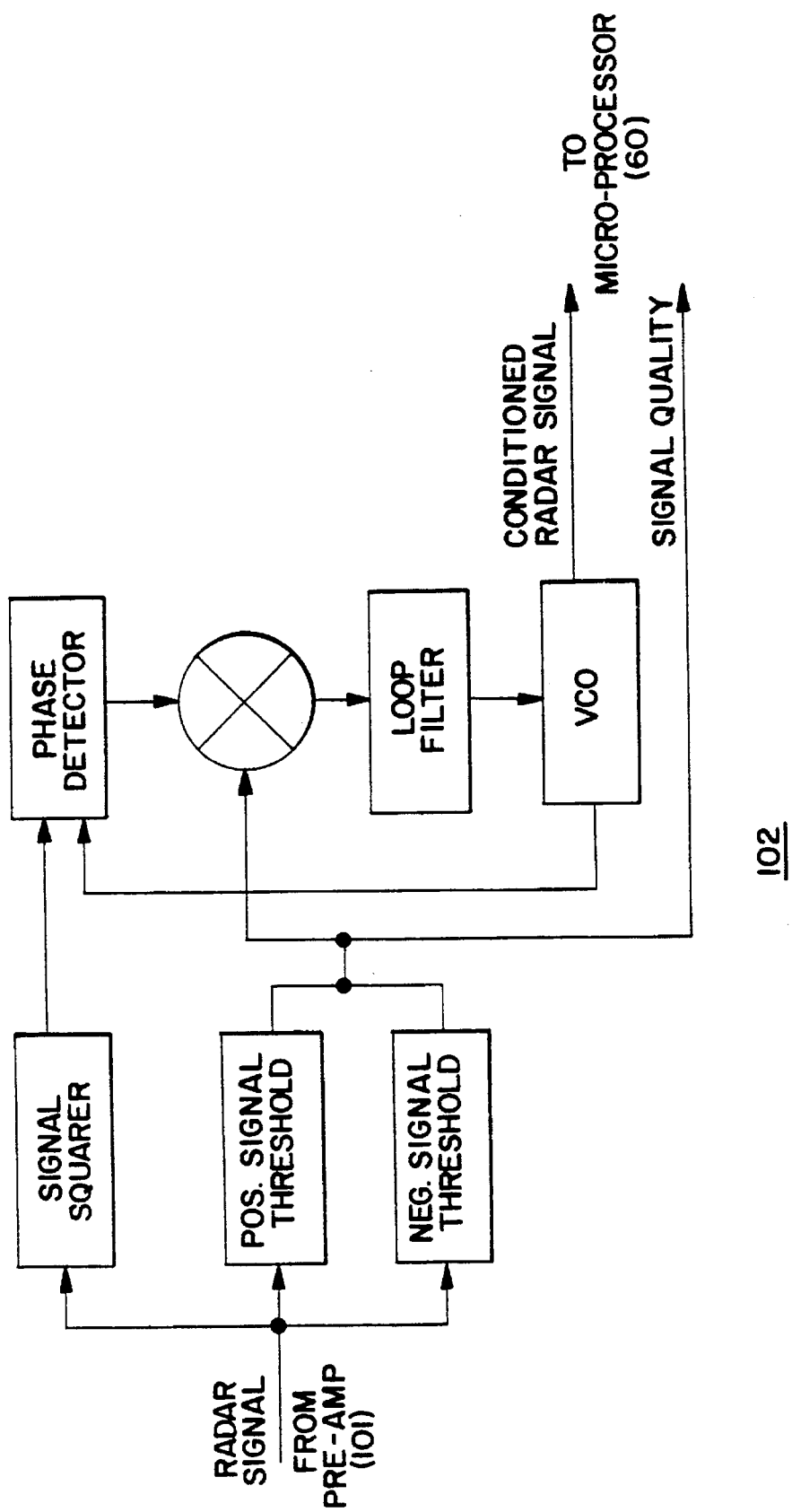
FIG. 15 is a functional block diagram schematic of the signal conditioning circuit.
Figure 16:
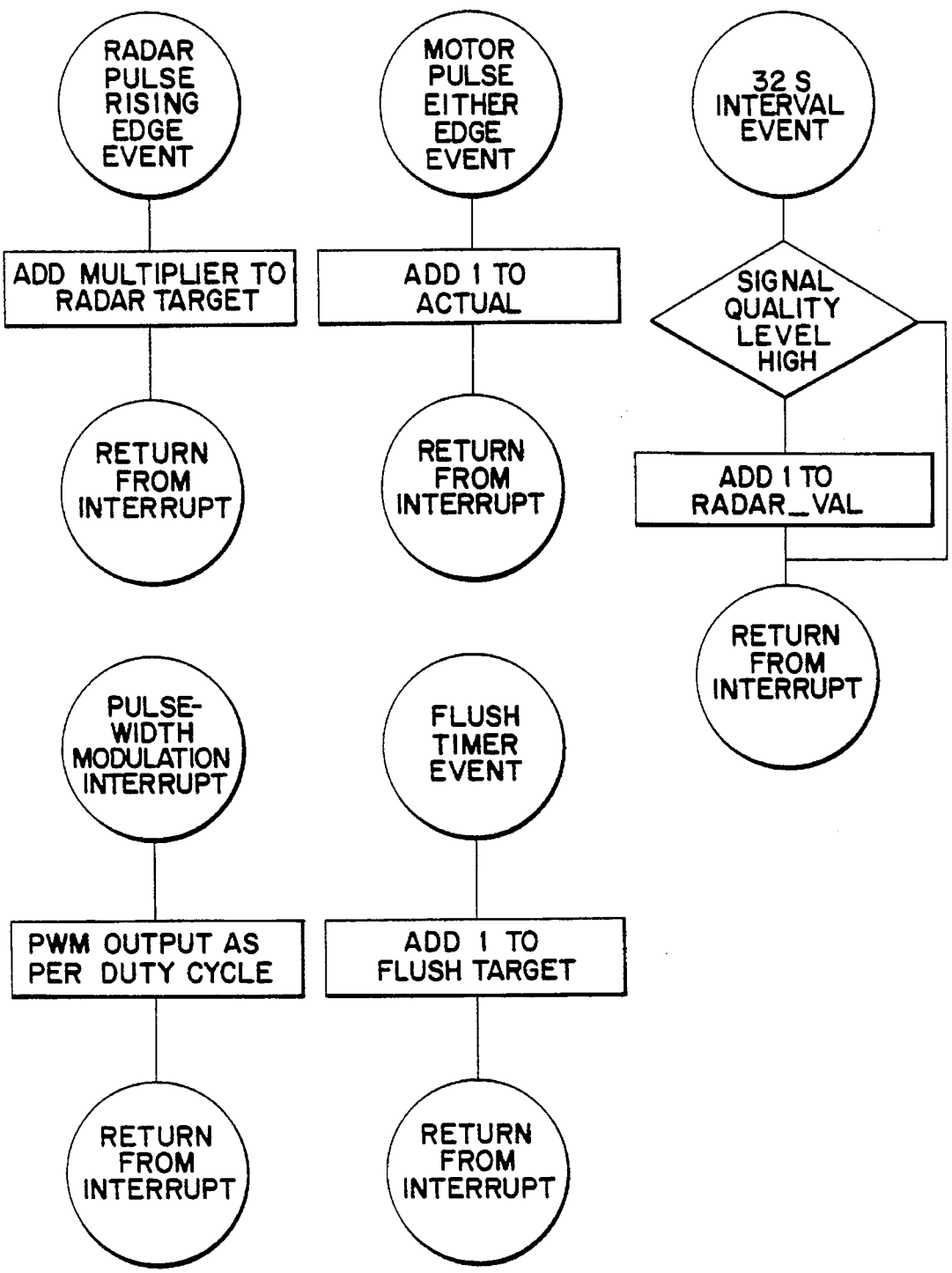
FIG. 16 is a flow chart schematic of the computer logic for background functions accessed by the main program of the microprocessor via interrupts.

The signal conditioning circuit 102, shown in detail in FIG. 10 and in functional block diagram form in FIG. 15, provides a unique circuit arrangement within a PLL circuit such that the radar return signal only influences the VCO while the return signal is adequate in magnitude; when the return signal is inadequate (e.g., when it intermittently fades or disappears), the PLL remains at its last locked frequency (i.e., it does not migrate) until adequate return signal strength is again detected.

The output from the signal conditioning circuit 102 thus constitutes a much more stable image with only minor corrections occurring at any given instant. A secondary output signal from this signal conditioning circuit varies in duration relative to the period (duty cycle) with the magnitude of the radar signal and is used as a signal quality indication. The stable output signals from the signal conditioning circuit, the inventors have found, permits the measurement of ground speed between at least 0.10 and 12.0 mph, with an accuracy of plus or minus 0.01 mph, therefore permitting accurate calibration of seed placement to within 0.125 inches or less in connection with the invention described herein.

Referring to FIGS. 8A, 8B, 8C, 8D, 8E, 9, 10, 13 and 15, the return signal from the ground speed sensor 26 (the Doppler effect radar in the described embodiment) via the radar pre-amp 101 passes through the signal conditioning circuit 102, which includes a signal squaring circuit that ignores or effectively filters low level noise signals and presents a clear square wave to the phase detector. The return signal is also directed through two signal magnitude threshold comparators, with the outputs combined to gate the phase detector output to the loop filter when the absolute value of the return signal is above a predetermined level. The loop filter then controls the VCO frequency so that it will consistently be the average value of the return signal, which has been validated through the foregoing signal conditioning procedure.

The combined output of the signal magnitude threshold comparators varies in duration relative to the period (duty cycle) with the magnitude of the return signal, which is used by the microprocessor 60 as a signal quality indicator.

The output signal of the signal conditioning circuit may be treated as a ground speed measurement, and integrated by one or more known means to determine distance travelled; however, the inventors have found it advantageous to treat the output signal as a progressive position measurement. For example, where the period of a radar signal is approximately 72 Hz (actually, a return signal of 71.9486 Hz) per mile per hour of the moving vehicle, that equates to a distance travelled of approximately 0.24462 inches per return signal cycle. ((1 mile/hour)×(1 hour/3600 seconds)×(5280 feet/1 mile)×(12 inches/1 foot)×(1 second/71.9486 cycles)= 0.24462 inches/cycle). By accumulating radar return signal pulses, the distance travelled can be determined by direct proportionality. Similarly, the rotational speed of, e.g., the rotating discs 14 as determined by the active speed sensor 50 can be determined in terms of rotational speed; however, the inventors have found it advantageous to treat that signal as a mechanism position signal. Because the pulses of the active speed sensor 50 may be recognized on both the rising and falling portions of the pulse, the frequency with which the active speed sensor 50 provides position information is effectively doubled.

Referring to FIGS. 3, 4, 5, 6, 14, and 16, microprocessor 60 uses the signals obtained from the signal conditioning circuit 102 and from the active speed sensor 50 in order to regulate the speed of the hydraulic motor 42 such that the seeds 18 are dispensed at the desired spacing as input through the plant spacing inputs 62. It will be recognized that for a desired seed spacing, and for a given number of holes 16 in the rotating discs 14, there exists a mathematical relationship between the pulses of the return signal from the ground speed sensor 26 and the pulses from the active speed sensor 50, and the number (or fraction of the number) of seeds 18 dispensed. The microprocessor 60 accumulates the pulses of the return signal of ground speed sensor 26 for the signal conditioning circuit 102 and compares the pulses of the active speed sensor 50 (based upon the plant spacing input), and to the extent that the rotational speed of the rotating disc is not appropriate to achieve the desired plant spacing at the then-current operational ground speed of the planting apparatus 24, the microprocessor 60 corrects the speed of the hydraulic motor 42 by sending a signal to adjust the hydraulic proportional valve 44 accordingly, as previously described.

For a given sampling period, the mathematical relationship between the signal received via the ground speed sensor 26 and the active speed sensor 50 utilized to correct the rotational speed of the hydraulic motor 42 by proportionally opening or closing the hydraulic proportional valve 44 may be expressed generally as follows: (Number Of Target Radar Return Pulses)/(Number Of Target Active Speed Sensor Pulses)=((Desired Seed Spacing (in.))/(0.22462 in. per pulse))×((Number Of Holes In Rotating Disc)/(Number Of Pulses Generated Per Revolution Of The Rotating Disc)). (The 0.22462 inch figure used in connection with the described embodiment of the invention represents the period of a 71.9486 Hz signal, the return signal for the radar per mile per hour travelled. Those skilled in the art will recognize that, for different embodiments of the invention, for example, using a different effective return signal, this figure might have to be adjusted without departing from the teachings of the invention.)

Thus, for any given setting for the planting apparatus 24, and for a desired seed spacing selected by the farmer, the ratio between the Number Of Target Radar Return Pulses to the Number Of Target Active Speed Sensor Pulses Generated Per Revolution Of The Rotating Disc can be seen to be a constant ($K_T$). For example, if the planting apparatus is set up to generate 190 pulses per revolution of the shaft 29 (and, consequently, the disc 14), and assuming that there are 6 holes 16 in the disc 14, and assuming that the farmer desires to plant at 6 inch spacing, the ratio between the Number Of Target Radar Return Pulses to the Number Of Target Active Speed Sensor Pulses Generated Per Revolution Of The Rotating Disc or $K_T$ would be equal to ((6 in. per plant)/ (0.22462 in. per pulse))×((6 holes (plants) per revolution)/ (190 pulses per revolution))=0.84353. This constant is recalculated by the microprocessor 60 whenever the planting apparatus starts, or the desired seed spacing or the number of holes 16 in disc 14 is changed.

Each time that a pulse is generated as a result of a return signal from the ground speed sensor 26, the constant $K_T$ is added into an internal register in the microprocessor 60. Each time a pulse is generated by the active speed sensor 50, a unity value (1) is added into an internal register in the microprocessor 60. These tasks are performed in the background of the main program of the microprocessor 60 through the use of interrupts. In the described embodiment, each pass through the program loop (every 4.096 mS) the microprocessor 60 determines the difference between the two registers (effectively, the target number of pulses minus the actual number of pulses), and multiplies that difference by a gain factor; it then outputs that product as the pulse width modulation ("PWM") duty cycle for the hydraulic proportional valve 44. The task of controlling the output is also performed in the background of the main program, using interrupts. The rotating speed of the hydraulic motor 42 and, hence, the shaft 29 and the disc 14, is adjusted by the microprocessor 60 in the above-described manner to generate a signal to the hydraulic proportional valve 44 so that the accumulated values in the two registers match.

The combined output of the signal magnitude threshold comparators into the microprocessor 60 is caused to increment a register while the signal level is high. This task is performed in the background using interrupts. At intervals, the main program acquires this value, clears the register for evaluation over the next interval, and divides it by the maximum possible register value. This result is used as a signal quality factor for validating the presence of the return signal from the ground speed sensor 26.

In order that the planting apparatus 24 starts and stops planting seed coincident with the starting and stopping of movement of the planting apparatus 24, the microprocessor 60 senses: (1) when the planting apparatus 24 has begun moving positively relative to the ground, and then sends signals opening the safety valve 45 and/or the hydraulic proportional valve 44; (2) when the planting apparatus 24 has ceased moving positively relatively to the ground, and then sends signals closing the safety valve 45 and/or the hydraulic proportional valve 44; and (3) when no useable return signals are available from the radar for a prolonged period of time, in which case the microprocessor 60 sends signals closing the safety valve 45 and/or the hydraulic proportional valve 44. When the microprocessor 60 sends a signal closing the safety valve 45 and/or the hydraulic proportional valve 44, it may also optionally send another signal, e,g., to the display unit 62 indicating that planting has stopped.

Figure 11:
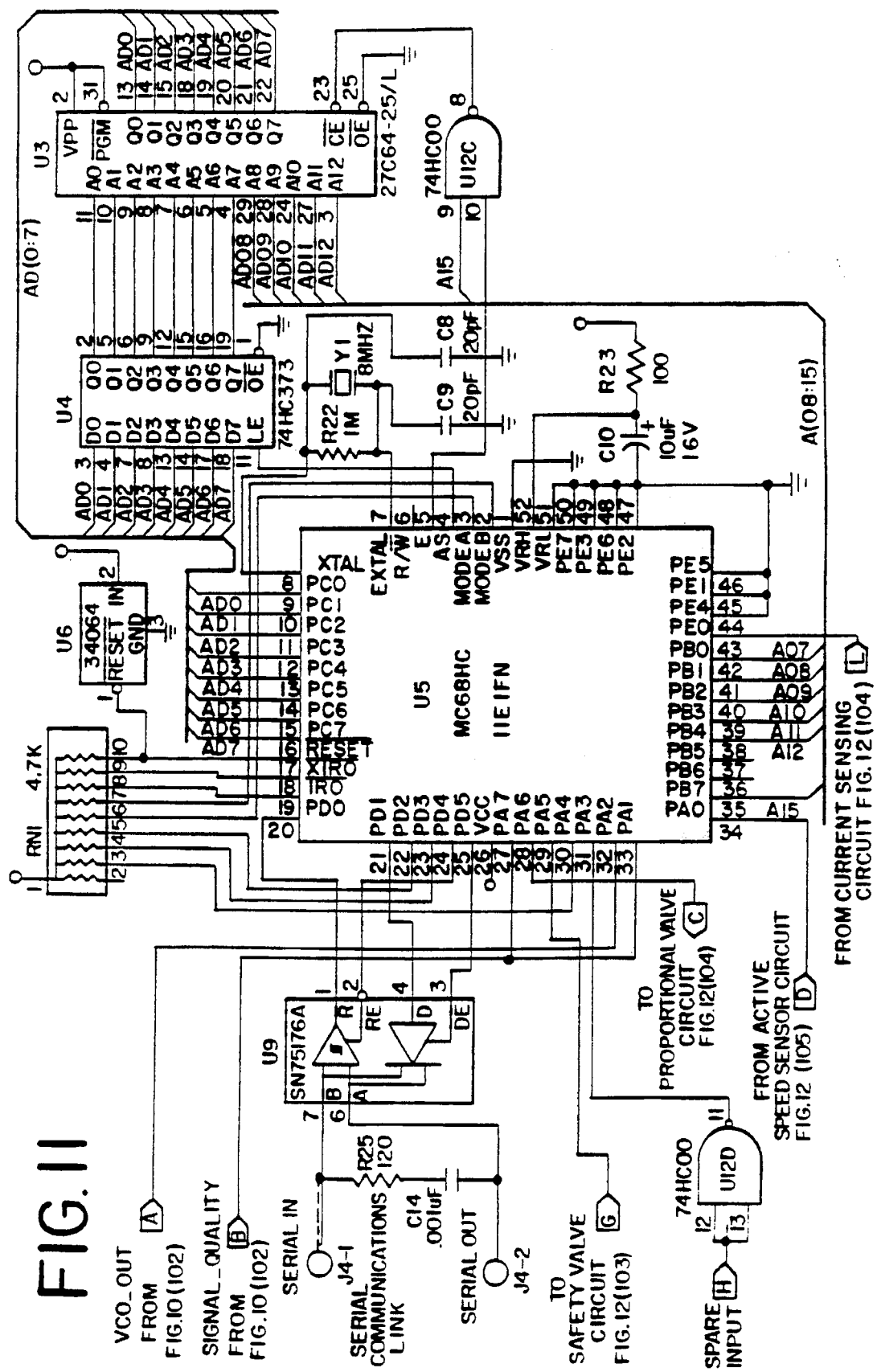
FIG. 11 is a schematic diagram of the electrical components, isolating those components most directly associated with the microprocessor, and illustrating electrical communications between the microprocessor and other electrical components with which it communicates in the described embodiment.
Figure 12:
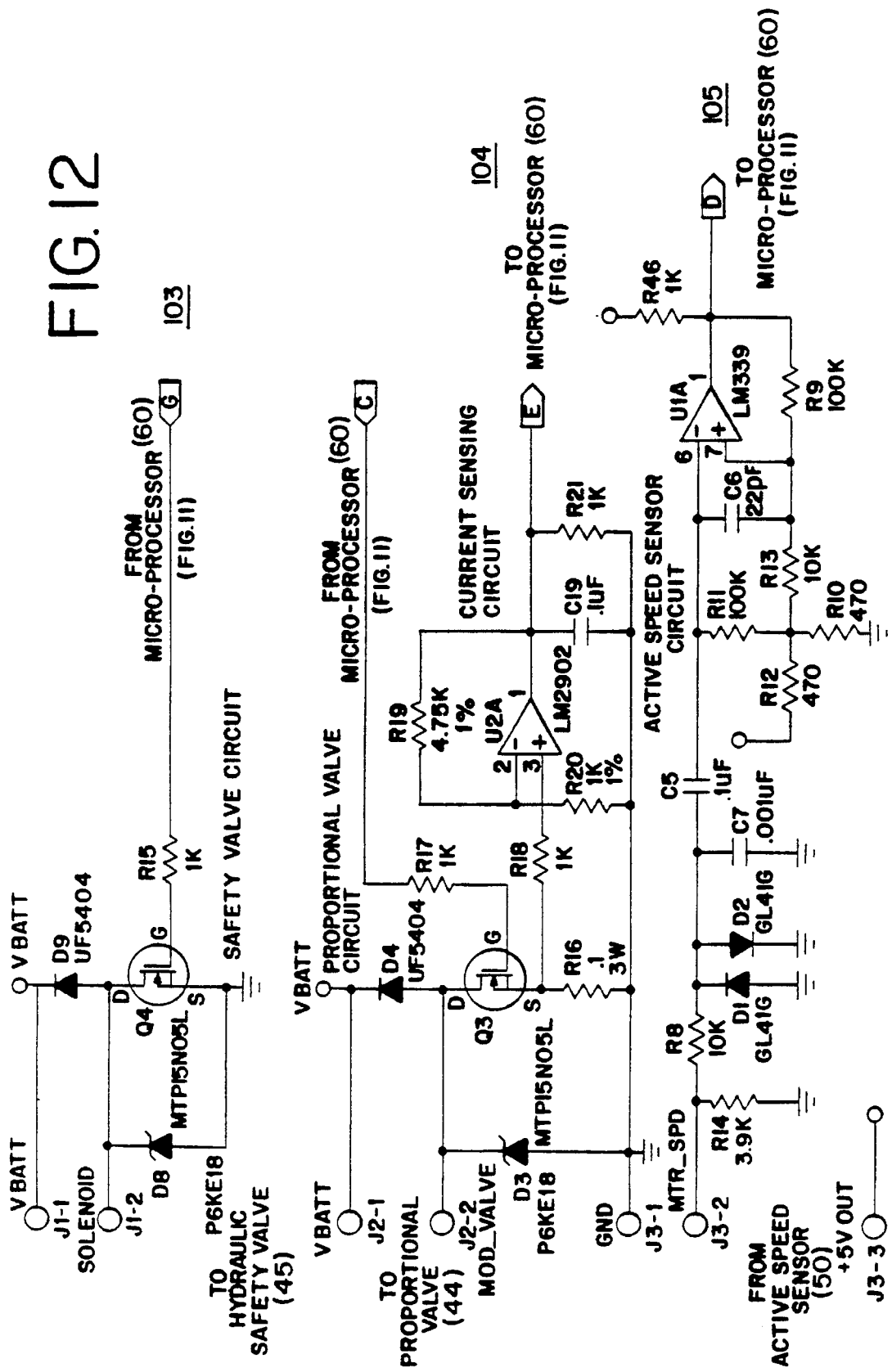
FIG. 12 is a schematic diagram of the electrical components for the input and output circuits between the microprocessor and other electrical/mechanical components with which it communicates in the described embodiment.
Figure 13:
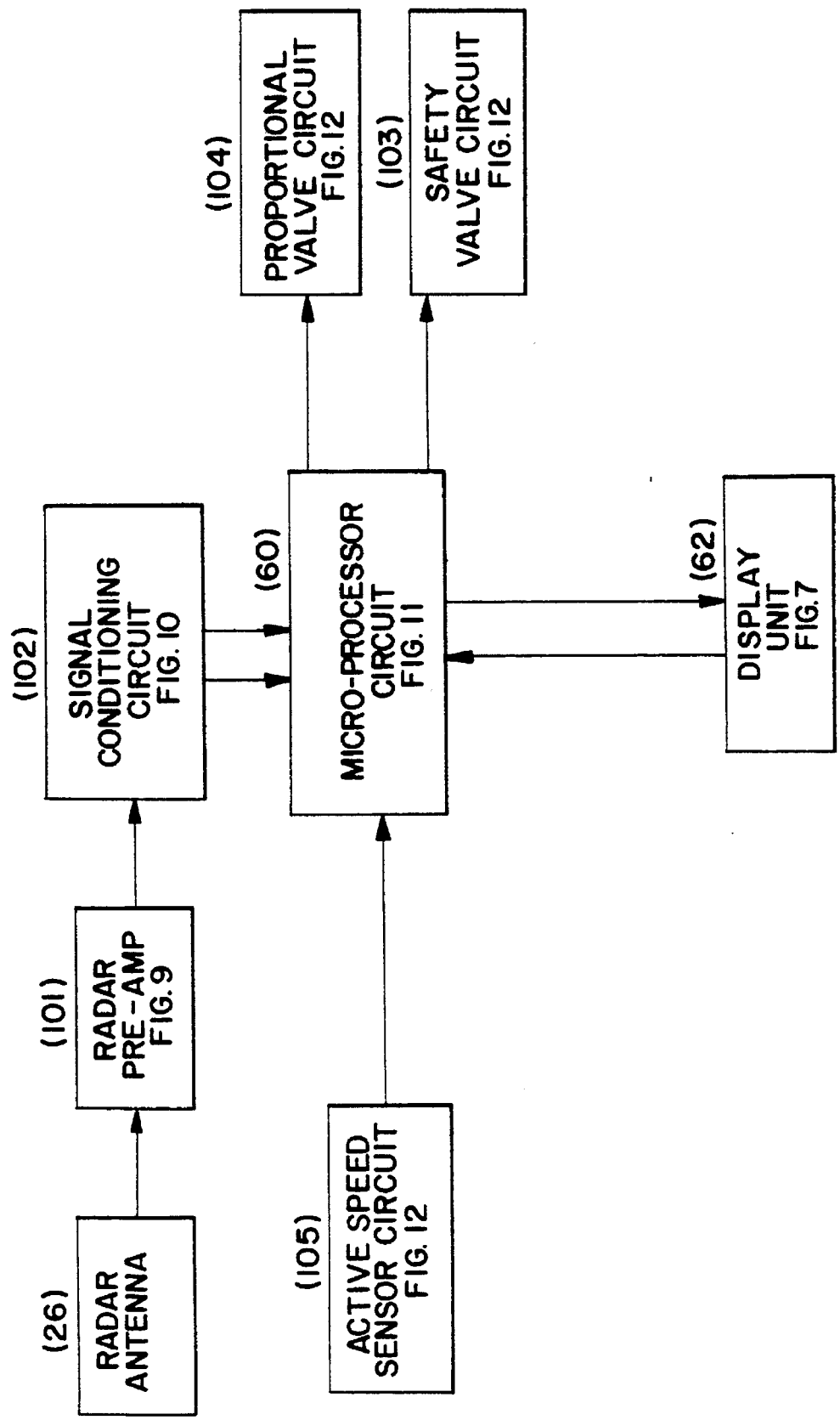
FIG. 13 is a block diagram illustrating the electrical systems in the described embodiment, and the electrical communications between those electrical systems.
Figure 14:
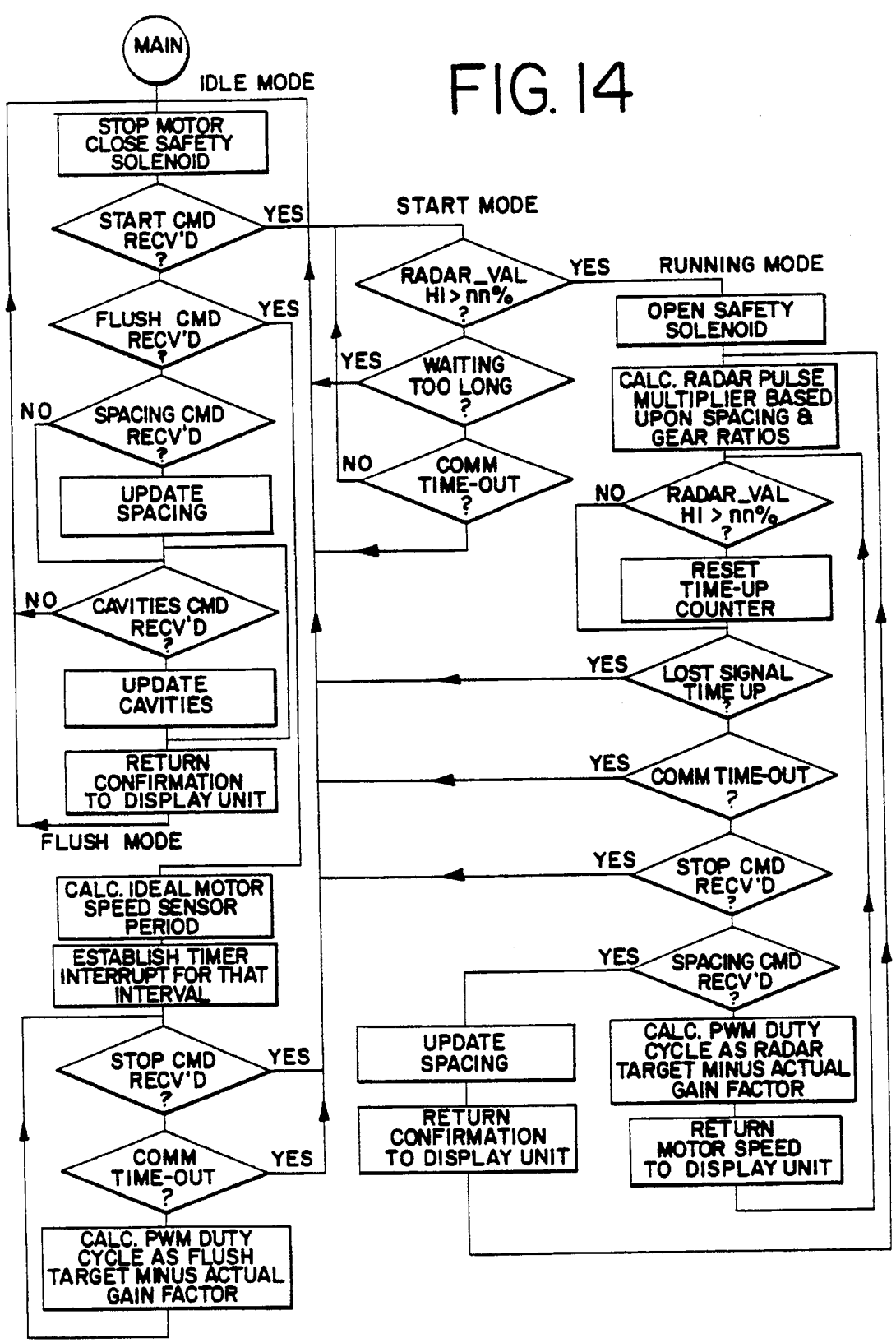
FIG. 14 is a flow chart schematic for the microprocessor, illustrating generally the logic of the computer code utilized in conjunction with the described embodiment.

Referring to FIGS. 11, 12, and 13 in the described embodiment, the microprocessor 60 signals the hydraulic proportional valve 44 by causing the output via the hydraulic proportional valve output circuit 104 to be a PWM signal with a frequency of around 1 KHz and the duty cycle varied as required. The output circuitry for the hydraulic proportional valve 44 and the safety valve 45 (circuits 104 and 103, respectively), are similar, except that the hydraulic proportional valve output circuit 104 includes a current sensing shunt resistor in order to permit the microprocessor 60 to monitor the valve current. Both output circuits utilize N-channel Field Effect Transistors ("FETs") for low-side switching of the valves. The active speed sensor input circuit 105 utilizes a hysteresis comparator to square up the signal and reduce the effect of electrical noise. Those skilled in the art will recognize that input/output circuits other than those specifically illustrated and discussed herein can be utilized without departing from the teachings of the invention.

For purposes of describing a specific embodiment of the invention, the following includes an exemplary program for the microprocessor 60 of this invention, reproduced as a source statement, including comments as appropriate.

-41-

```
Freeware assembler ASxx.EXE Ver 1.03.
0142                                            OPT    1
0143                                            OPT    1
0144 0000                                       ORG    $0000
0145
0146 0000 ff ff ff ff ff ff                     FILL   $FF,$F000-*
          ff ff ff ff ff ff
          ff ff ff ff ff ff
          ff ff ff ff ff ff
          ff ff ff ff ff ff
          ff ff ff ff ff ff
          ff ff ff ff ff ff
          ff ff ff ff ff ff
          ff ff ff ff ff ff
          ff ff ff ff ff ff
          ff ff ff ff
0147 f000                                       ORG    $F000
0148
0149 f000 8e 00 ff     [ 3 ] RMAIN              LDS    #$00FF
0150 f003 86 00        [ 2 ]                    LDAA   #$00
0151 f005 b7 10 3d     [ 4 ]                    STAA   INIT
0152 f008 97 24        [ 3 ]                    STAA   TMSK2
0153 f00a 97 35        [ 3 ]                    STAA   BPROT
0154 f00c 14 26 89     [ 6 ]                    BSET   PACTL $89    ; DDRA3|DDRA7  $26 $88
0155 f00f 14 00 a8     [ 6 ]                    BSET   PORTA $A8
0156 f012 86 3f        [ 2 ]                    LDAA   #$3F
0157 f014 97 09        [ 3 ]                    STAA   DDRD    ; $09
0158 f016 86 1f        [ 2 ]                    LDAA   #$1F
0159 f018 97 08        [ 3 ]                    STAA   PORTD   ; $08
0160 f01a 86 30        [ 2 ]                    LDAA   #$30
0161 f01c 97 2b        [ 3 ]                    STAA   BAUD    ; $2B
0162 f01e 86 0c        [ 2 ]                    LDAA   #$0C
0163 f020 97 2d        [ 3 ]                    STAA   SCCR2   ; $2D
0164 f022 7e f0 73     [ 3 ]                    JMP    MAin
0165                                       ;    JMP    boot
0166 f025 18 ce 40 00  [ 4 ] boot               LDY    #$4000
0167                         LP1
0168 f029 15 08 08     [ 6 ]                    BCLR   PORTD #$08
0169 f02c 14 08 08     [ 6 ]                    BSET   PORTD #$08
0170 f02f 13 2e 20 f6  [ 6 ]                    BRCLR  SCSR RDRF LP1
0171 f033 d6 2f        [ 3 ]                    LDAB   SCDR
0172 f035 5c           [ 2 ]                    INCB
0173 f036 d7 50        [ 3 ]                    STAB   $0050
0174 f038 d7 52        [ 3 ]                    STAB   $0052
0175 f03a 13 2e 20 fc  [ 6 ] LP3                BRCLR  SCSR RDRF LP3
0176 f03e d6 2f        [ 3 ]                    LDAB   SCDR
0177 f040 d7 51        [ 3 ]                    STAB   $0051
0178 f042 d7 53        [ 3 ]                    STAB   $0053
0179 f044 13 2e 20 fc  [ 6 ] LP2                BRCLR  SCSR RDRF LP2
0180 f048 96 2f        [ 3 ]                    LDAA   SCDR
0181 f04a 18 a7 00     [ 5 ]                    STAA   0,Y
0182 f04d 18 08        [ 4 ]                    INY
0183 f04f 7a 00 51     [ 6 ]                    DEC    $0051
0184 f052 26 f0        [ 3 ]                    BNE    LP2
0185 f054 7a 00 50     [ 6 ]                    DEC    $0050
0186 f057 26 eb        [ 3 ]                    BNE    LP2
0187 f059 dc 52        [ 4 ]                    LDD    $0052
0188 f05b c3 40 00     [ 4 ]                    ADDD   #$4000
0189 f05e dd 52        [ 4 ]                    STD    $0052
0190 f060 96 52        [ 3 ]                    LDAA   $0052
0191 f062 13 2e 80 fc  [ 6 ] LP6                BRCLR  SCSR TDRE LP6
0192 f066 97 2f        [ 3 ]                    STAA   SCDR
0193 f068 96 53        [ 3 ]                    LDAA   $0053
0194 f06a 13 2e 80 fc  [ 6 ] LP7                BRCLR  SCSR TDRE LP7
0195 f06e 97 2f        [ 3 ]                    STAA   SCDR
0196 f070 7e 40 00     [ 3 ]                    JMP    $4000
0197
```

```
0198
0199                                    MAin
0200  f073 bd f4 39      [ 6 ]          JSR      ROMCHK
0201  f076 bd f1 b0      [ 6 ]          JSR      INITIAL
0202  f079 bd f3 ed      [ 6 ]          JSR      RMUPDT
0203  f07c cc 07 00      [ 3 ]          LDD      #$0700
0204  f07f dd a5         [ 4 ]          STD      SMOD
0205  f081 cc 01 00      [ 3 ]          LDD      #$0100
0206  f084 dd 76         [ 4 ]          STD      VMOD
0207  f086 86 08         [ 2 ]          LDAA     #$08
0208  f088 97 a3         [ 3 ]          STAA     VTGT
0209  f08a 86 00         [ 2 ]          LDAA     #00
0210  f08c 97 82         [ 3 ]          STAA     TXCMDBUF
0211  f08e 97 84         [ 3 ]          STAA     TXDATBUF
0212
0213                                ;                                   COMMAND
0214  0001                          CMD_CAV     EQU      DEFINITIONS
0215  0002                          CMD_SPC     EQU      01h
0216  0003                          CMD_ERRS    EQU      02h
0217  0004                          CMD_BARS    EQU      03h
0218  0005                          CMD_IDLE    EQU      04h
0219  0006                          CMD_STOP    EQU      05h
0220  0007                          CMD_FLUSH   EQU      06h
0221  0008                          CMD_MODE    EQU      07h
0222  0009                          CMD_START   EQU      08h
0223  000a                          CMD_SETUP   EQU      09h
0224  000b                          CMD_CAL     EQU      0Ah
0225  000c                          CMD_FL_SPD  EQU      0Bh
0226                                                     0Ch
0227
0228                                IDLE
                                    ;                                    LDAA
                                                    #$99    ;
                                                    ENABLE TOC1 & TOC4 & TOC5
                                                    ints
0229  f090 86 00         [ 2 ]          LDAA     #$00
                                                    ;
                                                    ENABLE TOC1 & TOC4 & TOC5
                                                    ints
0230  f092 97 22         [ 3 ]          STAA     TMSK1
0231                                ;                                    LDAA
                                                    #$60    * OC1 controls
                                                    OC2/PA6 & OC3/PA5
0232  f094 86 00         [ 2 ]          LDAA     #$00     * OC1 controls
                                                    OC2/PA6 & OC3/PA5
0233  f096 97 0c         [ 3 ]          STAA     OC1M
0234  f098 1d 00 3c      [ 7 ]          BCLR     PORTA,$60
0235  f09b 13 a1 08 f1   [ 6 ]          BRCLR    QFLAGS TXOK IDLE
0236                                ;   BSET     PORTD $08
0237  f09f 15 a1 08      [ 6 ]          BCLR     QFLAGS TXOK
0238  f0a2 96 81         [ 3 ]          LDAA     RXCMDBUF
0239
0240                                ;   BCLR     PORTD $08
0241  f0a4 81 06         [ 2 ]          CMPA     #CMD_STOP
0242  f0a6 26 0e         [ 3 ]          BNE      IDLE1
0243  f0a8 bd f4 04      [ 6 ]          JSR      EEUPDT
0244  f0ab 96 06         [ 3 ]          LDAA     CMD_STOP
0245  f0ad 97 82         [ 3 ]          STAA     TXCMDBUF
0246  f0af 96 81         [ 3 ]          LDAA     RXCMDBUF
0247  f0b1 97 84         [ 3 ]          STAA     TXDATBUF
0248  f0b3 7e f0 90      [ 3 ]          JMP      IDLE
0249                                IDLE1
0250  f0b6 81 09         [ 2 ]          CMPA     #CMD_START
0251  f0b8 26 06         [ 3 ]          BNE      IDLE2
0252  f0ba bd f4 04      [ 6 ]          JSR      EEUPDT
0253  f0bd 7e f6 20      [ 3 ]          JMP      RUN
0254                                IDLE2
0255  f0c0 81 07         [ 2 ]          CMPA     #CMD_FLUSH
0256  f0c2 26 03         [ 3 ]          BNE      IDLE3
0257  f0c4 7e f1 4f      [ 3 ]          JMP      FLUSH
0258
0259  f0c7 81 02         [ 2 ] IDLE3    CMPA     #CMD_SPC
0260  f0c9 26 14         [ 3 ]          BNE      IDLE4
```

```
0261 f0cb 96 83         [ 3 ]              LDAA    RXDATBUF
0262 f0cd 26 03         [ 3 ]              BNE     IDLE3A
0263 f0cf b6 b6 20      [ 4 ]              LDAA    $B620
0264 f0d2 97 85         [ 3 ] IDLE3A       STAA    SPACE
0265 f0d4 96 02         [ 3 ]              LDAA    CMD_SPC
0266 f0d6 97 82         [ 3 ]              STAA    TXCMDBUF
0267 f0d8 96 85         [ 3 ]              LDAA    SPACE
0268 f0da 97 84         [ 3 ]              STAA    TXDATBUF
0269 f0dc 7e f0 90      [ 3 ]              JMP     IDLE
0270
0271 f0df 81 01         [ 2 ] IDLE4        CMPA    #CMD_CAV
0272 f0e1 26 14         [ 3 ]              BNE     IDLE5
0273 f0e3 96 83         [ 3 ]              LDAA    RXDATBUF
0274 f0e5 26 03         [ 3 ]              BNE     IDLE4A
0275 f0e7 b6 b6 21      [ 4 ]              LDAA    $B621
0276 f0ea 97 86         [ 3 ] IDLE4A       STAA    CAVITY
0277 f0ec 96 01         [ 3 ]              LDAA    CMD_CAV
0278 f0ee 97 82         [ 3 ]              STAA    TXCMDBUF
0279 f0f0 96 86         [ 3 ]              LDAA    CAVITY
0280 f0f2 97 84         [ 3 ]              STAA    TXDATBUF
0281 f0f4 7e f0 90      [ 3 ]              JMP     IDLE
0282
0283 f0f7 81 05         [ 2 ] IDLE5        CMPA    #CMD_IDLE
0284 f0f9 26 07         [ 3 ]              BNE     IDLE6
0285 f0fb 86 05         [ 2 ]              LDAA    #CMD_IDLE
0286 f0fd 97 82         [ 3 ]              STAA    TXCMDBUF
0287 f0ff 7e f0 90      [ 3 ]              JMP     IDLE
0288 f102 81 4f         [ 2 ] IDLE6        CMPA    #$4F
0289 f104 23 2e         [ 3 ]              BLS     IDLE7
0290 f106 81 58         [ 2 ]              CMPA    #$58
0291 f108 24 3d         [ 3 ]              BHS     IDLEX
0292 f10a 97 82         [ 3 ]              STAA    TXCMDBUF
0293 f10c d6 83         [ 3 ]              LDAB    RXDATBUF
0294 f10e 26 11         [ 3 ]              BNE     IDLE6A
0295 f110 16            [ 2 ]              TAB
0296 f111 4f            [ 2 ]              CLRA
0297 f112 c0 50         [ 2 ]              SUBB    #$50
0298 f114 c3 b6 22      [ 4 ]              ADDD    #$B622
0299 f117 18 8f         [ 4 ]              XGDY
0300 f119 18 e6 00      [ 5 ]              LDAB    0,Y
0301 f11c d7 84         [ 3 ]              STAB    TXDATBUF
0302 f11e 7e f0 90      [ 3 ]              JMP     IDLE
0303                                IDLE6A
0304 f121 16            [ 2 ]              TAB
0305 f122 4f            [ 2 ]              CLRA
0306 f123 c0 50         [ 2 ]              SUBB    #$50
0307 f125 c3 00 87      [ 4 ]              ADDD    #SPACE+2
0308 f128 18 8f         [ 4 ]              XGDY
0309 f12a 96 83         [ 3 ]              LDAA    RXDATBUF
0310 f12c 18 a7 00      [ 5 ]              STAA    0,Y
0311 f12f 97 84         [ 3 ]              STAA    TXDATBUF
0312 f131 7e f0 90      [ 3 ]              JMP     IDLE
0313 f134 81 0a         [ 2 ] IDLE7        CMPA    #CMD_SETUP
0314 f136 26 0f         [ 3 ]              BNE     IDLEX
0315 f138 97 82         [ 3 ]              STAA    TXCMDBUF
0316 f13a 86 08         [ 2 ]              LDAA    #8
0317 f13c 13 00 01 02   [ 6 ]              BRCLR   PORTA $01 IDLE7A
0318 f140 86 00         [ 2 ]              LDAA    #0
0319 f142 97 84         [ 3 ] IDLE7A       STAA    TXDATBUF
0320 f144 7e f0 90      [ 3 ]              JMP     IDLE
0321                                IDLEX
0322 f147 4f            [ 2 ]              CLRA
0323 f148 97 84         [ 3 ]              STAA    TXDATBUF
0324 f14a 97 82         [ 3 ]              STAA    TXCMDBUF
0325 f14c 7e f0 90      [ 3 ]              JMP     IDLE
0326
0327                                FLUSH
0328 f14f 96 87         [ 3 ]              LDAA    FL_SPD
0329 f151 bd f4 8c      [ 6 ]              JSR     DIVIDE
0330 f154 dd 50         [ 4 ]              STD     XEND
0331 f156 cc 00 00      [ 3 ]              LDD     #0
0332 f159 dd 66         [ 4 ]              STD     SPEED+2
```

```
0333 f15b dd 64          [ 4 ]              STD      SPEED+0
0334 f15d dd 71          [ 4 ]              STD      MOTOR+2
0335 f15f dd 6f          [ 4 ]              STD      MOTOR+0
0336 f161 86 b9          [ 2 ]              LDAA     #$B9 ;
                                                     ENABLE TOC1 & TOC4 & TOC5
                                                     ints
0337 f163 97 22          [ 3 ]              STAA     TMSK1
0338 f165 86 60          [ 2 ]              LDAA     #$60    * OC1 controls
                                                     OC2/PA6 & OC3/PA5
0339 f167 97 0c          [ 3 ]              STAA     OC1M
0340 f169 86 ff          [ 2 ]              LDAA     #$FF
0341 f16b 97 5e          [ 3 ]              STAA     SCNT
0342 f16d 96 8c          [ 3 ]              LDAA     SOLDUTY
0343 f16f c6 14          [ 2 ]              LDAB     #20
0344 f171 3d             [10 ]              MUL
0345 f172 dd 5f          [ 4 ]              STD      CUTBACK
0346 f174 cc 7f 00       [ 3 ]              LDD      #$7F00
0347 f177 dd a5          [ 4 ]              STD      SMOD
0348 f179 1c 00 3c       [ 7 ]              BSET     PORTA,$60
0349                                 FLUSHLP
0350 f17c 7d 00 63       [ 6 ]              TST      COM_CNT
0351 f17f 27 2c          [ 3 ]              BEQ      FLUEXIT
0352                                 ;                                   LDD
0353                                 ;               #$0CAB   185 RPM
                                                                         STD
                                                     XEND
0354 f181 dc 65          [ 4 ]              LDD      SPEED+1
0355 f183 93 70          [ 5 ]              SUBD     MOTOR+1
0356 f185 05             [ 3 ]              LSLD
0357
0358                                 ;                                   LSLD
0359 f186 05             [ 3 ]              LSLD                         LSLD
0360 f187 05             [ 3 ]              LSLD
0361 f188 2b 18          [ 3 ]              BMI      FLUSHM
0362 f18a 1a 83 06 80    [ 5 ] FLUSH1       CPD      #$0680
0363 f18e 23 0c          [ 3 ]              BLS      FLUSH2
0364 f190 dc 70          [ 4 ]              LDD      MOTOR+1
0365 f192 c3 06 80       [ 4 ]              ADDD     #$0680
0366 f195 dd 65          [ 4 ]              STD      SPEED+1
0367 f197 cc 06 80       [ 3 ]              LDD      #$0680
0368 f19a 20 09          [ 3 ]              BRA      FLUSH3
0369 f19c 1a 83 00 64    [ 5 ] FLUSH2       CPD      #$0064
0370 f1a0 24 03          [ 3 ]              BHS      FLUSH3
0371 f1a2 cc 00 64       [ 3 ] FLUSHM       LDD      #$0064
0372 f1a5 dd 76          [ 4 ] FLUSH3       STD      VMOD
0373 f1a7 96 81          [ 3 ]              LDAA     RXCMDBUF
0374 f1a9 81 c6          [ 2 ]              CMPA     #CMD_STOP
0375 f1ab 26 cf          [ 3 ]              BNE      FLUSHLP
0376 f1ad 7e f0 90       [ 3 ] FLUEXIT      JMP      IDLE
0377
0378 f1b0 86 68          [ 2 ] INITIAL      LDAA     #$68
0379 f1b2 97 26          [ 3 ]              STAA     PACTL   ;
                                                     DDRA3|DDRA7  $26 $88
0380 f1b4 86 3f          [ 2 ]              LDAA     #$3F
0381 f1b6 97 09          [ 3 ]              STAA     DDRD    ;
                                                     $09
0382                                 ;
                                                     #$1F                LDAA
0383 f1b8 86 0f          [ 2 ]              LDAA     #$0F
0384 f1ba 97 08          [ 3 ]              STAA     PORTD   ;
                                                     $08
0385 f1bc 7f 00 40       [ 6 ]              CLR      RXPTR
0386 f1bf 97 28          [ 3 ]              STAA     SPCR
0387 f1c1 86 0c          [ 2 ]              LDAA     #$0C
0388 f1c3 97 2d          [ 3 ]              STAA     SCCR2
0389 f1c5 86 31          [ 2 ]              LDAA     #$31    4800
0390                                 ;                                   LDAA
                                                     #$32    2400
0391                                                                     LDAA
                                                     #$30    9600
0392 f1c7 97 2b          [ 3 ]              STAA     BAUD    ;
                                                     $2B
```

```
0393 f1c9 96 2e         [ 3 ]       LDAA    SCSR
0394 f1cb 96 2f         [ 3 ]       LDAA    SCDR
0395 f1cd 14 2d 20      [ 6 ]       BSET    SCCR2 #RIE
0396                                ;       LDAA    #$11
0397 f1d0 86 13         [ 2 ]       LDAA    #$13        ; 1-23-95
                                            RISING OR FALLING EDGE
0398 f1d2 97 21         [ 3 ]       STAA    TCTL2
0399 f1d4 86 c0         [ 2 ]       LDAA    #$C0        ; ENABLE RTI &
                                                          TOV, DISABLE PA INTS
0400 f1d6 97 24         [ 3 ]       STAA    TMSK2
0401                                ;                                       LDAA
                                            #$88        ;
0402 f1d8 86 bd         [ 2 ]       LDAA    ENABLE TOC1 & TOC5 ints
                                            #$BD        ;
                                            ENABLE TOC1 & TOC4 & TOC5
                                            ints
0403 f1da 97 22         [ 3 ]       STAA    TMSK1
0404 f1dc 86 a0         [ 2 ]       LDAA    #$A0        ;
                                            OC2=0 ON COMPARE
0405 f1de 97 20         [ 3 ]       STAA    TCTL1
0406 f1e0 86 60         [ 2 ]       LDAA    #$60        * OC1 controls
                                            OC2/PA6 & OC3/PA5
0407 f1e2 97 0c         [ 3 ]       STAA    OC1M
0408 f1e4 86 60         [ 2 ]       LDAA    #$60        * OC1 puts 1 TO
                                            OC2, 1 TO OC3
0409 f1e6 97 0d         [ 3 ]       STAA    OC1D
0410 f1e8 86 0b         [ 2 ]       LDAA    #$0B
0411 f1ea 97 3c         [ 3 ]       STAA    HPRIO
0412 f1ec 14 39 80      [ 6 ]       BSET    OPTION $80
0413                    ********** START TIMERS IN A KNOWN STATE
                                    **************
0414 f1ef 96 0e         [ 3 ]       LDAA    TCNT
0415 f1f1 5f            [ 2 ]       CLRB
0416 f1f2 84 e0         [ 2 ]       ANDA    #$E0        ;
                                            RTI COMES FROM 2^13 TAP
0417 f1f4 8b 44         [ 2 ]       ADDA    #$44        ;
                                            START TOC1 SO THAT ALL
0418 f1f6 dd 16         [ 4 ]       STD     TOC1        ;
                                            RTI'S OCCUR @ THE 50% MARK
0419 f1f8 c3 10 00      [ 4 ]       ADDD    #$1000      ;
                                            START OTHER TOC'S LATER
0420 f1fb dd 1a         [ 4 ]       STD     TOC3
0421 f1fd dd 1c         [ 4 ]       STD     TOC4
0422 f1ff dd 1e         [ 4 ]       STD     TOC5
0423 f201 86 40         [ 2 ]       LDAA    #$40
0424 f203 97 25         [ 3 ]       STAA    TFLG2
0425 f205 86 ff         [ 2 ]       LDAA    #$FF
0426 f207 97 23         [ 3 ]       STAA    TFLG1
0427
0428 f209 cc 01 00      [ 3 ]       LDD     #$0100
0429 f20c dd 76         [ 4 ]       STD     VMOD
0430 f20e 04            [ 3 ]       LSRD
0431 f20f dd 78         [ 4 ]       STD     VMOD2
0432 f211 04            [ 3 ]       LSRD
0433 f212 04            [ 3 ]       LSRD
0434 f213 04            [ 3 ]       LSRD
0435 f214 cc 00 00      [ 3 ]       LDD     #0
0436 f217 dd 7a         [ 4 ]       STD     DITHER
0437
0438 f219 0e            [ 2 ]       CLI
0439
0440 f21a cc 00 00      [ 3 ]       LDD     #0
0441 f21d dd 8f         [ 4 ]       STD     ADRES1
0442 f21f dd 91         [ 4 ]       STD     ADRES2
0443 f221 dd 93         [ 4 ]       STD     ADRES3
0444 f223 dd 95         [ 4 ]       STD     ADRES4
0445 f225 dd 97         [ 4 ]       STD     ADRES5
0446 f227 dd 99         [ 4 ]       STD     ADRES6
0447 f229 dd 9b         [ 4 ]       STD     ADRES7
0448 f22b dd 9d         [ 4 ]       STD     ADRES8
0449 f22d dd 6f         [ 4 ]       STD     MOTOR
0450 f22f dd 6b         [ 4 ]       STD     RADAR
```

```
0451 f231 dd 71      [ 4 ]              STD      MOTOR+2
0452 f233 dd 6d      [ 4 ]              STD      RADAR+2
0453 f235 15 08 10   [ 6 ]              BCLR     PORTD #$10
0454 f238 15 08 08   [ 6 ]              BCLR     PORTD #$08
0455 f23b 86 00      [ 2 ]              LDAA     #$00
0456 f23d 97 30      [ 3 ]              STAA     ADCTL
0457 f23f 39         [ 5 ]              RTS
0458
0459 f240 13 2e 80 fc [ 6 ] TX4          BRCLR    SCSR TDRE TX4
0460 f244 97 2f       [ 3 ]              STAA     SCDR
0461 f246 13 2e 80 fc [ 6 ] TXB          BRCLR    SCSR TDRE TXB
0462 f24a d7 2f       [ 3 ]              STAB     SCDR
0463 f24c 39          [ 5 ]              RTS
0464 f24d 13 2e 80 fc [ 6 ] TX           BRCLR    SCSR TDRE TX
0465 f251 97 2f       [ 3 ]              STAA     SCDR
0466 f253 39          [ 5 ]              RTS
0467 f254 13 2e 20 fc [ 6 ] RX           BRCLR    SCSR RDRF RX
0468 f258 96 2f       [ 3 ]              LDAA     SCDR
0469 f25a 39          [ 5 ]              RTS
0470
0471 f25b 96 86       [ 3 ] M_TICKS      LDAA     CAVITY
0472 f25d d6 85       [ 3 ]              LDAB     SPACE
0473 f25f 3d          [10 ]              MUL
0474 f260 96 a4       [ 3 ]              LDAA     CAL
0475 f262 3d          [10 ]              MUL
0476 f263 dd 54       [ 4 ]              STD      TEMP1
0477 f265 05          [ 3 ]              LSLD
0478 f266 d3 54       [ 5 ]              ADDD     TEMP1
0479 f268 39          [ 5 ]              RTS
0480
0481
0482 f269 12 2d 40 61 [ 6 ] SCI_INT      BRSET    SCCR2 #TCIE TXINT
0483 f26d 13 2e 20 0d [ 6 ]              BRCLR    SCSR RDRF RXINTX
0484 f271 96 2e       [ 3 ]              LDAA     SCSR
0485 f273 96 2f       [ 3 ]              LDAA     SCDR
0486 f275 0e          [ 2 ]              CLI
0487 f276 81 d6       [ 2 ]              CMPA     #$D6
0488 f278 26 05       [ 3 ]              BNE      RXINT1
0489 f27a 86 07       [ 2 ]              LDAA     #$07
0490 f27c 97 40       [ 3 ]              STAA     RXPTR
0491 f27e 3b          [12 ] RXINTX       RTI
0492                        RXINT1
0493 f27f 13 40 07 13 [ 6 ]              BRCLR    RXPTR #07 RXINTZ
0494 f283 12 40 07 13 [ 6 ]              BRSET    RXPTR #07 RXINT2
0495 f287 12 40 03 15 [ 6 ]              BRSET    RXPTR #03 RXINT3
0496 f28b c6 d6       [ 2 ]              LDAB     #$0D6
0497 f28d db 81       [ 3 ]              ADDB     RXCMDBUF
0498 f28f db 83       [ 3 ]              ADDB     RXDATBUF
0499 f291 c4 7f       [ 2 ]              ANDB     #$7F
0500 f293 11          [ 2 ]              CBA
0501 f294 27 10       [ 3 ]              BEQ      RXINTOK
0502 f296 7f 00 40    [ 6 ] RXINTZ       CLR      RXPTR
0503 f299 3b          [12 ]              RTI
0504 f29a 97 81       [ 3 ] RXINT2       STAA     RXCMDBUF
0505 f29c 15 40 04    [ 6 ]              BCLR     RXPTR #04
0506 f29f 3b          [12 ]              RTI
0507 f2a0 97 83       [ 3 ] RXINT3       STAA     RXDATBUF
0508 f2a2 15 40 06    [ 6 ]              BCLR     RXPTR #06
0509 f2a5 3b          [12 ]              RTI
0510 f2a6 7f 00 40    [ 6 ] RXINTOK      CLR      RXPTR
0511 f2a9 96 2e       [ 3 ]              LDAA     SCSR
0512 f2ab 96 2f       [ 3 ]              LDAA     SCDR
0513 f2ad 15 2d 28    [ 6 ]              BCLR     SCCR2 #RIE|$08
0514                        ;                              LDAA
                                                           #$7A
0515 f2b0 86 f4       [ 2 ]              LDAA     #$F4
0516 f2b2 97 63       [ 3 ]              STAA     COM_CNT
0517 f2b4 97 2f       [ 3 ]              STAA     SCDR
0518 f2b6 0e          [ 2 ]              CLI
0519 f2b7 86 d0       [ 2 ]              LDAA     #$D0
0520 f2b9 4a          [ 2 ] RXINTDLY     DECA
0521 f2ba 26 fd       [ 3 ]              BNE      RXINTDLY
```

```
0522 f2bc 14 2d 48        [ 6 ]              BSET    SCCR2 #TCIE|S08
0523 f2bf 14 08 20        [ 6 ]              BSET    PORTD #$20
0524 f2c2 14 a1 04        [ 6 ]              BSET    QFLAGS RXOK
0525 f2c5 86 ff           [ 2 ]              LDAA    #$FF
0526 f2c7 97 2f           [ 3 ]              STAA    SCDR
0527 f2c9 86 0f           [ 2 ]              LDAA    #$0F
0528 f2cb 97 41           [ 3 ]              STAA    TXPTR
0529 f2cd 3b              [12 ]              RTI
0530
0531                                 TXINT
0532 f2ce 96 2e           [ 3 ]              LDAA    SCSR
0533 f2d0 13 41 0f 35     [ 6 ]              BRCLR   TXPTR #$0F TXINTX
0534 f2d4 12 41 0f 19     [ 6 ]              BRSET   TXPTR #$0F TXINT1
0535 f2d8 12 41 07 1d     [ 6 ]              BRSET   TXPTR #$07 TXINT2
0536 f2dc 12 41 03 21     [ 6 ]              BRSET   TXPTR #$03 TXINT3
0537 f2e0 7f 00 41        [ 6 ]              CLR     TXPTR
0538 f2e3 86 d9           [ 2 ]              LDAA    #$D9
0539 f2e5 9b 82           [ 3 ]              ADDA    TXCMDBUF
0540 f2e7 9b 84           [ 3 ]              ADDA    TXDATBUF
0541 f2e9 84 7f           [ 2 ]              ANDA    #$7F
0542 f2eb 97 2f           [ 3 ]              STAA    SCDR
0543 f2ed 14 a1 08        [ 6 ]              BSET    QFLAGS TXOK
0544 f2f0 3b              [12 ]              RTI
0545 f2f1 86 d9           [ 2 ] TXINT1       LDAA    #$D9
0546 f2f3 97 2f           [ 3 ]              STAA    SCDR
0547 f2f5 15 41 08        [ 6 ]              BCLR    TXPTR #$08
0548 f2f8 3b              [12 ]              RTI
0549 f2f9 96 82           [ 3 ] TXINT2       LDAA    TXCMDBUF
0550 f2fb 97 2f           [ 3 ]              STAA    SCDR
0551 f2fd 15 41 04        [ 6 ]              BCLR    TXPTR #$04
0552 f300 3b              [12 ]              RTI
0553 f301 96 84           [ 3 ] TXINT3       LDAA    TXDATBUF
0554 f303 97 2f           [ 3 ]              STAA    SCDR
0555 f305 15 41 02        [ 6 ]              BCLR    TXPTR #$02
0556 f308 3b              [12 ]              RTI
0557 f309 96 2f           [ 3 ] TXINTX       LDAA    SCDR
0558 f30b 14 2d 20        [ 6 ]              BSET    SCCR2 #RIE
0559 f30e 15 2d 40        [ 6 ]              BCLR    SCCR2 #TCIE
0560 f311 0e              [ 2 ]              CLI
0561 f312 86 d0           [ 2 ]              LDAA    #$D0
0562 f314 4a              [ 2 ] TXINTX1      DECA
0563 f315 26 fd           [ 3 ]              BNE     TXINTX1
0564 f317 15 08 20        [ 6 ]              BCLR    PORTD #$20
0565 f31a 3b              [12 ]              RTI
0566
0567
0568                                 MOTORINT
0569 f31b 96 08           [ 3 ]              LDAA    PORTD
0570 f31d 88 08           [ 2 ]              EORA    #$08
0571 f31f 97 08           [ 3 ]              STAA    PORTD
0572 f321 dc 71           [ 4 ]              LDD     MOTOR+2
0573                                  ;
0574 f323 c3 01 00        [ 4 ]              ADDD    #$0080
                                             ADDD    #$0100        ; 1-23-95 MOTOR
                                                                   = 30 P/REV
0575 f326 dd 71           [ 4 ]              STD     MOTOR+2
0576 f328 96 70           [ 3 ]              LDAA    MOTOR+1
0577 f32a 89 00           [ 2 ]              ADCA    #0
0578 f32c 97 70           [ 3 ]              STAA    MOTOR+1
0579 f32e 96 6f           [ 3 ]              LDAA    MOTOR
0580 f330 89 00           [ 2 ]              ADCA    #0
0581 f332 97 6f           [ 3 ]              STAA    MOTOR
0582 f334 dc 14           [ 4 ]              LDD     TIC3
0583 f336 93 7d           [ 5 ]              SUBD    OLDT
0584 f338 dd 7f           [ 4 ]              STD     DELTAT
0585 f33a dc 14           [ 4 ]              LDD     TIC3
0586 f33c dd 7d           [ 4 ]              STD     OLDT
0587 f33e 15 23 fe        [ 6 ]              BCLR    TFLG1 #$FE
0588 f341 3b              [12 ]              RTI
0589
0590                                 TOC1SVC
0591 f342 dc 76           [ 4 ]              LDD     VMOD
0592 f344 d3 7a           [ 5 ]              ADDD    DITHER
```

```
0593 f346 04        [  3 ]              LSRD
0594 f347 d3 16     [  5 ]              ADDD     TOC1
0595 f349 dd 1e     [  4 ]              STD      TOC5
0596                            TOC1B
0597 f34b dc 76     [  4 ]              LDD      VMOD
0598 f34d d3 7a     [  5 ]              ADDD     DITHER
0599 f34f d3 16     [  5 ]              ADDD     TOC1
0600 f351 dd 18     [  4 ]              STD      TOC2
0601 f353 dc a5     [  4 ]              LDD      SMOD
0602 f355 d3 16     [  5 ]              ADDD     TOC1
0603 f357 dd 1a     [  4 ]              STD      TOC3
0604 f359 96 16     [  3 ]              LDAA     TOC1
0605 f35b 8b 08     [  2 ]              ADDA     #$08
0606 f35d 97 16     [  3 ]              STAA     TOC1
0607 f35f 86 80     [  2 ]              LDAA     #$80
0608 f361 97 23     [  3 ]              STAA     TFLG1
0609 f363 3b        [ 12 ]              RTI
0610
0611
0612                            TOC5SVC
0613                ;                    BSET     PORTD $08
0614 f364 86 00     [  2 ]              LDAA     #$00
0615 f366 97 30     [  3 ]              STAA     ADCTL
0616 f368 4f        [  2 ]              CLRA
0617 f369 d6 a0     [  3 ]              LDAB     TOCCNT
0618 f36b cb 02     [  2 ]              ADDB     #2
0619 f36d d7 a0     [  3 ]              STAB     TOCCNT
0620 f36f c4 0e     [  2 ]              ANDB     #$0E
0621 f371 c3 00 8f  [  4 ]              ADDD     #ADRES1
0622 f374 8f        [  3 ]              XGDX
0623 f375 96 31     [  3 ]              LDAA     ADR1
0624 f377 a7 01     [  4 ]              STAA     1,X
0625                ;                    BCLR     PORTD $08
0626 f379 86 08     [  2 ]              LDAA     #$08
0627 f37b 97 23     [  3 ]              STAA     TFLG1
0628 f37d 3b        [ 12 ]              RTI
0629
0630                            TOC4SVC
0631 f37e dc 1c     [  4 ]              LDD      TOC4
0632 f380 d3 50     [  5 ]              ADDD     XEND
0633 f382 dd 1c     [  4 ]              STD      TOC4
0634 f384 dc 66     [  4 ]              LDD      SPEED+2
0635 f386 c3 00 40  [  4 ]              ADDD     #$0040
0636 f389 dd 66     [  4 ]              STD      SPEED+2
0637 f38b 96 65     [  3 ]              LDAA     SPEED+1
0638 f38d 89 00     [  2 ]              ADCA     #$00
0639 f38f 97 65     [  3 ]              STAA     SPEED+1
0640 f391 96 64     [  3 ]              LDAA     SPEED
0641 f393 89 00     [  2 ]              ADCA     #$00
0642 f395 97 64     [  3 ]              STAA     SPEED
0643 f397 86 10     [  2 ]              LDAA     #$10
0644 f399 97 23     [  3 ]              STAA     TFLG1
0645 f39b 3b        [ 12 ]              RTI
0646
0647 f39c 3c        [  4 ] DLY10MS      PSHX
0648 f39d ce 0d 03  [  3 ]              LDX      #$0D03
0649 f3a0 09        [  3 ] dly10msa     DEX
0650 f3a1 26 fd     [  3 ]              BNE      dly10msa
0651 f3a3 38        [  5 ]              PULX
0652 f3a4 39        [  5 ]              RTS
0653
0654 f3a5 86 02     [  2 ] WR_CAV       LDAA     #$02
0655 f3a7 97 3b     [  3 ]              STAA     PPRG
0656 f3a9 86 a5     [  2 ]              LDAA     #$A5
0657 f3ab b7 b6 01  [  4 ]              STAA     $B601
0658 f3ae 86 03     [  2 ]              LDAA     #$03
0659 f3b0 97 3b     [  3 ]              STAA     PPRG
0660 f3b2 bd f3 9c  [  6 ]              JSR      DLY10MS
0661 f3b5 7f 00 3b  [  6 ]              CLR      PPRG
0662 f3b8 39        [  5 ]              RTS
0663
0664 f3b9 86 02     [  2 ] WR_FL        LDAA     #$02
```

```
0665 f3bb 97 3b              [ 3 ]              STAA     PPRG
0666 f3bd 86 5a              [ 2 ]              LDAA     #$5A
0667 f3bf b7 b6 00           [ 4 ]              STAA     $B600
0668 f3c2 86 03              [ 2 ]              LDAA     #$03
0669 f3c4 97 3b              [ 3 ]              STAA     PPRG
0670 f3c6 bd f3 9c           [ 6 ]              JSR      DLY10MS
0671 f3c9 7f 00 3b           [ 6 ]              CLR      PPRG
0672 f3cc 39                 [ 5 ]              RTS
0673
0674 f3cd 86 06              [ 2 ] WR_CONFIG    LDAA     #$06
0675 f3cf 97 3b              [ 3 ]              STAA     PPRG
0676 f3d1 97 3f              [ 3 ]              STAA     CONFIG
0677 f3d3 86 07              [ 2 ]              LDAA     #$07
0678 f3d5 97 3b              [ 3 ]              STAA     PPRG
0679 f3d7 bd f3 9c           [ 6 ]              JSR      DLY10MS
0680 f3da 86 02              [ 2 ]              LDAA     #$02
0681 f3dc 97 3b              [ 3 ]              STAA     PPRG
0682 f3de 86 0d              [ 2 ]              LDAA     #$0D
0683 f3e0 97 3f              [ 3 ]              STAA     CONFIG
0684 f3e2 86 03              [ 2 ]              LDAA     #$03
0685 f3e4 97 3b              [ 3 ]              STAA     PPRG
0686 f3e6 bd f3 9c           [ 6 ]              JSR      DLY10MS
0687 f3e9 7f 00 3b           [ 6 ]              CLR      PPRG
0688 f3ec 39                 [ 5 ]              RTS
0689
0690 f3ed 3c                 [ 4 ] RMUPDT       PSHX
0691 f3ee ce b6 20           [ 3 ]              LDX      #$B620
0692 f3f1 18 ce 00 85        [ 4 ]              LDY      #SPACE
0693 f3f5 c6 0a              [ 2 ]              LDAB     #10
0694 f3f7 a6 00              [ 4 ] RMUPDT1      LDAA     0,X
0695 f3f9 18 a7 00           [ 5 ]              STAA     0,Y
0696 f3fc 08                 [ 3 ]              INX
0697 f3fd 18 08              [ 4 ]              INY
0698 f3ff 5a                 [ 2 ]              DECB
0699 f400 26 f5              [ 3 ]              BNE      RMUPDT1
0700 f402 38                 [ 5 ]              PULX
0701 f403 39                 [ 5 ]              RTS
0702
0703 f404 3c                 [ 4 ] EEUPDT       PSHX
0704 f405 ce b6 20           [ 3 ]              LDX      #$B620
0705 f408 18 ce 00 85        [ 4 ]              LDY      #SPACE
0706 f40c c6 0a              [ 2 ]              LDAB     #10
0707 f40e a6 00              [ 4 ] EEUPDT1      LDAA     0,X
0708 f410 18 a1 00           [ 5 ]              CMPA     0,Y
0709 f413 27 05              [ 3 ]              BEQ      EEUPDT2
0710 f415 18 a6 00           [ 5 ]              LDAA     0,Y
0711 f418 8d 41              [ 6 ]              BSR      PROGBYTE
0712 f41a 08                 [ 3 ] EEUPDT2      INX
0713 f41b 18 08              [ 4 ]              INY
0714 f41d 5a                 [ 2 ]              DECB
0715 f41e 26 ee              [ 3 ]              BNE      EEUPDT1
0716 f420 8d 02              [ 6 ]              BSR      ROMCSM
0717 f422 38                 [ 5 ]              PULX
0718 f423 39                 [ 5 ]              RTS
0719
0720 f424 ce b6 20           [ 3 ] ROMCSM       LDX      #$B620
0721 f427 86 00              [ 2 ]              LDAA     #0
0722 f429 c6 0a              [ 2 ]              LDAB     #10
0723 f42b ab 00              [ 4 ] ROMCSM1      ADDA     0,X
0724 f42d 08                 [ 3 ]              INX
0725 f42e 5a                 [ 2 ]              DECB
0726 f42f 26 fa              [ 3 ]              BNE      ROMCSM1
0727 f431 a1 00              [ 4 ]              CMPA     0,X
0728 f433 26 01              [ 3 ]              BNE      ROMCSM2
0729 f435 39                 [ 5 ]              RTS
0730 f436 8d 23              [ 6 ] ROMCSM2      BSR      PROGBYTE
0731 f438 39                 [ 5 ]              RTS
0732
0733
0734 f439 ce b6 20           [ 3 ] ROMCHK       LDX      #$B620
0735 f43c 86 00              [ 2 ]              LDAA     #0
0736 f43e c6 0a              [ 2 ]              LDAB     #10
```

```
0737 f440 ab 00          [ 4 ] ROMCHK1    ADDA    0,X
0738 f442 08             [ 3 ]            INX
0739 f443 5a             [ 2 ]            DECB
0740 f444 26 fa          [ 3 ]            BNE     ROMCHK1
0741 f446 a1 00          [ 4 ]            CMPA    0,X
0742 f448 26 01          [ 3 ]            BNE     ROMCHK2
0743 f44a 39             [ 5 ]            RTS
0744 f44b ce b6 20       [ 3 ] ROMCHK2    LDX     #$B620
0745 f44e 86 64          [ 2 ]            LDAA    #100
0746 f450 c6 0a          [ 2 ]            LDAB    #10
0747 f452 8d 07          [ 6 ] ROMCHK3    BSR     PROGBYTE
0748 f454 08             [ 3 ]            INX
0749 f455 5a             [ 2 ]            DECB
0750 f456 26 fa          [ 3 ]            BNE     ROMCHK3
0751 f458 8d ca          [ 6 ]            BSR     ROMCSM
0752 f45a 39             [ 5 ]            RTS
0753
0754 f45b 37             [ 3 ] PROGBYTE   PSHB
0755 f45c 18 3c          [ 5 ]            PSHY
0756 f45e c6 16          [ 2 ]            LDAB    #$16
0757 f460 d7 3b          [ 3 ]            STAB    PPRG
0758 f462 e7 00          [ 4 ]            STAB    0,X
0759 f464 c6 17          [ 2 ]            LDAB    #$17
0760 f466 d7 3b          [ 3 ]            STAB    PPRG
0761 f468 18 ce 10 00    [ 4 ]            LDY     #$1000
0762 f46c 18 09          [ 4 ] PROGB1     DEY
0763 f46e 26 fc          [ 3 ]            BNE     PROGB1
0764 f470 7f 00 3b       [ 6 ]            CLR     PPRG
0765
0766 f473 c6 02          [ 2 ]            LDAB    #$02
0767 f475 d7 3b          [ 3 ]            STAB    PPRG
0768 f477 a7 00          [ 4 ]            STAA    0,X
0769 f479 c6 03          [ 2 ]            LDAB    #$03
0770 f47b d7 3b          [ 3 ]            STAB    PPRG
0771 f47d 18 ce 10 00    [ 4 ]            LDY     #$1000
0772 f481 18 09          [ 4 ] PROGB2     DEY
0773 f483 26 fc          [ 3 ]            BNE     PROGB2
0774 f485 7f 00 3b       [ 6 ]            CLR     PPRG
0775 f488 18 38          [ 6 ]            PULY
0776 f48a 33             [ 4 ]            PULB
0777 f48b 39             [ 5 ]            RTS
0778
0779 f48c 97 46          [ 3 ] DIVIDE     STAA    DIVD
0780                                      LDD     #$0927
0781 f48e cc 0f 41       [ 3 ]            LDD     #$0F41
0782 f491 dd 42          [ 4 ]            STD     DIVR
0783 f493 86 c0          [ 2 ]            LDAA    #$C0
0784 f495 97 44          [ 3 ]            STAA    DIVR+2
0785 f497 cc 00 00       [ 3 ]            LDD     #00
0786 f49a dd 47          [ 4 ]            STD     DIVD+1
0787 f49c dd 4a          [ 4 ]            STD     QUO
0788 f49e 86 11          [ 2 ]            LDAA    #17
0789 f4a0 97 4d          [ 3 ]            STAA    COUNT
0790 f4a2 96 42          [ 3 ] DIVLP      LDAA    DIVR
0791 f4a4 91 46          [ 3 ]            CMPA    DIVD
0792 f4a6 22 09          [ 3 ]            BHI     SETONE
0793 f4a8 26 16          [ 3 ]            BNE     CLRONE
0794 f4aa dc 43          [ 4 ]            LDD     DIVR+1
0795 f4ac 1a 93 47       [ 6 ]            CPD     DIVD+1
0796 f4af 25 0f          [ 3 ]            BLO     CLRONE
0797 f4b1 dc 43          [ 4 ] SETONE     LDD     DIVR+1
0798 f4b3 93 47          [ 5 ]            SUBD    DIVD+1
0799 f4b5 dd 43          [ 4 ]            STD     DIVR+1
0800 f4b7 96 42          [ 3 ]            LDAA    DIVR
0801 f4b9 92 46          [ 3 ]            SBCA    DIVD
0802 f4bb 97 42          [ 3 ]            STAA    DIVR
0803 f4bd 0d             [ 2 ]            SEC
0804 f4be 20 01          [ 3 ]            BRA     DIVNT
0805 f4c0 0c             [ 2 ] CLRONE     CLC
0806 f4c1 79 00 4b       [ 6 ] DIVNT      ROL     QUO+1
0807 f4c4 79 00 4a       [ 6 ]            ROL     QUO
0808 f4c7 74 00 46       [ 6 ]            LSR     DIVD
```

```
0809 f4ca 76 00 47      [ 6 ]              ROR     DIVD+1
0810 f4cd 76 00 48      [ 6 ]              ROR     DIVD+2
0811 f4d0 7a 00 4d      [ 6 ]              DEC     COUNT
0812 f4d3 26 cd         [ 3 ]              BNE     DIVLP
0813 f4d5 dc 4a         [ 4 ]              LDD     QUO
0814 f4d7 39            [ 5 ]              RTS
0815
0816 f4d8 3d            [10 ] RSDIVIDE     MUL
0817 f4d9 05            [ 3 ]              LSLD
0818 f4da 05            [ 3 ]              LSLD
0819 f4db 05            [ 3 ]              LSLD
0820 f4dc 05            [ 3 ]              LSLD
0821 f4dd dd 46         [ 4 ]              STD     DIVD
0822 f4df cc 00 00      [ 3 ]              LDD     #$00
0823 f4e2 dd 48         [ 4 ]              STD     DIVD+2
0824 f4e4 cc 00 96      [ 3 ]              LDD     #$0096
0825 f4e7 dd 42         [ 4 ]              STD     DIVR
0826 f4e9 cc c9 fa      [ 3 ]              LDD     #$C9FA
0827 f4ec dd 44         [ 4 ] RSTDIV       STD     DIVR+2
0828 f4ee cc 00 00      [ 3 ]              LDD     #00
0829 f4f1 dd 4a         [ 4 ]              STD     QUO
0830 f4f3 dd 4b         [ 4 ]              STD     QUO+1
0831 f4f5 86 17         [ 2 ]              LDAA    #23
0832 f4f7 97 4d         [ 3 ]              STAA    COUNT
0833                          RSDIVLP
0834 f4f9 dc 42         [ 4 ]              LDD     DIVR
0835 f4fb 1a 93 46      [ 6 ]              CPD     DIVD
0836 f4fe 22 09         [ 3 ]              BHI     RSSETONE
0837 f500 26 1c         [ 3 ]              BNE     RSCLRONE
0838 f502 dc 44         [ 4 ]              LDD     DIVR+2
0839 f504 1a 93 48      [ 6 ]              CPD     DIVD+2
0840 f507 25 15         [ 3 ]              BLO     RSCLRONE
0841 f509 dc 44         [ 4 ] RSSETONE     LDD     DIVR+2
0842 f50b 93 48         [ 5 ]              SUBD    DIVD+2
0843 f50d dd 44         [ 4 ]              STD     DIVR+2
0844 f50f 96 43         [ 3 ]              LDAA    DIVR+1
0845 f511 92 47         [ 3 ]              SBCA    DIVD+1
0846 f513 97 43         [ 3 ]              STAA    DIVR+1
0847 f515 96 42         [ 3 ]              LDAA    DIVR
0848 f517 92 46         [ 3 ]              SBCA    DIVD
0849 f519 97 42         [ 3 ]              STAA    DIVR
0850 f51b 0d            [ 2 ]              SEC
0851 f51c 20 01         [ 3 ]              BRA     RSDIVNT
0852 f51e 0c            [ 2 ] RSCLRONE     CLC
0853 f51f 79 00 4c      [ 6 ] RSDIVNT      ROL     QUO+2
0854 f522 79 00 4b      [ 6 ]              ROL     QUO+1
0855 f525 79 00 4a      [ 6 ]              ROL     QUO
0856 f528 74 00 46      [ 6 ]              LSR     DIVD
0857 f52b 76 00 47      [ 6 ]              ROR     DIVD+1
0858 f52e 76 00 48      [ 6 ]              ROR     DIVD+2
0859 f531 76 00 49      [ 6 ]              ROR     DIVD+3
0860 f534 7a 00 4d      [ 6 ]              DEC     COUNT
0861 f537 26 c0         [ 3 ]              BNE     RSDIVLP
0862 f539 dc 4a         [ 4 ]              LDD     QUO
0863 f53b dd 60         [ 4 ]              STD     RAD_ADD
0864 f53d 96 4c         [ 3 ]              LDAA    QUO+2
0865 f53f 97 62         [ 3 ]              STAA    RAD_ADD+2
0866 f541 39            [ 5 ]              RTS
0867 f542 96 85         [ 3 ] M_CALC       LDAA    SPACE
0868 f544 d6 86         [ 3 ]              LDAB    CAVITY
0869 f546 3d            [10 ] RFDIVIDE     MUL
0870 f547 dd 54         [ 4 ]              STD     TEMP1
0871 f549 96 88         [ 3 ]              LDAA    RUNCAL
0872 f54b 3d            [10 ]              MUL
0873 f54c dd 55         [ 4 ]              STD     TEMP1+1
0874 f54e 96 54         [ 3 ]              LDAA    TEMP1
0875 f550 d6 88         [ 3 ]              LDAB    RUNCAL
0876 f552 3d            [10 ]              MUL
0877 f553 db 55         [ 3 ]              ADDB    TEMP1+1
0878 f555 89 00         [ 2 ]              ADCA    #0
0879 f557 dd 46         [ 4 ]              STD     DIVD
0880 f559 96 56         [ 3 ]              LDAA    TEMP1+2
```

-52-

```
0881 f55b 5f            [ 2 ]              CLRB
0882 f55c dd 48         [ 4 ]              STD    DIVD+2
0883                                ;      LDD    #$0005
0884 f55e cc 00 02      [ 3 ]              LDD    #$0002    ; 1-23-95 NEW
                                                  RATIO &15 P/REV
0885 f561 dd 42         [ 4 ]              STD    DIVR
0886                                ;      LDD    #$85CC
0887 f563 cc 4d de      [ 3 ]              LDD    #$4DDE    ; 1-23-95 NEW
                                                  RATIO & 15 P/REV
0888 f566 dd 44         [ 4 ]              STD    DIVR+2
0889 f568 7e f4 ec      [ 3 ]              JMP    RSTDIV
0890
0891
0892 f56b 86 40         [ 2 ] REALTIM      LDAA   #$40
0893 f56d 97 25         [ 3 ]              STAA   TFLG2
0894 f56f 0e            [ 2 ]              CLI
0895 f570 96 27         [ 3 ]              LDAA   PACNT
0896 f572 7f 00 27      [ 6 ]              CLR    PACNT
0897 f575 9b 5d         [ 3 ]              ADDA   VALBUF+1
0898 f577 97 5d         [ 3 ]              STAA   VALBUF+1
0899 f579 96 5c         [ 3 ]              LDAA   VALBUF+0
0900 f57b 89 00         [ 2 ]              ADCA   #0
0901 f57d 97 5c         [ 3 ]              STAA   VALBUF+0
0902 f57f 7c 00 5b      [ 6 ]              INC    VALCNT
0903 f582 7a 00 5e      [ 6 ]              DEC    SCNT
0904 f585 26 04         [ 3 ]              BNE    REALTIMA
0905 f587 dc 5f         [ 4 ]              LDD    CUTBACK
0906 f589 dd a5         [ 4 ]              STD    SMOD
0907 f58b 7d 00 63      [ 6 ] REALTIMA     TST    COM_CNT
0908 f58e 27 03         [ 3 ]              BEQ    REALTIMB
0909 f590 7a 00 63      [ 6 ]              DEC    COM_CNT
0910                          REALTIMB
0911 f593 7c 00 7c      [ 6 ]              INC    RTICNT
0912 f596 13 7c 01 08   [ 6 ]              BRCLR  RTICNT $01 RTIINT1
0913 f59a dc 76         [ 4 ]              LDD    VMOD
0914 f59c 04            [ 3 ]              LSRD
0915 f59d 04            [ 3 ]              LSRD
0916 f59e 04            [ 3 ]              LSRD
0917 f59f 04            [ 3 ]              LSRD
0918 f5a0 dd 7a         [ 4 ]              STD    DITHER
0919 f5a2 cc 00 00      [ 3 ] RTIINT1      LDD    #0
0920 f5a5 93 7a         [ 5 ]              SUBD   DITHER
0921 f5a7 dd 7a         [ 4 ]              STD    DITHER
0922 f5a9 dc 8f         [ 4 ]              LDD    ADRES1
0923 f5ab d3 91         [ 5 ]              ADDD   ADRES2
0924 f5ad d3 93         [ 5 ]              ADDD   ADRES3
0925 f5af d3 95         [ 5 ]              ADDD   ADRES4
0926 f5b1 d3 97         [ 5 ]              ADDD   ADRES5
0927 f5b3 d3 99         [ 5 ]              ADDD   ADRES6
0928 f5b5 d3 9b         [ 5 ]              ADDD   ADRES7
0929 f5b7 d3 9d         [ 5 ]              ADDD   ADRES8
0930 f5b9 04            [ 3 ]              LSRD
0931 f5ba 04            [ 3 ]              LSRD
0932 f5bb 04            [ 3 ]              LSRD
0933 f5bc d7 9f         [ 3 ]              STAB   ADRES
0934 f5be 14 a1 80      [ 6 ]              BSET   QFLAGS $80
0935 f5c1 3b            [12 ]              RTI
0936
0937                          TOC3SVC
0938                                ;                      LDD    SMCC
0939                                ;                      ADDD
0940                                ;             TOC3
                                              TOC3         STD
0941 f5c2 86 20         [ 2 ]              LDAA   #$20
0942 f5c4 97 23         [ 3 ]              STAA   TFLG1
0943 f5c6 3b            [12 ]              RTI
0944
0945 f5c7 dc 5c         [ 4 ] R_VAL        LDD    VALBUF
0946 f5c9 dd 47         [ 4 ]              STD    DIVD+1
0947 f5cb 7f 00 46      [ 6 ]              CLR    DIVD
0948 f5ce 5f            [ 2 ]              CLRB
```

-53-

```
0949 f5cf 96 5b         [  3 ]                LDAA    VALCNT
0950 f5d1 dd 42         [  4 ]                STD     DIVR
0951 f5d3 d7 44         [  3 ]                STAB    DIVR+2
0952 f5d5 d7 4c         [  3 ]                STAB    QUO+2
0953 f5d7 cc 00 00      [  3 ]                LDD     #0
0954 f5da dd 4a         [  4 ]                STD     QUO
0955 f5dc 86 11         [  2 ]                LDAA    #17
0956 f5de 97 4d         [  3 ]                STAA    COUNT
0957 f5e0 96 46         [  3 ] R_VALLP        LDAA    DIVD
0958 f5e2 91 42         [  3 ]                CMPA    DIVR
0959 f5e4 22 09         [  3 ]                BHI     R_VALONE
0960 f5e6 26 16         [  3 ]                BNE     R_VALCLR
0961 f5e8 dc 47         [  4 ]                LDD     DIVD+1
0962 f5ea 1a 93 43      [  6 ]                CPD     DIVR+1
0963 f5ed 25 0f         [  3 ]                BLO     R_VALCLR
0964 f5ef dc 47         [  4 ] R_VALONE      LDD     DIVD+1
0965 f5f1 93 43         [  5 ]                SUBD    DIVR+1
0966 f5f3 dd 47         [  4 ]                STD     DIVD+1
0967 f5f5 96 46         [  3 ]                LDAA    DIVD
0968 f5f7 92 42         [  3 ]                SBCA    DIVR
0969 f5f9 97 46         [  3 ]                STAA    DIVD
0970 f5fb 0d            [  2 ]                SEC
0971 f5fc 20 01         [  3 ]                BRA     R_VALNT
0972 f5fe 0c            [  2 ] R_VALCLR      CLC
0973 f5ff 79 00 4b      [  6 ] R_VALNT       ROL     QUO+1
0974 f602 79 00 4a      [  6 ]                ROL     QUO
0975 f605 74 00 42      [  6 ]                LSR     DIVR
0976 f608 76 00 43      [  6 ]                ROR     DIVR+1
0977 f60b 76 00 44      [  6 ]                ROR     DIVR+2
0978 f60e 7a 00 4d      [  6 ]                DEC     COUNT
0979 f611 26 cd         [  3 ]                BNE     R_VALLP
0980 f613 d6 4b         [  3 ]                LDAB    QUO+1
0981 f615 86 c9         [  2 ]                LDAA    #$C9
0982 f617 3d            [ 10 ]                MUL
0983 f618 5f            [  2 ]                CLRB
0984 f619 d7 5c         [  3 ]                STAB    VALBUF
0985 f61b d7 5d         [  3 ]                STAB    VALBUF+1
0986 f61d d7 5b         [  3 ]                STAB    VALCNT
0987 f61f 39            [  5 ]                RTS
0988
0989
0990 f620 d6 8e         [  3 ] RUN           LDAB    X8
0991 f622 4f            [  2 ]                CLRA
0992 f623 8f            [  3 ]                XGDX
0993 f624 cc 07 00      [  3 ]                LDD     #1792
0994 f627 02            [ 41 ]                IDIV
0995 f628 df b2         [  4 ]                STX     DMAX
0996 f62a bd f7 46      [  6 ]                JSR     BARC_DIV
0997 f62d bd f5 42      [  6 ]                JSR     M_CALC
0998 f630 5f            [  2 ]                CLRB
0999 f631 d7 5c         [  3 ]                STAB    VALBUF
1000 f633 d7 5d         [  3 ]                STAB    VALBUF+1
1001 f635 d7 5b         [  3 ]                STAB    VALCNT
1002 f637 15 a1 10      [  6 ] RUNLPA        BCLR    QFLAGS RUNNING
1003 f63a bd f8 74      [  6 ]                JSR     M2_CMD
1004 f63d 7f 00 9f      [  6 ]                CLR     ADRES
1005 f640 96 5b         [  3 ]                LDAA    VALCNT
1006 f642 91 8a         [  3 ]                CMPA    VALSAM
1007 f644 25 07         [  3 ]                BLO     RUNLPA1
1008 f646 bd f5 c7      [  6 ]                JSR     R_VAL
1009 f649 91 8b         [  3 ]                CMPA    VALPER
1010 f64b 24 11         [  3 ]                BHS     RUNLPA2
1011 f64d 7d 00 63      [  6 ] RUNLPA1       TST     COM_CNT
1012 f650 27 09         [  3 ]                BEQ     RUNEXIT
1013 f652 13 a1 08 e1   [  6 ]                BRCLR   QFLAGS TXOK RUNLPA
1014 f656 15 a1 08      [  6 ]                BCLR    QFLAGS TXOK
1015 f659 20 dc         [  3 ]                BRA     RUNLPA
1016 f65b 7e f0 90      [  3 ] RUNEXIT       JMP     IDLE
1017                              RUNLPA2
1018 f65e 86 ff         [  2 ]                LDAA    #$FF
1019 f660 97 5e         [  3 ]                STAA    SCNT
1020 f662 96 8c         [  3 ]                LDAA    SOLDUTY
```

```
1021 f664 c6 14           [ 2 ]            LDAB    #20
1022 f666 3d              [10 ]            MUL
1023 f667 dd 5f           [ 4 ]            STD     CUTBACK
1024 f669 cc 7f 00        [ 3 ]            LDD     #$7F00
1025 f66c dd a5           [ 4 ]            STD     SMOD
1026 f66e cc 00 60        [ 3 ]            LDD     #$0060
1027 f671 dd 76           [ 4 ]            STD     VMOD
1028 f673 86 bd           [ 2 ]            LDAA    #$BD    ;
                                                   ENABLE TOC1 & TOC4 & TOC5
                                                   ints
1029 f675 97 22           [ 3 ]            STAA    TMSK1
1030 f677 86 60           [ 2 ]            LDAA    #$60    * OC1 controls
                                                   OC2/PA6 & OC3/PA5
1031 f679 97 0c           [ 3 ]            STAA    OC1M
1032 f67b 1c 00 3c        [ 7 ]            BSET    PORTA,$60
1033 f67e bd f5 42        [ 6 ]            JSR     M_CALC
1034 f681 cc 00 00        [ 3 ]            LDD     #0
1035 f684 dd 6d           [ 4 ]            STD     RADAR+2
1036 f686 dd 6b           [ 4 ]            STD     RADAR+0
1037 f688 dd 71           [ 4 ]            STD     MOTOR+2
1038 f68a dd 6f           [ 4 ]            STD     MOTOR+0
1039                              RUNLPB
1040 f68c 13 a1 80 fc     [ 6 ]            BRCLR   QFLAGS $80 RUNLPB
1041 f690 15 a1 80        [ 6 ]            BCLR    QFLAGS $80
1042 f693 bd f8 47        [ 6 ]            JSR     M2_SPED
1043                             ;                                      JSR
                                                   M_I
1044 f696 14 a1 10        [ 6 ]            BSET    QFLAGS RUNNING
1045 f699 bd f8 74        [ 6 ]            JSR     M2_CMD
1046 f69c 7d 00 63        [ 6 ]            TST     COM_CNT
1047 f69f 27 ba           [ 3 ]            BEQ     RUNEXIT
1048 f6a1 96 5b           [ 3 ]            LDAA    VALCNT
1049 f6a3 91 8a           [ 3 ]            CMPA    VALSAM
1050 f6a5 25 15           [ 3 ]            BLO     RUNLPC
1051 f6a7 bd f5 c7        [ 6 ]            JSR     R_VAL
1052 f6aa 91 8b           [ 3 ]            CMPA    VALPER
1053 f6ac 24 0e           [ 3 ]            BHS     RUNLPC
1054 f6ae 86 00           [ 2 ]            LDAA    #$00    ;
                                                   DIS-ABLE TOC1 & TOC4 & TOC5
                                                   ints
1055 f6b0 97 22           [ 3 ]            STAA    TMSK1
1056 f6b2 86 00           [ 2 ]            LDAA    #$00    * OC1 NO LONGER
                                                   controls OC2/PA6 & OC3/PA5
1057 f6b4 97 0c           [ 3 ]            STAA    OC1M
1058 f6b6 1d 00 3c        [ 7 ]            BCLR    PORTA,$60
1059 f6b9 7e f6 37        [ 3 ]            JMP     RUNLPA
1060
1061                              RUNLPC
1062
1063 f6bc 13 a1 08 cc     [ 6 ]            BRCLR   QFLAGS TXOK RUNLPB
1064 f6c0 15 a1 08        [ 6 ]            BCLR    QFLAGS TXOK
1065                             ;                                      LDAA
                                                   SPACE
1066                             ;                                      LDAB
                                                   ADRES
1067                             ;                                      JSR
                                                   TX4
1068 f6c3 20 c7           [ 3 ]            BRA     RUNLPB
1069
1070
1071 f6c5 96 85           [ 3 ] M_I        LDAA    SPACE
1072 f6c7 90 9f           [ 3 ]            SUBA    ADRES
1073 f6c9 27 24           [ 3 ]            BEQ     M_IX
1074 f6cb 2b 07           [ 3 ]            BMI     M_IM
1075 f6cd dc 76           [ 4 ]            LDD     VMOD
1076 f6cf c3 00 10        [ 4 ]            ADDD    #$10
1077 f6d2 20 05           [ 3 ]            BRA     M_BND
1078 f6d4 dc 76           [ 4 ] M_IM       LDD     VMOD
1079 f6d6 83 00 10        [ 4 ]            SUBD    #$10
1080 f6d9 1a 83 07 00     [ 5 ] M_BND      CPD     #$0700
1081 f6dd 25 05           [ 3 ]            BLO     M_BND1
1082 f6df cc 07 00        [ 3 ]            LDD     #$0700
```

-55-

```
1083 f6e2 20 09              [ 3 ]              BRA       M_BND2
1084 f6e4 1a 83 00 60        [ 5 ]  M_BND1     CPD       #$0060
1085 f6e8 22 03              [ 3 ]              BHI       M_BND2
1086 f6ea cc 00 60           [ 3 ]              LDD       #$0060
1087 f6ed dd 76              [ 4 ]  M_BND2     STD       VMOD
1088 f6ef 39                 [ 5 ]  M_IX       RTS
1089
1090
1091 f6f0 cc 00 00           [ 3 ]  BARDIV     LDD       #00
1092 f6f3 dd 4a              [ 4 ]              STD       QUO
1093 f6f5 dd 4b              [ 4 ]              STD       QUO+1
1094 f6f7 86 19              [ 2 ]              LDAA      #25
1095 f6f9 97 4d              [ 3 ]              STAA      COUNT
1096                                BADIVLP
1097 f6fb dc 42              [ 4 ]              LDD       DIVR
1098 f6fd 1a 93 46           [ 6 ]              CPD       DIVD
1099 f700 22 09              [ 3 ]              BHI       BASETONE
1100 f702 26 1c              [ 3 ]              BNE       BACLRONE
1101 f704 dc 44              [ 4 ]              LDD       DIVR+2
1102 f706 1a 93 48           [ 6 ]              CPD       DIVD+2
1103 f709 25 15              [ 3 ]              BLO       BACLRONE
1104 f70b dc 44              [ 4 ]  BASETONE   LDD       DIVR+2
1105 f70d 93 48              [ 5 ]              SUBD      DIVD+2
1106 f70f dd 44              [ 4 ]              STD       DIVR+2
1107 f711 96 43              [ 3 ]              LDAA      DIVR+1
1108 f713 92 47              [ 3 ]              SBCA      DIVD+1
1109 f715 97 43              [ 3 ]              STAA      DIVR+1
1110 f717 96 42              [ 3 ]              LDAA      DIVR
1111 f719 92 46              [ 3 ]              SBCA      DIVD
1112 f71b 97 42              [ 3 ]              STAA      DIVR
1113 f71d 0d                 [ 2 ]              SEC
1114 f71e 20 01              [ 3 ]              BRA       BADIVNT
1115 f720 0c                 [ 2 ]  BACLRONE   CLC
1116 f721 79 00 4c           [ 6 ]  BADIVNT    ROL       QUO+2
1117 f724 79 00 4b           [ 6 ]              ROL       QUO+1
1118 f727 79 00 4a           [ 6 ]              ROL       QUO
1119 f72a 74 00 46           [ 6 ]              LSR       DIVD
1120 f72d 76 00 47           [ 6 ]              ROR       DIVD+1
1121 f730 76 00 48           [ 6 ]              ROR       DIVD+2
1122 f733 76 00 49           [ 6 ]              ROR       DIVD+3
1123 f736 7a 00 4d           [ 6 ]              DEC       COUNT
1124 f739 26 c0              [ 3 ]              BNE       BADIVLP
1125 f73b 39                 [ 5 ]              RTS
1126
1127 f73c dc 4b              [ 4 ]              LDD       QUO+1
1128
1129 f73e 86 80              [ 2 ]  TOFSVC     LDAA      #$80
1130 f740 97 25              [ 3 ]              STAA      TFLG2
1131 f742 7c 00 a7           [ 6 ]              INC       TOVFLOW
1132 f745 3b                 [12 ]              RTI
1133
1134
1135 f746 cc 73 12           [ 3 ]  BARC_DIV   LDD       #$7312
1136 f749 dd 47              [ 4 ]              STD       DIVD+1
1137 f74b 7f 00 46           [ 6 ]              CLR       DIVD
1138 f74e 96 8d              [ 3 ]              LDAA      BARCAL_F
1139 f750 97 42              [ 3 ]              STAA      DIVR
1140 f752 cc 00 00           [ 3 ]              LDD       #0
1141 f755 97 43              [ 3 ]              STAA      DIVR+1
1142 f757 dd 4a              [ 4 ]              STD       QUO
1143 f759 97 4c              [ 3 ]              STAA      QUO+2
1144 f75b 86 11              [ 2 ]              LDAA      #17
1145 f75d 97 4d              [ 3 ]              STAA      COUNT
1146 f75f bd f5 e0           [ 6 ]              JSR       R_VALLP
1147 f762 dc 4a              [ 4 ]              LDD       QUO
1148 f764 dd ae              [ 4 ]              STD       BARCAL
1149 f766 39                 [ 5 ]              RTS
1150
1151 f767 96 81              [ 3 ]  M_CMD      LDAA      RXCMDBUF
1152 f769 81 02              [ 2 ]              CMPA      #CMD_SPC
1153 f76b 26 14              [ 3 ]              BNE       M_CMD4
1154 f76d 96 83              [ 3 ]              LDAA      RXDATBUF
```

-56-

```
1155 f76f 26 03         [ 3 ]            BNE    M_CMD3A
1156 f771 b6 b6 20      [ 4 ]            LDAA   $B620
1157 f774 97 85         [ 3 ] M_CMD3A    STAA   SPACE
1158 f776 96 02         [ 3 ]            LDAA   CMD_SPC
1159 f778 97 82         [ 3 ]            STAA   TXCMDBUF
1160 f77a 96 85         [ 3 ]            LDAA   SPACE
1161 f77c 97 84         [ 3 ]            STAA   TXDATBUF
1162 f77e 7e f5 42      [ 3 ]            JMP    M_CALC
1163 f781 81 01         [ 2 ] M_CMD4     CMPA   #CMD_CAV
1164 f783 26 14         [ 3 ]            BNE    M_CMD5
1165 f785 96 83         [ 3 ]            LDAA   RXDATBUF
1166 f787 26 03         [ 3 ]            BNE    M_CMD4A
1167 f789 b6 b6 21      [ 4 ]            LDAA   $B621
1168 f78c 97 86         [ 3 ] M_CMD4A    STAA   CAVITY
1169 f78e 96 01         [ 3 ]            LDAA   CMD_CAV
1170 f790 97 82         [ 3 ]            STAA   TXCMDBUF
1171 f792 96 86         [ 3 ]            LDAA   CAVITY
1172 f794 97 84         [ 3 ]            STAA   TXDATBUF
1173 f796 7e f5 42      [ 3 ]            JMP    M_CALC
1174 f799 81 09         [ 2 ] M_CMD5     CMPA   #CMD_START
1175 f79b 26 4d         [ 3 ]            BNE    M_CMD6
1176 f79d 86 04         [ 2 ]            LDAA   #CMD_BARS
1177 f79f 97 82         [ 3 ]            STAA   TXCMDBUF
1178 f7a1 7f 00 b1      [ 6 ]            CLR    BARS
1179 f7a4 13 a1 10 3d   [ 6 ]            BRCLR  QFLAGS RUNNING M_CMD5A
1180 f7a8 7c 00 b1      [ 6 ]            INC    BARS
1181 f7ab dc ab         [ 4 ]            LDD    DELTAR
1182 f7ad dd 46         [ 4 ]            STD    DIVD
1183 f7af 96 ad         [ 3 ]            LDAA   DELTAR+2
1184 f7b1 97 48         [ 3 ]            STAA   DIVD+2
1185 f7b3 7f 00 49      [ 6 ]            CLR    DIVD+3
1186 f7b6 cc 00 00      [ 3 ]            LDD    #$0000
1187 f7b9 dd 42         [ 4 ]            STD    DIVR
1188 f7bb dc 60         [ 4 ]            LDD    RAD_ADD
1189 f7bd dd 44         [ 4 ]            STD    DIVR+2
1190
1191 f7bf bd f6 f0      [ 6 ]            JSR    BARDIV
1192 f7c2 dc 4b         [ 4 ]            LDD    QUO+1
1193 f7c4 04            [ 3 ]            LSRD
1194 f7c5 04            [ 3 ]            LSRD
1195 f7c6 04            [ 3 ]            LSRD
1196 f7c7 c0 0a         [ 2 ]            SUBB   #10
1197 f7c9 23 18         [ 3 ]            BLS    M_CMD5B
1198 f7cb d7 54         [ 3 ]            STAB   TEMP1
1199 f7cd 96 af         [ 3 ]            LDAA   BARCAL+1
1200 f7cf 3d            [10 ]            MUL
1201 f7d0 dd 55         [ 4 ]            STD    TEMP1+1
1202 f7d2 d6 54         [ 3 ]            LDAB   TEMP1
1203 f7d4 96 ae         [ 3 ]            LDAA   BARCAL
1204 f7d6 3d            [10 ]            MUL
1205 f7d7 7f 00 54      [ 6 ]            CLR    TEMP1
1206 f7da db 55         [ 3 ]            ADDB   TEMP1+1
1207 f7dc 89 00         [ 2 ]            ADCA   #0
1208 f7de 05            [ 3 ]            LSLD
1209 f7df 05            [ 3 ]            LSLD
1210 f7e0 05            [ 3 ]            LSLD
1211 f7e1 4c            [ 2 ]            INCA
1212 f7e2 4c            [ 2 ]            INCA
1213 f7e3 97 b1         [ 3 ] M_CMD5B    STAA   BARS
1214 f7e5 96 b1         [ 3 ] M_CMD5A    LDAA   BARS
1215 f7e7 97 84         [ 3 ]            STAA   TXDATBUF
1216 f7e9 39            [ 5 ] M_CMDLPX   RTS
1217 f7ea 81 06         [ 2 ] M_CMD6     CMPA   #CMD_STOP
1218 f7ec 26 fb         [ 3 ]            BNE    M_CMDLPX
1219 f7ee 18 38         [ 6 ]            PULY
1220 f7f0 7e f0 90      [ 3 ]            JMP    IDLE
1221
1222
1223 f7f3 dc 6b         [ 4 ] M_SPEED    LDD    RADAR+0
1224 f7f5 93 70         [ 5 ]            SUBD   MOTOR+1
1225 f7f7 2b 18         [ 3 ]            BMI    M_SPEEDM
1226 f7f9 1a 83 00 1c   [ 5 ] M_SPEED1   CPD    #$001C
```

-57-

```
1227 f7fd 23 0c      [ 3 ]              BLS     M_SPEED2
1228 f7ff dc 6b      [ 4 ]              LDD     RADAR+0
1229 f801 83 00 20   [ 4 ]              SUBD    #$0020
1230 f804 dd 70      [ 4 ]              STD     MOTOR+1
1231 f806 cc 00 1c   [ 3 ]              LDD     #$001C
1232 f809 20 09      [ 3 ]              BRA     M_SPEED3
1233 f80b 1a 83 00 02 [ 5 ]   M_SPEED2  CPD     #$0002
1234 f80f 24 03      [ 3 ]              BHS     M_SPEED3
1235 f811 cc 00 02   [ 3 ]   M_SPEEDM   LDD     #$0002
1236 f814 05         [ 3 ]   M_SPEED3   LSLD
1237 f815 05         [ 3 ]              LSLD
1238 f816 05         [ 3 ]              LSLD
1239 f817 05         [ 3 ]              LSLD
1240 f818 05         [ 3 ]              LSLD
1241 f819 05         [ 3 ]              LSLD
1242 f81a dd 76      [ 4 ]              STD     VMOD
1243 f81c 39         [ 5 ]              RTS
1244
1245
1246 f81d dc 6d              RADARINT
1247 f81f d3 61      [ 4 ]              LDD     RADAR+2
1248 f821 dd 6d      [ 5 ]              ADDD    RAD_ADD+1
1249 f823 96 6c      [ 4 ]              STD     RADAR+2
1250 f825 99 60      [ 3 ]              LDAA    RADAR+1
1251 f827 97 6c      [ 3 ]              ADCA    RAD_ADD
1252 f829 96 6b      [ 3 ]              STAA    RADAR+1
1253 f82b 89 00      [ 3 ]              LDAA    RADAR
1254 f82d 97 6b      [ 2 ]              ADCA    #0
1255 f82f dc 0e      [ 3 ]              STAA    RADAR
1256 f831 93 a9      [ 4 ]              LDD     TCNT
1257 f833 dd ac      [ 5 ]              SUBD    OLDR+1
1258 f835 96 a7      [ 4 ]              STD     DELTAR+1
1259 f837 92 a8      [ 3 ]              LDAA    TOVFLOW
1260 f839 97 ab      [ 3 ]              SBCA    OLDR
1261 f83b dc 0e      [ 3 ]              STAA    DELTAR
1262 f83d dd a9      [ 4 ]              LDD     TCNT
1263 f83f 96 a7      [ 4 ]              STD     OLDR+1
1264 f841 97 a8      [ 3 ]              LDAA    TOVFLOW
1265 f843 15 23 fb   [ 3 ]              STAA    OLDR
1266 f846 3b         [ 6 ]              BCLR    TFLG1 #$FB
                     [12 ]              RTI
1267
1268
1269                          ;          ORG     M_SPEED-$1400
1270                          ;   M2_SPED   LDD   RADAR+0
1271                          ;             SUBD  MOTOR+1
1272                          ;             BMI   M2_SPEDM
1273                          ;   M2_SPED1  CPD   #$001C
1274                          ;             BLS   M2_SPED2
1275                          ;             LDD   RADAR+0
1276                          ;             SUBD  #$001C
1277                          ;             STD   MOTOR+1
1278                          ;             LDD   #$001C
1279                          ;             BRA   M2_SPED3
1280                          ;   M2_SPED2  CPD   #$0002
1281                          ;             BHS   M2_SPED3
1282                          ;   M2_SPEDM  LDD   #$0002
1283                          ;   M2_SPED3  LSLD
1284                          ;             LSLD
1285                          ;             LSLD
1286                          ;             LSLD
1287                          ;             LSLD
1288                          ;             LSLD
1289                          ;             STD   VMOD
1290                          ;             RTS
1291 f847 dc 6b      [ 4 ]   M2_SPED    LDD     RADAR+0
1292 f849 93 70      [ 5 ]              SUBD    MOTOR+1
1293 f84b 2b 16      [ 3 ]              BMI     M2_SPEDM
1294 f84d 1a 93 b2   [ 6 ]              CPD     DMAX
1295 f850 23 08      [ 3 ]              BLS     M2_SPED1
1296 f852 dc 6b      [ 4 ]              LDD     RADAR+0
1297 f854 93 b2      [ 5 ]              SUBD    DMAX
1298 f856 dd 70      [ 4 ]              STD     MOTOR+1
```

```
1299 f858 20 14       [ 3 ]              BRA     M2_SPEDX1
1300 f85a 96 8e       [ 3 ]  M2_SPED1    LDAA    X8
1301 f85c 3d          [10 ]              MUL
1302 f85d 1a 83 00 64 [ 5 ]              CPD     #100
1303 f861 24 05       [ 3 ]              BHS     M2_SPED3
1304 f863 cc 00 64    [ 3 ]  M2_SPEDM    LDD     #100
1305 f866 20 09       [ 3 ]              BRA     M2_SPEDX2
1306 f868 1a 83 07 00 [ 5 ]  M2_SPED3    CPD     #1792
1307 f86c 23 03       [ 3 ]              BLS     M2_SPEDX2
1308 f86e cc 07 00    [ 3 ]  M2_SPEDX1   LDD     #1792
1309 f871 dd 76       [ 4 ]  M2_SPEDX2   STD     VMOD
1310 f873 39          [ 5 ]              RTS
1311
1312
1313 f874 96 81       [ 3 ]  M2_CMD      LDAA    RXCMDBUF
1314 f876 81 02       [ 2 ]              CMPA    #CMD_SPC
1315 f878 26 14       [ 3 ]              BNE     M2_CMD4
1316 f87a 96 83       [ 3 ]              LDAA    RXDATBUF
1317 f87c 26 03       [ 3 ]              BNE     M2_CMD3A
1318 f87e b6 b6 20    [ 4 ]              LDAA    $B620
1319 f881 97 85       [ 3 ]  M2_CMD3A    STAA    SPACE
1320 f883 86 02       [ 2 ]              LDAA    #CMD_SPC
1321 f885 97 82       [ 3 ]              STAA    TXCMDBUF
1322 f887 96 85       [ 3 ]              LDAA    SPACE
1323 f889 97 84       [ 3 ]              STAA    TXDATBUF
1324 f88b 7e f5 42    [ 3 ]              JMP     M_CALC
1325 f88e 81 01       [ 2 ]  M2_CMD4     CMPA    #CMD_CAV
1326 f890 26 14       [ 3 ]              BNE     M2_CMD5
1327 f892 96 83       [ 3 ]              LDAA    RXDATBUF
1328 f894 26 03       [ 3 ]              BNE     M2_CMD4A
1329 f896 b6 b6 21    [ 4 ]              LDAA    $B621
1330 f899 97 86       [ 3 ]  M2_CMD4A    STAA    CAVITY
1331 f89b 86 01       [ 2 ]              LDAA    #CMD_CAV
1332 f89d 97 82       [ 3 ]              STAA    TXCMDBUF
1333 f89f 96 86       [ 3 ]              LDAA    CAVITY
1334 f8a1 97 84       [ 3 ]              STAA    TXDATBUF
1335 f8a3 7e f5 42    [ 3 ]              JMP     M_CALC
1336 f8a6 81 09       [ 2 ]  M2_CMD5     CMPA    #CMD_START
1337 f8a8 26 4f       [ 3 ]              BNE     M2_CMD6
1338 f8aa 86 04       [ 2 ]              LDAA    #CMD_BARS
1339 f8ac 97 82       [ 3 ]              STAA    TXCMDBUF
1340 f8ae 7f 00 b1    [ 6 ]              CLR     BARS
1341 f8b1 13 a1 10 3f [ 6 ]              BRCLR   QFLAGS RUNNING M2_CMD5A
1342 f8b5 7c 00 b1    [ 6 ]              INC     BARS
1343 f8b8 dc ab       [ 4 ]              LDD     DELTAR
1344 f8ba dd 46       [ 4 ]              STD     DIVD
1345 f8bc 96 ad       [ 3 ]              LDAA    DELTAR+2
1346 f8be 97 48       [ 3 ]              STAA    DIVD+2
1347 f8c0 7f 00 49    [ 6 ]              CLR     DIVD+3
1348 f8c3 cc 00 00    [ 3 ]              LDD     #$0000
1349 f8c6 dd 42       [ 4 ]              STD     DIVR
1350 f8c8 dc 60       [ 4 ]              LDD     RAD_ADD
1351 f8ca dd 44       [ 4 ]              STD     DIVR+2
1352
1353 f8cc bd f6 f0    [ 6 ]              JSR     BARDIV
1354 f8cf dc 4b       [ 4 ]              LDD     QUO+1
1355 f8d1 04          [ 3 ]              LSRD
1356 f8d2 04          [ 3 ]              LSRD
1357 f8d3 4d          [ 2 ]              TSTA
1358 f8d4 26 2c       [ 3 ]              BNE     M2_CMD5C
1359 f8d6 c1 0d       [ 2 ]              CMPB    #13
1360 f8d8 23 1a       [ 3 ]              BLS     M2_CMD5A
1361 f8da d7 54       [ 3 ]              STAB    TEMP1
1362 f8dc 96 af       [ 3 ]              LDAA    BARCAL+1
1363 f8de 3d          [10 ]              MUL
1364 f8df dd 55       [ 4 ]              STD     TEMP1+1
1365 f8e1 d6 54       [ 3 ]              LDAB    TEMP1
1366 f8e3 96 ae       [ 3 ]              LDAA    BARCAL
1367 f8e5 3d          [10 ]              MUL
1368 f8e6 7f 00 54    [ 6 ]              CLR     TEMP1
1369 f8e9 db 55       [ 3 ]              ADDB    TEMP1+1
1370 f8eb 89 00       [ 2 ]              ADCA    #0
```

```
1371 f8ed 05           [ 3 ]                    LSLD
1372 f8ee 05           [ 3 ]                    LSLD
1373 f8ef 05           [ 3 ]                    LSLD
1374 f8f0 4c           [ 2 ]                    INCA
1375 f8f1 4c           [ 2 ]                    INCA
1376 f8f2 97 b1        [ 3 ]  M2_CMD5B   STAA   BARS
1377 f8f4 96 b1        [ 3 ]  M2_CMD5A   LDAA   BARS
1378 f8f6 97 84        [ 3 ]             STAA   TXDATBUP
1379 f8f8 39           [ 5 ]  M2_CMDLPX  RTS
1380 f8f9 81 06        [ 2 ]  M2_CMD6    CMPA   #CMD_STOP
1381 f8fb 26 fb        [ 3 ]             BNE    M2_CMDLPX
1382 f8fd 18 38        [ 6 ]             PULY
1383 f8ff 7e f0 90     [ 3 ]             JMP    IDLE
1384 f902 86 09        [ 2 ]  M2_CMD5C   LDAA   #9
1385 f904 20 ec        [ 3 ]             BRA    M2_CMD5B
1386
1387 f906 dc 6b        [ 4 ]  M3_SPED    LDD    RADAR+0
1388 f908 93 70        [ 5 ]             SUBD   MOTOR+1
1389 f90a 2b 18        [ 3 ]             BMI    M3_SPEDM
1390 f90c 1a 83 00 1c  [ 5 ]  M3_SPED1   CPD    #$001C
1391 f910 23 0c        [ 3 ]             BLS    M3_SPED2
1392 f912 dc 6b        [ 4 ]             LDD    RADAR+0
1393 f914 83 00 20     [ 4 ]             SUBD   #$0020
1394 f917 dd 70        [ 4 ]             STD    MOTOR+1
1395 f919 cc 00 1c     [ 3 ]             LDD    #$001C
1396 f91c 20 09        [ 3 ]             BRA    M3_SPED3
1397 f91e 1a 83 00 02  [ 5 ]  M3_SPED2   CPD    #$0002
1398 f922 24 03        [ 3 ]             BHS    M3_SPED3
1399 f924 cc 00 02     [ 3 ]  M3_SPEDM   LDD    #$0002
1400 f927 05           [ 3 ]  M3_SPED3   LSLD
1401 f928 05           [ 3 ]             LSLD
1402 f929 05           [ 3 ]             LSLD
1403 f92a 05           [ 3 ]             LSLD
1404 f92b 05           [ 3 ]             LSLD
1405 f92c 05           [ 3 ]             LSLD
1406 f92d dd 76        [ 4 ]             STD    VMOD
1407 f92f 39           [ 5 ]             RTS
1408
1409 f930 ff ff ff ff ff ff ff                  FILL   $FF,$FFB0-*
     ff ff ff ff ff ff
     ff ff ff ff ff ff
     ff ff ff ff ff ff
     ff ff ff ff ff ff
     ff ff ff ff ff ff
     ff ff ff ff ff ff
     ff ff ff ff ff ff
     ff ff ff ff ff ff
     ff ff ff ff ff ff
     ff ff ff ff
1410 ffb0                                ORG    $FFB0
1411 ffb0 3b           [12 ]  IRET       RTI
1412
1413
1414 ffd6                                 ORG    $FFD6
1415                      ;
1416 ffd6 f2 69                                  $4003    SCIINT   FDB
                          SCIINT       FDB       SCI_INT
1417 ffd8 ff b0          SPIINT       FDB       IRET
1418 ffda ff b0          PAIE         FDB       IRET
1419 ffdc ff b0          PAO          FDB       IRET
1420                      ;                                TIMINT   FDB
                                                  IRET    ;
                                                  TIMOVSVC
1421 ffde f7 3e          TIMINT       FDB       TOFSVC   ;
1422                                             TIMOVSVC
1423                      ;                                TIM1C4   FDB
                                                  IRET
                                                          TOC5INT  FDB
1424 ffe0 f3 64                                  $4012
1425                      TOC5INT      FDB       TOC5SVC
                          ;                                TOC4INT  FDB
                                                  $4015
```

```
1426 ffe2 f3 7e              TOC4INT   FDB   TOC4SVC
1427                         ;
                                                         TOC3INT   FDB
1428 ffe4 f5 c2                                  $4018
1429 ffe6 ff b0              TOC3INT   FDB   TOC3SVC
                             TOC2INT   FDB   IRET        ;
1430                                         TOC2SVC
                             ;                           TOC1INT   FDB
                                                 $4006
                                             ;
1431 ffe8 f3 42                              TOC1SVC
1432                         TOC1INT   FDB   TOC1SVC
                             ;                           TIC3INT   FDB
1433 ffea f3 1b                                  $4009
                             TIC3INT   FDB   MOTORINT
1434 ffec ff b0                              TIC3        ;
1435                         TIC2INT   FDB   IRET
                             ;                           TIC1INT   FDB
1436 ffee f8 1d                                  $400C
                             TIC1INT   FDB   RADARINT;
1437                                         TIC1
                             ;                           RTIINTA   FDB
1438 fff0 f5 6b                                  $400F
1439 fff2 ff b0              RTIINTA   FDB   REALTIM
1440 fff4 ff b0              IRQINT    FDB   IRET
1441 fff6 ff b0              XIRQINT   FDB   IRET
1442 fff8 ff b0              SWIINT    FDB   IRET
1443 fffa ff b0              ILLOPNT   FDB   IRET
1444 fffc ff b0              COPINT    FDB   IRET
1445 fffe f0 00              CMFINT    FDB   IRET
1446                         RSTINT    FDB   RMAIN
1447
1448 0000                    end       EQU   *
```

-61-

```
ADCTL        0030 *0034 0456 0615
ADR1         0031 *0035 0623
ADR2         0032 *0036
ADR3         0033 *0037
ADR4         0034 *0038
ADRES        009f *0125 0933 1004 1072
ADRES1       008f *0117 0441 0621 0922
ADRES2       0091 *0118 0442 0923
ADRES3       0093 *0119 0443 0924
ADRES4       0095 *0120 0444 0925
ADRES5       0097 *0121 0445 0926
ADRES6       0099 *0122 0446 0927
ADRES7       009b *0123 0447 0928
ADRES8       009d *0124 0448 0929
BACLRONE     f720 *0973 1100 1103
BADIVLP      f6fb *0954 1124
BADIVNT      f721 *0974 1114
BARCAL       00ae *0135 1148 1199 1203 1362 1366
BARCAL_F     008d *0115 1138
BARC_DIV     f746 *0993 0996
BARDIV       f6f0 *0949 1191 1353
BARS         00b1 *0137 1178 1180 1213 1214 1340 1342 1376 1377
BASETONE     f70b *0962 1099
BAUD         002b *0029 0161 0392
BPROT        0035 *0039 0153
CAL          00a4 *0130 0474
CAVITY       0086 *0108 0276 0279 0471 0868 1168 1171 1330 1333
CLRONE       f4c0 *0663 0793 0796
CMD_BARS     0004 *0075 1176 1338
CMD_CAL      000b *0082
CMD_CAV      0001 *0072 0271 0277 1163 1169 1325 1331
CMD_ERRS     0003 *0074
CMD_FLUSH    0007 *0078 0255
CMD_FL_SPD   000c *0083
CMD_IDLE     0005 *0076 0283 0285
CMD_MODE     0008 *0079
CMD_SETUP    000a *0081 0313
CMD_SPC      0002 *0073 0259 0265 1152 1158 1314 1320
CMD_START    0009 *0080 0250 1174 1336
CMD_STOP     0006 *0077 0241 0244 0374 1217 1380
CMFINT       fffc *1302
COM_CNT      0063 *0088 0350 0516 0907 0909 1011 1046
CONFIG       003f *0044 0676 0683
COPINT       fffa *1301
COUNT        004d *0075 0789 0811 0832 0860 0956 0978 1095 1123 1145
CUTBACK      005f *0086 0345 0905 1023
DDRD         0009 *0005 0157 0381
DE485        0020 *0062
DELTAR       00ab *0134 1181 1183 1257 1260 1343 1345
DELTAT       007f *0102 0584
DITHER       007a *0099 0436 0592 0598 0918 0920 0921
DIVD         0046 *0073 0779 0786 0791 0795 0798 0801 0808 0809 0810
                       0821 0823 0835 0839 0842 0845 0848 0856 0857 0858 0859
                       0879 0882 0946 0947 0957 0961 0964 0966 0967 0969 1098
                       1102 1105 1108 1111 1119 1120 1121 1122 1136 1137 1182
                       1184 1185 1344 1346 1347
DIVIDE       f48c *0637 0329
DIVLP        f4a2 *0648 0812
DIVNT        f4c1 *0664 0804
DIVR         0042 *0072 0782 0784 0790 0794 0797 0799 0800 0802 0825
                       0827 0834 0838 0841 0843 0844 0846 0847 0849 0885 0898
                       0950 0951 0959 0962 0965 0968 0975 0976 0977 1097 1101
                       1104 1106 1107 1109 1110 1112 1139 1141 1187 1189 1349
                       1351
DLY10MS      f39c *0505 0660 0670 0679 0686
DMAX         00b2 *0138 0995 1294 1297
DUTY         0073 *0096
EEUPDT       f404 *0561 0243 0252
EEUPDT1      f40e *0565 0715
EEUPDT2      f41a *0570 0709
FLAGS1       0052 *0078
FLAGS2       0053 *0079
```

-62-

```
FLUEXIT      f1ad *0234 0351
FLUSH        f14f *0185 0257
FLUSH1       f18a *0220
FLUSH2       f19c *0227 0363
FLUSH3       f1a5 *0230 0368 0370
FLUSHLP      f17c *0207 0375
FLUSHM       f1a2 *0229 0361
FL_SPD       0087 *0109 0328
GARB         00b4 *0139
HPRIO        003c *0042 0411
IDLE         f090 *0085 0235 0248 0269 0281 0287 0302 0312 0320 0325
                  0376 1016 1220 1383
IDLE1        f0b6 *0107 0242
IDLE2        f0c0 *0112 0251
IDLE3        f0c7 *0117 0256
IDLE3A       f0d2 *0122 0262
IDLE4        f0df *0129 0260
IDLE4A       f0ea *0134 0274
IDLE5        f0f7 *0141 0272
IDLE6        f102 *0146 0284
IDLE6A       f121 *0161 0294
IDLE7        f134 *0171 0289
IDLE7A       f142 *0177 0317
IDLEX        f147 *0179 0291 0314
ILLOPNT      fff8 *1300
INIT         103d *0043 0151
INITIAL      f1b0 *0236 0201
IRET         ffb0 *1269 1417 1418 1419 1429 1434 1439 1440 1441 1442
                  1443 1444
IRQINT       fff2 *1297
LP1          f029 *0025 0170
LP2          f044 *0037 0179 0184 0186
LP3          f03a *0033 0175
LP6          f062 *0049 0191
LP7          f06a *0052 0194
M2_CMD       f874 *1171 1003 1045
M2_CMD3A     f881 *1177 1317
M2_CMD4      f88e *1183 1315
M2_CMD4A     f899 *1188 1328
M2_CMD5      f8a6 *1194 1326
M2_CMD5A     f8f4 *1235 1341 1360
M2_CMD5B     f8f2 *1234 1385
M2_CMD5C     f902 *1242 1358
M2_CMD6      f8f9 *1238 1337
M2_CMDLPX    f8f8 *1237 1381
M2_SPED      f847 *1149 1042
M2_SPED1     f85a *1158 1295
M2_SPED3     f868 *1164 1303
M2_SPEDM     f863 *1162 1293
M2_SPEDX1    f86e *1166 1299
M2_SPEDX2    f871 *1167 1305 1307
M3_SPED      f906 *1245
M3_SPED1     f90c *1248
M3_SPED2     f91e *1255 1391
M3_SPED3     f927 *1258 1396 1398
M3_SPEDM     f924 *1257 1389
MAIn         f073 *0057 0164
MOD          0069 *0093
MOTOR        006f *0095 0334 0335 0355 0364 0449 0451 0572 0575 0576
                  0578 0579 0581 1037 1038 1224 1230 1292 1298 1388 1394
MOTORINT     f31b *0426 1433
MTRRPM       00b0 *0136
M_BND        f6d9 *0938 1077
M_BND1       f6e4 *0942 1081
M_BND2       f6ed *0945 1083 1085
M_CALC       f542 *0725 0997 1033 1162 1173 1324 1335
M_CMD        f767 *1009
M_CMD3A      f774 *1015 1155
M_CMD4       f781 *1021 1153
M_CMD4A      f78c *1026 1166
M_CMD5       f799 *1032 1164
M_CMD5A      f7e5 *1072 1179
```

-63-

```
M_CMD5B      f7e3 *1071 1197
M_CMD6       f7ea *1075 1175
M_CMDLPX     f7e9 *1074 1218
M_I          f6c5 *0929
M_IM         f6d4 *0936 1074
M_IX         f6ef *0946 1073
M_SPEED      f7f3 *1081
M_SPEED1     f7f9 *1084
M_SPEED2     f80b *1091 1227
M_SPEED3     f814 *1094 1232 1234
M_SPEEDM     f811 *1093 1225
M_TICKS      f25b *0329
OC1D         000d *0008 0409
OC1M         000c *0007 0233 0339 0407 1031 1057
OLDR         00a8 *0133 1256 1259 1262 1264
OLDRTI       00a2 *0128
OLDSPEED     0067 *0092
OLDT         007d *0101 0583 0586
OPTION       0039 *0040 0412
PACNT        0027 *0025 0895 0896
PACTL        0026 *0024 0154 0379
PAIE         ffda *1276
PAO          ffdc *1277
PORTA        0000 *0003 0155 0234 0317 0348 1032 1058
PORTD        0008 *0004 0159 0168 0169 0384 0453 0454 0523 0564 0569
             0571
PORTE        000a *0006
PPRG         003b *0041 0655 0659 0661 0665 0669 0671 0675 0678 0681
             0685 0687 0757 0760 0764 0767 0770 0774
PROGB1       f46c *0620 0763
PROGB2       f481 *0630 0773
PROGBYTE     f45b *0612 0711 0730 0747
QFLAGS       00a1 *0127 0235 0237 0524 0543 0934 1002 1013 1014 1040
             1041 1044 1063 1064 1179 1341
Q00          004a *0074 0787 0806 0807 0813 0829 0830 0853 0854 0855
             0862 0864 0952 0954 0973 0974 0980 1092 1093 1116 1117
             1118 1127 1142 1143 1147 1192 1354
RADAR        006b *0094 0450 0452 1035 1036 1223 1228 1246 1248 1249
             1251 1252 1254 1291 1296 1387 1392
RADARINT     f81d *1103 1436
RAD_ADD      0060 *0087 0863 0865 1188 1247 1250 1350
RDRF         0020 *0048 0170 0175 0179 0467 0483
RE485        0010 *0061
REALTIM      f56b *0750 1438
REALTIMA     f58b *0765 0904
REALTIMB     f593 *0768 0908
RIE          0020 *0052 0395 0513 0558
RMAIN        f000 *0007 1445
RMUPDT       f3ed *0548 0202
RMUPDT1      f3f7 *0552 0699
ROMCHK       f439 *0592 0200
ROMCHK1      f440 *0595 0740
ROMCHK2      f44b *0602 0742
ROMCHK3      f452 *0605 0750
ROMCSM       f424 *0578 0716 0751
ROMCSM1      f42b *0581 0726
ROMCSM2      f436 *0588 0728
RSCLRONE     f51e *0710 0837 0840
RSDIVIDE     f4d8 *0674
RSDIVLP      f4f9 *0691 0861
RSDIVNT      f51f *0711 0851
RSSETONE     f509 *0699 0836
RSTDIV       f4ec *0685 0889
RSTINT       fffe *1303
RTDIVIDE     f546 *0727
RTICNT       007c *0100 0911 0912
RTIINT1      f5a2 *0777 0912
RTIINTA      fff0 *1296
RUN          f620 *0848 0253
RUNCAL       0088 *0110 0871 0875
RUNEXIT      f65b *0874 1012 1047
RUNLPA       f637 *0860 1013 1015 1059
```

-64-

```
RUNLPA1      f64d *0869 1007
RUNLPA2      f65e *0875 1010
RUNLPB       f68c *0897 1040 1063 1068
RUNLPC       f6bc *0919 1050 1053
RUNNING      0010 *0066 1002 1044 1179 1341
RX           f254 *0325 0467
RXCMDBUF     0081 *0103 0238 0246 0373 0497 0504 1151 1313
RXDATBUF     0083 *0105 0261 0273 0293 0309 0498 0507 1154 1165 1316
                  1327
RXINT1       f27f *0350 0488
RXINT2       f29a *0362 0494
RXINT3       f2a0 *0365 0495
RXINTDLY     f2b9 *0378 0521
RXINTOK      f2a6 *0368 0501
RXINTX       f27e *0349 0483
RXINTZ       f296 *0360 0493
RXOK         0004 *0065 0524
RXPTR        0040 *0070 0385 0490 0493 0494 0495 0502 0505 0508 0510
R_VAL        f5c7 *0803 1008 1051
R_VALCLR     f5fe *0830 0960 0963
R_VALLP      f5e0 *0815 0979 1146
R_VALNT      f5ff *0831 0971
R_VALONE     f5ef *0822 0959
SCCR1        002c *0030
SCCR2        002d *0031 0163 0388 0395 0482 0513 0522 0558 0559
SCDR         002f *0033 0171 0176 0180 0192 0195 0394 0460 0462 0465
                  0468 0485 0512 0517 0526 0542 0546 0550 0554 0557
SCIINT       ffd6 *1274
SCI_INT      f269 *0340 1416
SCL          0020 *0057
SCNT         005e *0085 0341 0903 1019
SCSR         002e *0032 0170 0175 0179 0191 0194 0393 0459 0461 0464
                  0467 0483 0484 0511 0532
SDA          0080 *0058
SETONE       f4b1 *0655 0792
SMOD         00a5 *0131 0204 0347 0601 0906 1025
SOLDUTY      008c *0114 0342 1020
SPACE        0085 *0107 0264 0267 0307 0472 0692 0705 0867 1071 1157
                  1160 1319 1322
SPCR         0028 *0026 0386
SPDR         002a *0028
SPEED        0064 *0091 0332 0333 0354 0366 0634 0636 0637 0639 0640
                  0642
SPIF         0080 *0047
SPIINT       ffd8 *1275
SPSR         0029 *0027
SWIINT       fff6 *1299
TCIE         0040 *0051 0482 0522 0559
TCNT         000e *0009 0414 1255 1261
TCTL1        0020 *0018 0405
TCTL2        0021 *0019 0398
TDRE         0080 *0049 0191 0194 0459 0461 0464
TEMP1        0054 *0080 0476 0478 0870 0873 0874 0877 0880 1198 1201
                  1202 1205 1206 1361 1364 1365 1368 1369
TEMP2        0056 *0081
TEMP3        0059 *0082
TFLG1        0023 *0021 0426 0587 0608 0627 0644 0942 1265
TFLG2        0025 *0023 0424 0893 1130
TIC1         0010 *0010
TIC1INT      ffee *1294
TIC2         0012 *0011
TIC2INT      ffec *1292
TIC3         0014 *0012 0582 0585
TIC3INT      ffea *1291
TIE          0080 *0050
TIMINT       ffde *1279
TMSK1        0022 *0020 0230 0337 0403 1029 1055
TMSK2        0024 *0022 0152 0400
TOC1         0016 *0013 0418 0594 0599 0602 0604 0606
TOC1B        f34b *0454
TOC1INT      ffe8 *1289
TOC1SVC      f342 *0448 1431
```

```
TOC2            0018 *0014 0600
TOC2INT         ffe6 *1287
TOC3            001a *0015 0420 0603
TOC3INT         ffe4 *1286
TOC3SVC         f5c2 *0795 1428
TOC4            001c *0016 0421 0631 0633
TOC4INT         ffe2 *1284
TOC4SVC         f37e *0488 1426
TOC5            001e *0017 0422 0595
TOC5INT         ffe0 *1282
TOC5SVC         f364 *0470 1424
TOCCNT          00a0 *0126 0617 0619
TOFSVC          f73e *0987 1421
TOVFLOW         00a7 *0132 1131 1258 1263
TX              f24d *0322 0464
TX4             f240 *0317 0459
TXB             f246 *0319 0461
TXCMDBUF        0082 *0104 0210 0245 0266 0278 0286 0292 0315 0324 0539
                     0549 1159 1170 1177 1321 1332 1339
TXDATBUF        0084 *0106 0211 0247 0268 0280 0301 0311 0319 0323 0540
                     0553 1161 1172 1215 1323 1334 1378
TXINT           f2ce *0389 0482
TXINT1          f2f1 *0403 0534
TXINT2          f2f9 *0407 0535
TXINT3          f301 *0411 0536
TXINTX          f309 *0415 0533
TXINTX1         f314 *0420 0563
TXOK            0008 *0064 0235 0237 0543 1013 1014 1063 1064
TXPTR           0041 *0071 0528 0533 0534 0535 0536 0537 0547 0551 0555
VALBUF          005c *0084 0897 0898 0899 0901 0945 0984 0985 0999 1000
VALCNT          005b *0083 0902 0949 0986 1001 1005 1048
VALPER          008b *0113 1009 1052
VALSAM          008a *0112 1006 1049
VMOD            0076 *0097 0206 0372 0429 0591 0597 0913 1027 1075 1078
                     1087 1242 1309 1406
VMOD2           0078 *0098 0431
VTGT            00a3 *0129 0208
WR_CAV          f3a5 *0512
WR_CONFIG       f3cd *0532
WR_FL           f3b9 *0522
X3              0089 *0111
X8              008e *0116 0990 1300
XEND            0050 *0077 0330 0632
XIRQINT         fff4 *1298
XSTART          004e *0076
boot            f025 *0024
dly10msa        f3a0 *0507 0650
end             0000 *1306

Number of errors 0
```

For purposes of describing a specific embodiment of the invention, the following includes exemplary program for the display unit 62 of this invention, reproduced as a source statement, including comments as appropriate.

-67-

```
Er Line Addr Object    Type
   1                        $ TITLE(BERTELLI Planter Controller - Display
                                   Board  )
   2                        $ XREF DATE(16-May-94)
   3
   4                        $INCLUDE(DEFS.ASM)
   4                        ;     BIT ASSIGNMENTS
   4
   4 0020                   DIG_PTR      EQU    20h    ;00-07
   4 0021                   SECCNT       EQU    21h    ;08-0F
   4 0022                   MODES        EQU    22h    ;10-07
   4 0023                   LIGHTS       EQU    23h    ;18-1F
   4 0024                   WARNS        EQU    24h    ;20-27
   4
   4 007B                   WARNFLG      EQU    07Bh
   4 007C                   ALMFLAG      EQU    07Ch
   4 007D                   TXOK         EQU    07Dh
   4 007E                   RXOK         EQU    07Eh
   4 007F                   RXOKT        EQU    07Fh
   4
   4                        ;     SCRATCH PAD ASSIGNMENTS
   4 0007                   STEP         EQU    07h
   4 0030                   DISCNT       EQU    30h
   4 0031                   SCANCNT      EQU    31h
   4 0032                   KEYUPCNT     EQU    32h
   4 0033                   NEWKEY       EQU    33h
   4 0034                   SECCNTR      EQU    34h
   4 0035                   SPACE        EQU    35h
   4 0036                   CAVITY       EQU    36h
   4 0037                   BARS         EQU    37h
   4 0038                   DIG_1        EQU    38h
   4 0039                   DIG_2        EQU    39h
   4 003A                   DIG_3        EQU    3Ah
   4 003B                   DIG_4        EQU    3Bh
   4 003C                   DIG_5        EQU    3Ch
   4 003D                   DIG_6        EQU    3Dh
   4 003E                   DIG_7        EQU    3Eh
   4                        ;            EQU    3Fh
   4
   4 0040                   SECS         EQU    40h
   4 0041                   SECS1        EQU    41h
   4 0042                   ERRS         EQU    42h
   4 0043                   MODE         EQU    43h
   4 0044                   MODEBUF      EQU    44h
   4 0045                   BARSBUF      EQU    45h
   4 0046                   SPCBUF       EQU    46h
   4 0047                   CAVBUF       EQU    47h
   4 0048                   TEMP1        EQU    48h
   4 0049                   TEMP2        EQU    49h
   4 004A                   TEMP3        EQU    4Ah
   4 004B                   DIG_5A       EQU    4Bh
   4 004C                   DIG_2A       EQU    4Ch
   4 004D                   KEYTEMP      EQU    4Dh
```

```
Er Line Addr Object        Type 4 004E                  OKEY         EQU    4Eh
   4 004F                  DIG_8        EQU    4Fh
   4
   4 0050                  VALUE        EQU    50h
   4                       ;1           EQU    51h
   4                       ;2           EQU    52h
   4                       ;3           EQU    53h
   4                       ;4           EQU    54h
   4                       ;5           EQU    55h
   4                       ;6           EQU    56h
   4                       ;7           EQU    57h
   4                       ;0           EQU    58h
   4                       ;1           EQU    59h
   4                       ;2           EQU    5Ah
   4                       ;3           EQU    5Bh
   4                       ;4           EQU    5Ch
   4                       ;5           EQU    5Dh
   4                       ;6           EQU    5Eh
   4                       ;7           EQU    5Fh
   4
   4 0060                  TXCMDBUF     EQU    60h
   4 0061                  TXDATBUF     EQU    61h
   4 0062                  RXCMDBUF     EQU    62h
   4 0063                  RXDATBUF     EQU    63h
   4 0064                  FLCNT1       EQU    64h
   4 0065                  FLCNT2       EQU    65h
   4 0066                  COM_CNT      EQU    66h
   4                       ;STACK       EQU    67h
   4                       ;            EQU    68h
   4                       ;            EQU    69h
   4                       ;            EQU    68h
   4                       ;            EQU    69h
   4                       ;            EQU    6Ah
   4                       ;            EQU    6Bh
   4                       ;            EQU    6Ch
   4                       ;            EQU    6Dh
   4                       ;            EQU    6Eh
   4                       ;            EQU    6Fh
   4
   4                       ;            EQU    70h
   4                       ;            EQU    71h
   4                       ;            EQU    72h
   4                       ;            EQU    73h
   4                       ;            EQU    74h
   4                       ;            EQU    75h
   4                       ;            EQU    76h
   4                       ;            EQU    77h
   4                       ;            EQU    78h
   4                       ;            EQU    79h
   4                       ;            EQU    7Ah
   4                       ;            EQU    78h
```

```
Er Line Addr Object     Type

4                            ;              EQU     7Ch
    4                            ;              EQU     7Dh
    4                            ;              EQU     7Eh
    4                            ;              EQU     7Fh
    5                            ;     $INCLUDE(RDEFS.ASM)
    6                            $ LIST
    7
    8                                            ORG     0000h
    9 0000 02 00 30   ..C.                       LJMP    RSTART1
   10
   11                                            ORG     0003h
   12                            * IE0 - EXTERNAL 0
   13                            ;               LJMP    04002h
   14 0003 02 00 A2   ..C.                       LJMP    RTIX
   15
   16
   17                                            ORG     000Bh
                                 * TF0 - TIMER 0 OVERFLOW
   18                            ;               LJMP    04005h
   19 000B 02 05 78   ..C.       TMR0V           LJMP    TMR0_INT
   20
   21
   22                                            ORG     0013h
                                 * IE1 - EXTERNAL 1
   23                            ;               LJMP    04008h
   24 0013 02 00 A2   ..C.       INT1V           LJMP    RTIX
   25
   26
   27                                            ORG     001Bh
                                 * TF1 - TIMER 1 OVERFLOW
   28 001B 32                                    RETI
   29
   30
   31                                            ORG     0023h
                                 * RI & TI - SERIAL I/O (UART)
   32                            ;               LJMP    0400Bh
   33 0023 02 03 D4   ..C.       SERINTS         LJMP    SERINT
   34
   35
   36
   37                            ;               DS      1000h
   38
   39                                            ORG     0030h
   40 0030 75 87 80              RSTART1         MOV     087h,#080h    ; PCCN -
                                 DOUBLE BAUD RATE
   41 0033 75 81 07   .D..                       MOV     SP,#07h       ; STACK =
                                 07h
   42 0036 75 89 21   .D..                       MOV     TMOD,#021h    ; TIMER-.
   43                            (Mode-2) 8-BIT AUTO-RELOAD
                                                                       ; TIMER-.
                                 (Mode-1) 16-BIT
   44 0039 75 98 52   .D..                       MOV     SCON,#052h    ; 8-BIT.
                                 ENABLED, TI SET
   45 003C 75 8B F3   .D..                       MOV     TL1,#0F3h     ; START
                                 TIMER WITH NORMAL COUNT
   46 003F 75 8D F3   .D..                       MOV     TH1,#0F3h     ; AUTO PE-
                                 LOAD VALUE 2400 BAUD
   47 0042 D2 8E      .B..                       SETB    TR1           ; LET TIMER-
                                 1 RUN
   48 0044 D2 8C      .B..                       SETB    TR0           ; LET TIMER-
                                 0 RUN
   49 0046 D2 96      .B..                       SETB    P1.6
   50 0048 C2 97      .B..                       CLR     P1.7
   51 004A 02 00 A3   ..C.                       LJMP    BEGIN
```

-70-

```
Er Line Addr Object        Type
   52
   53 004D 11 96              ;           LJMP    RESUME
   54 004F FA                 RESUME      ACALL   RX
   55 0050 11 8E                          MOV     R2,A
   56 0052 11 96                          ACALL   TX
   57 0054 FB                             ACALL   RX
   58 0055 11 8E                          MOV     R3,A
   59 0057 90 40 00                       ACALL   TX
   60 005A 11 96              LOOP        MOV     DPTR,#04000h
   61 005C F0                             ACALL   RX
   62                         ;           MOVX    @DPTR,A
   63                         ;           MOVX    A,@DPTR
   64 005D A3                             ACALL   TX
   65 005E C3                             INC     DPTR
   66 005F EB                             CLR     C
   67 0060 94 01                          MOV     A,R3
   68 0062 FB                             SUBB    A,#1
   69 0063 EA                             MOV     R3,A
   70 0064 94 00                          MOV     A,R2
   71 0066 FA                             SUBB    A,#0
   72 0067 50 F1              .R..        MOV     R2,A
   73 0069 74 5A                          JNC     LOOP
   74 006B 11 8E                          MOV     A,#05Ah
   75 006D 90 40 00                       ACALL   TX
   76 0070 74 00                          MOV     DPTR,#04000h
   77 0072 93                             MOV     A,#000h
   78 0073 11 8E                          MOVC    A,@A+DPTR
   79 0075 74 01                          ACALL   TX
   80 0077 93                             MOV     A,#001h
   81 0078 11 8E                          MOVC    A,@A+DPTR
   82 007A 74 A5                          ACALL   TX
   83 007C 11 8E                          MOV     A,#0A5h
   84 007E 90 01 00                       ACALL   TX
   85 0081 74 00                          MOV     DPTR,#00100h
   86 0083 93                             MOV     A,#000h
   87 0084 11 8E                          MOVC    A,@A+DPTR
   88 0086 74 01                          ACALL   TX
   89 0088 93                             MOV     A,#001h
   90 0089 11 8E                          MOVC    A,@A+DPTR
   91 008B 02 40 00                       ACALL   TX
   92                                     LJMP    04000h
   93
   94 008E 30 99 FD           .BR.   TX   JNB     TI,TX
   95 0091 C2 99              .B..        CLR     TI
   96 0093 F5 99              .D..        MOV     SBUF,A
   97 0095 22                             RET
   98
   99 0096 D2 95              .B..   RX   SETB    P1.5
  100 0098 C2 95              .B..        CLR     P1.5
  101 009A 30 98 F9           .BR.        JNB     RI,RX
  102 009D C2 98              .B..        CLR     RI
```

```
Er Line Addr Object      Type 103 009F E5 99         .D..              MOV     A,SBUF
    104 00A1 22                              RET
    105
    106 00A2 32                      RTIX    RETI
    107
    108 0002                         TEST    EQU     3 AND 10
    109
    110                              BEGIN
    111 00A3 C2 95         .B..              CLR     P1.5
    112 00A5 D1 3E                           ACALL   STINI
    113 00A7 75 22 00                        MOV     MODES,#0
    114 00AA 02 04 61      ..C.              LJMP    INIT
    115
    116 00AD 20 21 04      .BR.    MAIN      JB      BAR_HORN,MAINA
    117 00B0 C2 95         .B..              CLR     P1.5
    118 00B2 80 02         .R..              SJMP    MAINB
    119                            MAINA
    120 00B4 D2 95         .B..              SETB    P1.5
    121 00B6 E5 66                 MAINB     MOV     A,COM_CNT
    122 00B8 70 0C         .R..              JNZ     MAINC
    123 00BA F1 8C                           ACALL   ERROR
    124 00BC E5 66                 MAINB1    MOV     A,COM_CNT
    125 00BE 60 FC         .R..              JZ      MAINB1
    126 00C0 75 35 00                        MOV     SPACE,#0
    127 00C3 75 36 00                        MOV     CAVITY,#0
    128                            MAINC
    129 00C6 71 5B                           ACALL   FLASH
    130 00C8 51 22                           ACALL   RECV
    131 00CA 30 14 02      .BR.              JNB     MD_TEST,MAIN8
    132 00CD C1 9F                           AJMP    SETUP
    133 00CF 51 6F                 MAIN8     ACALL   KEYACT
    134 00D1 B4 01 09      ..R.    MAIN1     CJNE    A,#STOP_BTN,MAIN1A
    135 00D4 75 22 00                        MOV     MODES,#0
    136 00D7 D2 11         .B..              SETB    MD_STOP
    137 00D9 C2 21         .B..              CLR     BAR_HORN
    138 00DB C2 7B                           CLR     WARNFLG
    139 00DD 30 11 27      .BR.    MAIN1A    JNB     MD_STOP,MAIN2
    140 00E0 75 60 06                        MOV     TXCMDBUF,#CMD_STOP
    141 00E3 75 61 00                        MOV     TXDATBUF,#0
    142 00E6 E5 62                           MOV     A,RXCMDBUF
    143 00E8 B4 06 C2      ..R.              CJNE    A,#CMD_STOP,MAIN
    144 00EB 75 37 00                        MOV     BARS,#0
    145 00EE 75 23 00                        MOV     LIGHTS,#0
    146 00F1 D2 19         .B..              SETB    LT_STOP         ; SET LIGHT
    147 00F3 91 D5                           ACALL   BARSET
    148 00F5 00                              NOP                     ; KILL HORN
    149 00F6 75 22 00                        MOV     MODES,#0
    150 00F9 D2 15         .B..              SETB    MD_IDLE
    151 00FB 75 62 00                        MOV     RXCMDBUF,#0
    152 00FE 75 63 00                        MOV     RXDATBUF,#0
    153 0101 75 60 00                        MOV     TXCMDBUF,#0
```

```
Er Line Addr Object      Type
   154 0104 75 61 00                       MOV     TXDATBUF,#0
   155 0107 B4 02 06     ..R.   MAIN2      CJNE    A,#02h,MAIN2A
   156 010A 75 33 00                       MOV     NEWKEY,#0
   157 010D 02 01 B3     ..C.              LJMP    START           ;DO START
                                                                    MODE
   158 0110 30 12 03     .BR.   MAIN2A     JNB     MD_RUN,MAIN3
   159 0113 02 01 B3     ..C.              LJMP    START           ;DO START
                                                                    MODE
   160                          MAIN3
   161                          ;
   162                          ;          MOV     A,P3
   163                          ;          ANL     A,#1Ch
                                           CJNE    A,#0Ch,MAIN3B
   164 0116 E5 B0        .D..              MOV     A,P3
   165 0118 54 14                          ANL     A,#14h
   166 011A 70 46        .R..              JNZ     MAIN3B
   167 011C D2 21        .B..              SETB    BAR_HORN
   168 011E C2 7B                          CLR     WARNFLG
   169 0120 00                             NOP                     ;SOUND HORN
   170 0121 20 13 0B     .BR.              JB      MD_FLUSH,MAIN3A
   171 0124 75 22 00                       MOV     MODES,#0
   172 0127 D2 13        .B..              SETB    MD_FLUSH
   173 0129 75 64 4B                       MOV     FLCNT1,#4Bh
   174 012C 75 65 03                       MOV     FLCNT2,#03h
   175                          MAIN3A
   176 012F E5 65                          MOV     A,FLCNT2
   177 0131 75 3C 8F                       MOV     DIG_5,#08Fh
   178 0134 75 4B 8F                       MOV     DIG_5A,#08Fh
   179 0137 44 80                          ORL     A,#080h
   180 0139 F5 3D                          MOV     DIG_6,A
   181 013B E5 64                          MOV     A,FLCNT1
   182 013D 75 F0 0A     .D..              MOV     B,#10
   183 0140 A4                             MUL     AB
   184 0141 E5 F0        .D..              MOV     A,B
   185 0143 44 80                          ORL     A,#080h
   186 0145 F5 3E                          MOV     DIG_7,A
   187 0147 E5 65                          MOV     A,FLCNT2
   188 0149 70 65        .R..              JNZ     MAINX
   189 014B E5 64                          MOV     A,FLCNT1
   190 014D 60 0A        .R..              JZ      MAIN3A1
   191 014F 14                             DEC     A
   192 0150 70 5E        .R..              JNZ     MAINX
   193 0152 75 23 00                       MOV     LIGHTS,#0
   194 0155 D2 1B        .B..              SETB    LT_FLUSH
   195 0157 91 D5                          ACALL   BARSET
   196                          MAIN3A1
   197 0159 75 60 07                       MOV     TXCMDBUF,#CMD_FLUSH
   198 015C 75 61 AA                       MOV     TXDATBUF,#0AAh
   199 015F 00                             NOP                     ; SET LIGHT
   200 0160 21 B0                          AJMP    MAINX
   201 0162 30 13 0C     .BR.   MAIN3B     JNB     MD_FLUSH,MAIN4
   202 0165 75 36 00                       MOV     CAVITY,#0
   203 0168 75 22 00                       MOV     MODES,#0
   204 016B D2 11        .B..              SETB    MD_STOP
```

```
Er Line Addr Object       Type 205 016D C2 21         .B..            CLR     BAR_HORN
    206 016F 21 B0                         AJMP    MAINX
    207
    208                            MAIN4
    209 0171 E5 35                         MOV     A,SPACE
    210 0173 60 05         .R..            JZ      main5A
    211 0175 C3                            CLR     C
    212 0176 95 46                         SUBB    A,SPCBUF
    213 0178 60 08         .R..            JZ      MAIN5
    214 017A 75 60 02              main5A  MOV     TXCMDBUF,#CMD_SPC
    215 017D 85 35 61                      MOV     TXDATBUF,SPACE
    216 0180 21 B0                         AJMP    MAINX
    217                            MAIN5
    218 0182 E5 36                         MOV     A,CAVITY
    219 0184 60 05         .R..            JZ      main6A
    220 0186 C3                            CLR     C
    221 0187 95 47                         SUBB    A,CAVBUF
    222 0189 60 08         .R..            JZ      MAIN6
    223 018B 75 60 01              main6A  MOV     TXCMDBUF,#CMD_CAV
    224 018E 85 36 61                      MOV     TXDATBUF,CAVITY
    225 0191 21 B0                         AJMP    MAINX
    226                            MAIN6
    227 0193 E5 90         .D..            MOV     A,P1
    228 0195 54 17                         ANL     A,#17h
    229 0197 B4 12 02      ..R.            CJNE    A,#12h,MAIN7
    230 019A C1 9F                         AJMP    SETUP
    231                            MAIN7
    232 019C E5 B0         .D..            MOV     A,P3
    233 019E 54 14                         ANL     A,#14h
    234 01A0 B4 14 0D      ..R.            CJNE    A,#14h,MAINX
    235 01A3 75 60 05                      MOV     TXCMDBUF,#CMD_IDLE
    236 01A6 85 65 61                      MOV     TXDATBUF,FLCNT2
    237 01A9 75 22 00                      MOV     MODES,#0
    238 01AC D2 15         .B..            SETB    MD_IDLE
    239 01AE 21 B0                         AJMP    MAINX
    240 01B0 02 00 AD      ..C.    MAINX   LJMP    MAIN
    241
    242                            START;
    243 01B3 20 12 28      .BR.            JB      MD_RUN,START1
    244 01B6 E5 52                         MOV     A,52h
    245 01B8 75 F0 F4      .D..            MOV     B,#0F4h
    246 01BB A4                            MUL     AB
    247 01BC F5 65                         MOV     FLCNT2,A
    248 01BE 85 F0 65      .D..            MOV     FLCNT2,B
    249 01C1 E5 36                         MOV     A,CAVITY
    250 01C3 C3                            CLR     C
    251 01C4 94 0D                         SUBB    A,#13
    252 01C6 60 07         .R..            JZ      STARTEX
    253 01C8 E5 35                         MOV     A,SPACE
    254 01CA 60 03         .R..            JZ      STARTEX
    255 01CC 20 15 0F      .BR.            JB      MD_IDLE,START1
```

```
Er Line Addr Object        Type
    256 01CF D2 21          .B..   STARTEX   SETB    BAR_HORN
    257 01D1 D2 7B                           SETB    WARNFLG
    258 01D3 75 22 00                        MOV     MODES,#0
    259 01D6 D2 11          .B..             SETB    MD_STOP
    260 01D8 75 35 00                        MOV     SPACE,#0
    261 01DB 02 01 B0       ..C.             LJMP    MAINX
    262 01DE 30 B4 EE       .BR.   START1    JNB     P3.4,STARTEX
    263 01E1 30 B3 EB       .BR.             JNB     P3.3,STARTEX
    264 01E4 20 12 07       .BR.             JB      MD_RUN,START1A
    265 01E7 75 23 00                        MOV     LIGHTS,#0
    266 01EA D2 1A          .B..             SETB    LT_RUN
    267 01EC 91 D5                           ACALL   BARSET
    268                            START1A
    269 01EE E5 64                           MOV     A,FLCNT1
    270 01F0 45 65                           ORL     A,FLCNT2
    271 01F2 60 DB          .R..             JZ      STARTEX
    272 01F4 D2 12          .B..             SETB    MD_RUN
    273 01F6 E5 46                           MOV     A,SPCBUF
    274 01F8 C3                              CLR     C
    275 01F9 95 35                           SUBB    A,SPACE
    276 01FB 60 08          .R..             JZ      START2
    277 01FD 75 60 02                        MOV     TXCMDBUF,#CMD_SPC
    278 0200 85 35 61                        MOV     TXDATBUF,SPACE
    279 0203 21 B0                           AJMP    MAINX
    280 0205 E5 47                 START2    MOV     A,CAVBUF
    281 0207 C3                              CLR     C
    282 0208 95 36                           SUBB    A,CAVITY
    283 020A 60 08          .R..             JZ      START3
    284 020C 75 60 01                        MOV     TXCMDBUF,#CMD_CAV
    285 020F 85 36 61                        MOV     TXDATBUF,CAVITY
    286 0212 21 B0                           AJMP    MAINX
    287                            START3
    288 0214 75 22 00                        MOV     MODES,#0
    289 0217 D2 12          .B..             SETB    MD_RUN
    290 0219 75 60 09                        MOV     TXCMDBUF,#CMD_START
    291 021C 85 37 61                        MOV     TXDATBUF,BARS
    292 021F 02 01 B0       ..C.             LJMP    MAINX
    293
    294
    295 0222 30 12 0F       .BR.   RECV      JNB     MD_RUN,RECVA
    296 0225 E5 45                           MOV     A,BARSBUF
    297 0227 60 0B          .R..             JZ      RECVA
    298 0229 E5 52                           MOV     A,52h
    299 022B 75 F0 F4       .D..             MOV     B,#0F4h
    300 022E A4                              MUL     AB
    301 022F F5 65                           MOV     FLCNT2,A
    302 0231 85 F0 65       .D..             MOV     FLCNT2,B
    303                            RECVA
    304 0234 30 7E 31       ..R.             JNB     RXOK,RECVX
    305 0237 C2 7E                           CLR     RXOK
    306 0239 E5 62                           MOV     A,RXCMDBUF
```

```
Er Line Addr Object        Type
    307 023B B4 01 0E       ..R.                  CJNE    A,#CMD_CAV,RECV5
    308 023E 85 63 47                             MOV     CAVBUF,RXDATBUF
    309 0241 E5 36                                MOV     A,CAVITY
    310 0243 70 23          .R..                  JNZ     RECVX
    311 0245 85 47 36                             MOV     CAVITY,CAVBUF
    312 0248 12 02 E7       ..C.                  LCALL   DIGSET
    313 024B 22                                   RET
    314 024C B4 02 0E       ..R.    RECV5         CJNE    A,#CMD_SPC,RECV6
    315 024F 85 63 46                             MOV     SPCBUF,RXDATBUF
    316 0252 E5 35                                MOV     A,SPACE
    317 0254 70 12          .R..                  JNZ     RECVX
    318 0256 85 46 35                             MOV     SPACE,SPCBUF
    319                             ;             MOV     SPACE,#23
    320 0259 12 02 E7       ..C.                  LCALL   DIGSET
    321 025C 22                                   RET
    322 025D B4 04 08       ..R.    RECV6         CJNE    A,#CMD_BARS,RECVX
    323 0260 85 63 45                             MOV     BARSBUF,RXDATBUF
    324 0263 E5 45                                MOV     A,BARSBUF
    325 0265 B5 37 01       ..R.                  CJNE    A,BARS,RECV7
    326 0268 22                     RECVX         RET
    327 0269 F5 37                  RECV7         MOV     BARS,A
    328 026B 12 02 E7       ..C.                  LCALL   DIGSET
    329 026E 22                                   RET
    330
    331 0011                        STOP      EQU     MODES.1
    332 0001                        STOP_BTN  EQU     01h
    333
    334 00B2                        START_KEY EQU     P3.2
    335 00B3                        STOP_KEY  EQU     P3.3
    336 00B4                        FLUSH_KEY EQU     P3.4
    337                             ;    START =    P3.2    LOW = PRESSED
    338                             ;    STOP  =    P3.3
    339                             ;    FLUSH =    P3.4
    340
    341                             ;    COMMAND DEFINITIONS
    342 0001                        CMD_CAV    EQU     01h
    343 0002                        CMD_SPC    EQU     02h
    344 0003                        CMD_ERRS   EQU     03h
    345 0004                        CMD_BARS   EQU     04h
    346 0005                        CMD_IDLE   EQU     05h
    347 0006                        CMD_STOP   EQU     06h
    348 0007                        CMD_FLUSH  EQU     07h
    349 0008                        CMD_MODE   EQU     08h
    350 0009                        CMD_START  EQU     09h
    351 000A                        CMD_SETUP  EQU     0Ah
    352 000B                        CMD_CAL    EQU     0Bh
    353 000C                        CMD_FL_SPD EQU     0Ch
    354                             ;   WARNS DEFINITIONS
    355 0021                        BAR_HORN   EQU     WARNS.1
    356 0022                        BLINK      EQU     WARNS.2
    357                             ;   MODE DEFINITIONS
```

```
Er Line Addr Object       Type 358 0011                        MD_STOP    EQU  MODES.1
   359 0012                        MD_RUN     EQU  MODES.2
   360 0013                        MD_FLUSH   EQU  MODES.3
   361 0014                        MD_TEST    EQU  MODES.4
   362 0015                        MD_IDLE    EQU  MODES.5
   363 0019                        LT_STOP    EQU  LIGHTS.1
   364 001A                        LT_RUN     EQU  LIGHTS.2
   365 001B                        LT_FLUSH   EQU  LIGHTS.3
   366 001C                        LT_TEST    EQU  LIGHTS.4
   367 001D                        LT_IDLE    EQU  LIGHTS.5
   368                         ;   ERROR DEFINITIONS
   369 0001                        ERR_STUCK    EQU  01
   370 0002                        ERR_OPEN     EQU  02
   371 0003                        ERR_SHORT    EQU  03
   372 0004                        ERR_RUNAWAY  EQU  04
   373
   374 026F E5 33                  KEYACT    MOV   A,NEWKEY
   375 0271 60 17          .R..              JZ    kyactX
   376 0273 75 33 00                         MOV   NEWKEY,#0
   377 0276 B4 04 02       ..R.              CJNE  A,#4,kyactE
   378 0279 41 8F                            AJMP  INC_SPC
   379 027B B4 05 02       ..R.    kyactE    CJNE  A,#5,kyactF
   380 027E 41 8B                            AJMP  DEC_SPC
   381 0280 B4 06 02       ..R.    kyactF    CJNE  A,#6,kyactG
   382 0283 41 C0                            AJMP  INC_CAV
   383 0285 B4 07 02       ..R.    kyactG    CJNE  A,#7,kyactX
   384 0288 41 A9                            AJMP  DEC_CAV
   385 028A 22                      kyactX    RET
   386
   387 028B 15 35                   DEC_SPC   DEC   SPACE
   388 028D 80 02          .R..              SJMP  D_S
   389 028F 05 35                   INC_SPC   INC   SPACE
   390 0291 E5 35                   D_S       MOV   A,SPACE
   391 0293 B4 08 00       ..R.              CJNE  A,#8,I_S2
   392 0296 50 05          .R..    I_S2      JNC   I_S3
   393 0298 75 35 08                         MOV   SPACE,#8
   394 029B 80 08          .R..              SJMP  I_SX
   395 029D B4 C0 00       ..R.    I_S3      CJNE  A,#192,I_S4
   396 02A0 40 03          .R..    I_S4      JC    I_SX
   397 02A2 75 35 C0                         MOV   SPACE,#192
   398 02A5 E4                      I_SX      CLR   A
   399 02A6 02 02 E7       ..C.              LJMP  DIGSET
   400
   401 02A9 15 36                   DEC_CAV   DEC   CAVITY
   402 02AB E5 36                             MOV   A,CAVITY
   403 02AD C3                                CLR   C
   404 02AF 94 06                             SUBB  A,#6
   405 02B0 50 05          .R..              JNC   D_C1
   406 02B2 75 36 04                         MOV   CAVITY,#4
   407 02B5 80 2C          .R..              SJMP  I_CX
   408 02B7 94 06                   D_C1      SUBB  A,#6
```

-77-

```
Er Line Addr Object        Type
   409 02B9 50 1C           .R..                  JNC       I_C8
   410 02BB 75 36 06                              MOV       CAVITY,#6
   411 02BE 80 23           .R..                  SJMP      I_CX
   412 02C0 05 36                   INC_CAV       INC       CAVITY
   413 02C2 E5 36                                 MOV       A,CAVITY
   414 02C4 C3                                    CLR       C
   415 02C5 94 06                                 SUBB      A,#6
   416 02C7 50 05           .R..                  JNC       I_C1
   417 02C9 75 36 06                              MOV       CAVITY,#6
   418 02CC 80 15           .R..                  SJMP      I_CX
   419 02CE 94 06                   I_C1          SUBB      A,#6
   420 02D0 50 05           .R..                  JNC       I_C8
   421 02D2 75 36 0C                              MOV       CAVITY,#12
   422 02D5 80 0C           .R..                  SJMP      I_CX
   423 02D7 E5 36                   I_C8          MOV       A,CAVITY
   424 02D9 B4 90 02        ..R.                  CJNE      A,#144,I_C9
   425 02DC 80 05           .R..                  SJMP      I_CX
   426 02DE 40 03           .R..   I_C9           JC        I_CX
   427 02E0 75 36 90                              MOV       CAVITY,#144
   428 02E3 E4                     I_CX           CLR       A
   429 02E4 02 02 E7        ..C.                  LJMP      DIGSET
   430
   431 02E7 E5 35                   DIGSET        MOV       A,SPACE
   432 02E9 85 35 20                DIGSG2        MOV       DIG_PTR,SPACE
   433 02EC 75 3B 08                              MOV       DIG_4,#8
   434 02EF 30 00 08        .BR.                  JNB       DIG_PTR.0,DIG14A
   435 02F2 E5 20                                 MOV       A,DIG_PTR
   436 02F4 54 07                                 ANL       A,#007h
   437 02F6 F5 3A                                 MOV       DIG_3,A
   438 02F8 80 20           .R..                  SJMP      DIG14X
   439 02FA 75 3B 04                DIG14A        MOV       DIG_4,#4
   440 02FD 30 01 09        .BR.                  JNB       DIG_PTR.1,DIG14B
   441 0300 E5 20                                 MOV       A,DIG_PTR
   442 0302 54 07                                 ANL       A,#007h
   443 0304 03                                    RR        A
   444 0305 F5 3A                                 MOV       DIG_3,A
   445 0307 80 11           .R..                  SJMP      DIG14X
   446 0309 75 3B 02                DIG14B        MOV       DIG_4,#2
   447 030C 30 02 05        .BR.                  JNB       DIG_PTR.2,DIG14C
   448 030F 75 3A 01                              MOV       DIG_3,#1
   449 0312 80 06           .R..                  SJMP      DIG14X
   450 0314 75 3B 0F                DIG14C        MOV       DIG_4,#00Fh
   451 0317 75 3A 0F                              MOV       DIG_3,#00Fh
   452 031A E5 20                   DIG14X        MOV       A,DIG_PTR
   453 031C 75 F0 08        .D..                  MOV       B,#8
   454 031F 84                                    DIV       AB
   455 0320 75 F0 0A        .D..                  MOV       B,#10
   456 0323 84                                    DIV       AB
   457 0324 F5 38                                 MOV       DIG_1,A
   458 0326 85 F0 39        .D..                  MOV       DIG_2,B
   459 0329 70 03           .R..                  JNZ       DIG57
```

-78-

```
Er Line Addr Object        Type
   460 032B 75 38 OF                  MOV    DIG_1,#00Fh
   461 032E E5 36                DIG57 MOV   A,CAVITY
   462 0330 75 3C 00                  MOV    DIG_5,#0
   463 0333 05 3C               DIG57A INC   DIG_5
   464 0335 C3                        CLR    C
   465 0336 94 64                     SUBB   A,#100
   466 0338 50 F9          .R..       JNC    DIG57A
   467 033A 24 64                     ADD    A,#100
   468 033C D5 3C 03       ..R.       DJNZ   DIG_5,DIG57G10
   469 033F 75 3C OF                  MOV    DIG_5,#00Fh
   470 0342 75 F0 0A       .D..  DIG57G10 MOV B,#10
   471 0345 84                        DIV    AB
   472 0346 F5 3D                     MOV    DIG_6,A
   473 0348 85 F0 3E       .D..       MOV    DIG_7,B
   474 034B E5 3D                     MOV    A,DIG_6
   475 034D 70 08          .R..       JNZ    DIG57X
   476 034F A8 3C                     MOV    R0,DIG_5
   477 0351 B8 0F 03       ..R.       CJNE   R0,#00Fh,DIG57X
   478 0354 75 3D 0F                  MOV    DIG_6,#00Fh
   479 0357 E4                  DIG57X CLR   A
   480 0358 81 D5                     AJMP   BARSET
   481 035A 22                        RET
   482
   483 035B C2 AF          .B..  FLASH CLR   EA
   484 035D 85 39 4C                  MOV    DIG_2A,DIG_2
   485 0360 85 3C 4B                  MOV    DIG_5A,DIG_5
   486 0363 20 0D 06       .BR.       JB     SECCNT.5,FLASH1
   487 0366 43 4C 80                  ORL    DIG_2A,#080h
   488 0369 43 4B 80                  ORL    DIG_5A,#080h
   489 036C D2 AF          .B..  FLASH1 SETB EA
   490 036E 20 7C 01       ..R.       JB     ALMFLAG,FLASH2
   491 0371 22                        RET
   492                          FLASH2
   493 0372 22                        RET
   494
   495 0373 75 34 31             STARTUP MOV SECCNTR,#49
   496 0376 90 03 AC       ..C.       MOV    DPTR,#SHWTBL
   497 0379 75 48 00                  MOV    TEMP1,#0
   498 037C E5 48               STPLP1 MOV   A,TEMP1
   499                            ;   MOV    DPTR,#SHWTBL
   500 037E 93                        MOVC   A,@A+DPTR
   501 037F F5 4A                     MOV    TEMP3,A
   502 0381 05 48                     INC    TEMP1
   503 0383 E5 48                     MOV    A,TEMP1
   504                            ;   MOV    DPTR,#SHWTBL
   505 0385 93                        MOVC   A,@A+DPTR
   506 0386 F5 36                     MOV    CAVITY,A
   507 0388 05 48                     INC    TEMP1
   508 038A E5 48                     MOV    A,TEMP1
   509                            ;   MOV    DPTR,#SHWTBL
   510 038C 93                        MOVC   A,@A+DPTR
```

```
Er Line Addr Object        Type 511 038D F5 35                              MOV     SPACE,A
    512 038F 05 48                              INC     TEMP1
    513 0391 12 02 E7       ..C.                LCALL   DIGSET
    514 0394 E5 34                  STLPd       MOV     A,SECCNTR
    515 0396 70 FC          .R..                JNZ     STLPd
    516 0398 75 34 31                           MOV     SECCNTR,#49
    517 039B E5 48                              MOV     A,TEMP1
    518 039D C3                                 CLR     C
    519 039E 94 24                              SUBB    A,#36
    520 03A0 40 DA          .R..                JC      STPLP1
    521 03A2 75 35 00                           MOV     SPACE,#00
    522 03A5 75 36 00                           MOV     CAVITY,#00
    523 03A8 12 02 E7       ..C.                LCALL   DIGSET
    524 03AB 22                                 RET
    525
    526 03AC 05 90 BF             SHWTBL        DB      5,144,(23*8)+7
    527 03AF 05 90 BF                           DB      5,144,(23*8)+7
    528 03B2 05 8S 6E                           DB      5,133,(13*8)+6
    529 03B5 04 7A 65                           DB      4,122,(12*8)+5
    530 03B8 04 6F 5C                           DB      4,111,(11*8)+4
    531 03BB 03 64 53                           DB      3,100,(10*8)+3
    532 03BE 03 63 4A                           DB      3,99,(9*8)+2
    533 03C1 02 58 41                           DB      2,88,(8*8)+1
    534 03C4 02 4D 38                           DB      2,77,(7*8)+0
    535 03C7 01 42 30                           DB      1,66,(6*8)+0
    536 03CA 01 37 28                           DB      1,55,(5*8)+0
    537 03CD 01 37 28                           DB      1,55,(5*8)+0
    538 03D0 00 00 00                           DB      0,0,0
    539 03D3 BF                                 DB      (23*8)+7
    540
    541
    542 03D4 20 99 04       .BR.    SERINT      JB      TI,TXINT
    543 03D7 20 98 48       .BR.                JB      RI,RXINT
    544 03DA 32                                 RETI
    545 03DB C0 E0          .D..    TXINT       PUSH    ACC
    546 03DD C0 D0          .D..                PUSH    PSW
    547 03DF EC                                 MOV     A,R4
    548 03E0 60 32          .R..                JZ      TXINTX
    549 03E2 B4 04 0B       ..R.                CJNE    A,#4,TXINT3
    550 03E5 74 D0                              MOV     A,#0D0h
    551 03E7 D5 E0 FD       .DR.                DJNZ    ACC,TXINT4
    552 03EA 75 99 D6       .D..                MOV     SBUF,#0D6h
    553 03ED 1C                                 DEC     R4
    554 03EE 80 2B          .R..                SJMP    TXINTX2
    555 03F0 B4 03 06       ..R.    TXINT3      CJNE    A,#3,TXINT2
    556 03F3 85 60 99       ..D.                MOV     SBUF,TXCMDBUF
    557 03F6 1C                                 DEC     R4
    558 03F7 80 22          .R..                SJMP    TXINTX2
    559 03F9 B4 02 06       ..R.    TXINT2      CJNE    A,#2,TXINT1
    560 03FC 85 61 99       ..D.                MOV     SBUF,TXDATBUF
    561 03FF 1C                                 DEC     R4
```

-80-

```
Er Line Addr Object       Type
   562 0400 80 19         .R..           SJMP    TXINTX2
   563 0402 B4 01 0F      ..R.   TXINT1  CJNE    A,#1,TXINTX
   564 0405 74 D6                        MOV     A,#0D6h
   565 0407 25 60                        ADD     A,TXCMDBUF
   566 0409 25 61                        ADD     A,TXDATBUF
   567 040B 54 7F                        ANL     A,#7Fh
   568 040D F5 99         .D..           MOV     SBUF,A
   569 040F 1C                           DEC     R4
   570                              ;    MOV     TXCMDBUF,#0
   571                              ;    MOV     TXDATBUF,#0
   572 0410 D2 7D                        SETB    TXOK
   573 0412 80 07         .R..           SJMP    TXINTX2
   574 0414 74 D0                TXINTX  MOV     A,#0D0h
   575 0416 D5 E0 FD      .DR.   TXINTX1 DJNZ    ACC,TXINTX1
   576 0419 C2 97         .B..           CLR     P1.7
   577 041B C2 99         .B..   TXINTX2 CLR     TI
   578 041D D0 D0         .D..           POP     PSW
   579 041F D0 E0         .D..           POP     ACC
   580 0421 32                           RETI
   581
   582 0422 C0 E0         .D..   RXINT   PUSH    ACC
   583 0424 C0 D0         .D..           PUSH    PSW
   584 0426 E5 99         .D..           MOV     A,SBUF
   585 0428 B4 D9 09      ..R.           CJNE    A,#0D9h,RXINT1
   586 042B 7D 03                        MOV     R5,#3
   587 042D C2 98         .B..   RXINTX  CLR     RI
   588 042F D0 D0         .D..           POP     PSW
   589 0431 D0 E0         .D..           POP     ACC
   590 0433 32                           RETI
   591 0434 ED                   RXINT1  MOV     A,R5
   592 0435 B4 03 06      ..R.           CJNE    A,#3,RXINT2
   593 0438 85 99 62      .D..           MOV     RXCMDBUF,SBUF
   594 043B 1D                           DEC     R5
   595 043C 80 EF         .R..           SJMP    RXINTX
   596 043E B4 02 06      ..R.   RXINT2  CJNE    A,#2,RXINT3
   597 0441 85 99 63      .D..           MOV     RXDATBUF,SBUF
   598 0444 1D                           DEC     R5
   599 0445 80 E6         .R..           SJMP    RXINTX
   600 0447 B4 01 13      ..R.   RXINT3  CJNE    A,#1,RXINT4
   601 044A 1D                           DEC     R5
   602 044B 74 D9                        MOV     A,#0D9h
   603 044D 25 62                        ADD     A,RXCMDBUF
   604 044F 25 63                        ADD     A,RXDATBUF
   605 0451 54 7F                        ANL     A,#7Fh
   606 0453 B5 99 D7      .DR.           CJNE    A,SBUF,RXINTX
   607 0456 D2 7E                        SETB    RXOK
   608 0458 75 66 FF                     MOV     COM_CNT,#0FFh
   609 045B 80 D0         .R..           SJMP    RXINTX
   610 045D 7D 00                RXINT4  MOV     R5,#0
   611 045F 80 CC         .R..           SJMP    RXINTX
   612
```

-81-

```
Er Line Addr Object       Type
   613 0461 75 81 67      .D..    INIT    MOV     SP,#067h        ; MOV STACK
                                          POINTER TO SAFE AREA
   614 0464 75 90 7F      .D..            MOV     P1,#07Fh        ; Must = 1 to
                                          be used for input
   615 0467 75 87 80      .D..            MOV     087h,#80h       ; PCON = NOT
                                          DOUBLE BAUD RATE
   616 046A 75 89 21      .D..            MOV     TMOD,#021h      ; TIMER-1 =
   617                            ;       (Mode-2) 8-BIT AUTO-RELOAD
                                                                  ; TIMER-0 =
                                          (Mode-1) 16-BIT
   618 046D 75 8A 00      .D..            MOV     TL0,#00h
   619 0470 75 8C 00      .D..            MOV     TH0,#00h
   620 0473 C2 98         .B..            CLR     RI
   621 0475 C2 99         .B..            CLR     TI
   622 0477 C2 8D         .B..            CLR     TF0
   623 0479 D2 8C         .B..            SETB    TR0
   624 047B D2 AF         .B..            SETB    EA
   625 047D D2 A9         .B..            SETB    ET0
   626 047F D2 AC         .B..            SETB    ES
   627 0481 75 60 00              MOV     TXCMDBUF,#0
   628 0484 75 61 00              MOV     TXDATBUF,#0
   629 0487 75 32 00              MOV     KEYUPCNT,#0
   630 048A 75 31 00              MOV     SCANCNT,#0
   631 048D 75 33 00              MOV     NEWKEY,#0
   632 0490 75 4E 00              MOV     OKEY,#0
   633 0493 75 35 00              MOV     SPACE,#0
   634 0496 75 36 00              MOV     CAVITY,#0
   635 0499 75 46 0F              MOV     SPCBUF,#15
   636 049C 75 47 0C              MOV     CAVBUF,#12
   637 049F C2 7C                 CLR     ALMFLAG
   638 04A1 C2 7B                 CLR     WARNFLG
   639 04A3 90 C0 01               MOV     DPTR,#0C001h
   640 04A6 74 F0                 MOV     A,#0F0h
   641 04A8 F0                    MOVX    @DPTR,A
   642 04A9 75 90 7F      .D..    MOV     P1,#07Fh        ; Must = 1 to
                                          be used for input
   643 04AC 75 80 FF      .D..    MOV     P3,#0FFh        ; Must = 1 to
                                          be used for input
   644 04AF C2 99         .B..    CLR     TI
   645 04B1 75 3C 8F              MOV     DIG_5,#08Fh
   646 04B4 75 4B 8F              MOV     DIG_5A,#08Fh
   647 04B7 12 03 73      ..C.    LCALL   STARTUP
   648 04BA 75 37 00              MOV     BARS,#0
   649 04BD 75 35 00              MOV     SPACE,#0
   650 04C0 75 36 00              MOV     CAVITY,#0
   651 04C3 75 46 0F              MOV     SPCBUF,#15
   652 04C6 75 47 0C              MOV     CAVBUF,#12
   653 04C9 75 22 00              MOV     MODES,#0
   654 04CC D2 11         .B..    SETB    MD_STOP
   655 04CE C2 21         .B..    CLR     BAR_HORN
   656 04D0 F1 68                 ACALL   PRIME
   657 04D2 02 00 AD      ..C.    LJMP    MAIN
   658
   659                    BARSET
   660 04D5 43 38 80              ORL     DIG_1,#080h
   661 04D8 43 39 80              ORL     DIG_2,#080h
   662 04DB 43 3A 80              ORL     DIG_3,#080h
   663 04DE 43 3B 80              ORL     DIG_4,#080h
```

-82-

```
Er Line Addr Object     Type
   664 04E1 43 3C 80                    ORL    DIG_5,#080h
   665 04E4 43 3E 80                    ORL    DIG_7,#080h
   666 04E7 20 1B 03    .BR.             JB     LT_FLUSH,BARD
   667 04EA 43 4F 80                    ORL    DIG_8,#080h
   668 04ED 20 19 05    .BR.  BARD       JB     LT_STOP,BARD1
   669 04F0 43 3D 80                    ORL    DIG_6,#080h
   670 04F3 80 05       .R..             SJMP   BARC
   671                        BARD1
   672 04F5 C2 21       .B..             CLR    BAR_HORN
   673 04F7 74 00                        MOV    A,#0
   674 04F9 22                           RET
   675 04FA 20 1A 03    .BR.  BARC       JB     LT_RUN,BARB
   676 04FD 43 3E 80                    ORL    DIG_7,#080h
   677 0500 E5 37             BARB       MOV    A,BARS
   678 0502 60 F1       .R..             JZ     BARD1
   679                        ;          CLR    C
   680                        ;          SUBB   A,#12h
   681                        ;          JC     BARX
   682                        ;BARB1     MOV    B,#25h
   683                        ;          MUL    AB
   684                        ;          MOV    A,B
   685                        ;          JNZ    BARA
   686                        ;          SETB   BAR_HORN
   687                        ;          RET
   688                        ;BARA
   689 0504 14                           DEC    A
   690 0505 70 08       .R..             JNZ    BAR1
   691 0507 D2 21       .B..             SETB   BAR_HORN
   692 0509 53 3C 7F                    ANL    DIG_5,#07Fh
   693 050C 74 00                        MOV    A,#0
   694 050E 22                           RET
   695                        BAR1
   696 050F 53 3E 7F                    ANL    DIG_7,#07Fh
   697 0512 B4 01 08    ..R.             CJNE   A,#1,BAR2
   698 0515 C2 21       .B..             CLR    BAR_HORN
   699 0517 53 3C 7F                    ANL    DIG_5,#07Fh
   700 051A 74 00             BARX       MOV    A,#0
   701 051C 22                           RET
   702 051D B4 02 0B    ..R.  BAR2       CJNE   A,#2,BAR3
   703 0520 C2 21       .B..             CLR    BAR_HORN
   704 0522 53 3B 7F                    ANL    DIG_4,#07Fh
   705 0525 53 3C 7F                    ANL    DIG_5,#07Fh
   706 0528 74 00                        MOV    A,#0
   707 052A 22                           RET
   708 052B B4 03 08    ..R.  BAR3       CJNE   A,#3,BAR4
   709 052E C2 21       .B..             CLR    BAR_HORN
   710 0530 53 3B 7F                    ANL    DIG_4,#07Fh
   711 0533 74 00                        MOV    A,#0
   712 0535 22                           RET
   713 0536 B4 04 08    ..R.  BAR4       CJNE   A,#4,BAR5
   714 0539 C2 21       .B..             CLR    BAR_HORN
```

-83-

| Er | Line | Addr | Object | | Type | | | |
|---|---|---|---|---|---|---|---|---|
| | 715 | 053B | 53 3A 7F | | | | ANL | DIG_3,#07Fh |
| | 716 | 053E | 74 00 | | | | MOV | A,#0 |
| | 717 | 0540 | 22 | | | | RET | |
| | 718 | 0541 | B4 05 08 | | ..R. | BAR5 | CJNE | A,#5,BAR6 |
| | 719 | 0544 | C2 21 | | .B.. | | CLR | BAR_HORN |
| | 720 | 0546 | 53 38 7F | | | | ANL | DIG_1,#07Fh |
| | 721 | 0549 | 74 00 | | | | MOV | A,#0 |
| | 722 | 054B | 22 | | | | RET | |
| | 723 | 054C | B4 06 0B | | ..R. | BAR6 | CJNE | A,#6,BAR7 |
| | 724 | 054F | C2 21 | | .B.. | | CLR | BAR_HORN |
| | 725 | 0551 | 53 38 7F | | | | ANL | DIG_1,#07Fh |
| | 726 | 0554 | 53 39 7F | | | | ANL | DIG_2,#07Fh |
| | 727 | 0557 | 74 00 | | | | MOV | A,#0 |
| | 728 | 0559 | 22 | | | | RET | |
| | 729 | 055A | B4 07 08 | | ..R. | BAR7 | CJNE | A,#7,BAR8 |
| | 730 | 055D | C2 21 | | .B.. | | CLR | BAR_HORN |
| | 731 | 055F | 53 39 7F | | | | ANL | DIG_2,#07Fh |
| | 732 | 0562 | 74 00 | | | | MOV | A,#0 |
| | 733 | 0564 | 22 | | | | RET | |
| | 734 | 0565 | B4 08 08 | | ..R. | BAR8 | CJNE | A,#8,BAR9 |
| | 735 | 0568 | D2 21 | | .B.. | | SETB | BAR_HORN |
| | 736 | 056A | 53 39 7F | | | | ANL | DIG_2,#07Fh |
| | 737 | 056D | 74 00 | | | | MOV | A,#0 |
| | 738 | 056F | 22 | | | | RET | |
| | 739 | 0570 | 53 39 7F | | | BAR9 | ANL | DIG_2,#07Fh |
| | 740 | 0573 | D2 21 | | .B.. | | SETB | BAR_HORN |
| | 741 | 0575 | 74 00 | | | | MOV | A,#0 |
| | 742 | 0577 | 22 | | | | RET | |
| | 743 | | | | | | | |
| | 744 | 0578 | C0 E0 | | .D.. | TMR0_INT | PUSH | ACC |
| | 745 | 057A | C0 D0 | | .D.. | | PUSH | PSW |
| | 746 | 057C | C0 83 | | .D.. | | PUSH | DPH |
| | 747 | 057E | C0 82 | | .D.. | | PUSH | DPL |
| | 748 | 0580 | 15 34 | | | | DEC | SECCNTR |
| | 749 | 0582 | E5 30 | | | | MOV | A,DISCNT |
| | 750 | 0584 | 70 0E | | .R.. | | JNZ | TMR0A |
| | 751 | 0586 | D2 97 | | .B.. | | SETB | P1.7 |
| | 752 | 0588 | C2 96 | | .B.. | | CLR | P1.6 |
| | 753 | 058A | 7C 04 | | | | MOV | R4,#4 |
| | 754 | 058C | 75 99 FF | | .D.. | | MOV | SBUF,#0FFh |
| | 755 | 058F | D2 7F | | | | SETB | RXOKT |
| | 756 | 0591 | 75 30 18 | | | | MOV | DISCNT,#24 | ;240 = 1 SEC |
| | 757 | | | | | ; | MOV | DISCNT,#120 | ;240 = 1 SEC |
| | 758 | 0594 | B4 04 00 | | ..R. | TMR0A | CJNE | A,#4,TMR0B |
| | 759 | 0597 | B4 04 00 | | ..R. | TMR0B | CJNE | A,#4,TMR0C |
| | 760 | | | | | TMR0C | | |
| | 761 | 059A | E5 64 | | | | MOV | A,FLCNT1 |
| | 762 | 059C | 45 65 | | | | ORL | A,FLCNT2 |
| | 763 | 059E | 60 0D | | .R.. | | JZ | TMR0D |
| | 764 | 05A0 | C3 | | | | CLR | C |
| | 765 | 05A1 | E5 64 | | | | MOV | A,FLCNT1 |

```
Er Line Addr Object      Type                              
    766 05A3 94 01                          SUBB    A,#1
    767 05A5 F5 64                          MOV     FLCNT1,A
    768 05A7 E5 65                          MOV     A,FLCNT2
    769 05A9 94 00                          SUBB    A,#0
    770 05AB F5 65                          MOV     FLCNT2,A
    771                  TMROD
    772 05AD 15 30                          DEC     DISCNT
    773 05AF 05 21                          INC     SECCNT
    774 05B1 30 09 31    .BR.                JNB    SECCNT.1,TIM3
    775 05B4 90 C0 01                       MOV     DPTR,#0C001h
    776 05B7 E5 66                          MOV     A,COM_CNT
    777 05B9 60 02       .R..                JZ     TIM0X
    778 05BB 15 66                          DEC     COM_CNT
    779 05BD 30 7B 07    ..R.   TIM0X       JNB     WARNFLG,TIM1A
    780 05C0 20 0E 04    .BR.                JB     SECCNT.6,TIM1A
    781 05C3 74 80                          MOV     A,#080h
    782 05C5 80 02       .R..               SJMP    TIM1B
    783 05C7 74 90              TIM1A       MOV     A,#090h
    784 05C9 F0                 TIM1B       MOVX    @DPTR,A     ;CONTROL
    785 05CA 90 C0 00                       MOV     DPTR,#0C000h
    786 05CD E5 38                          MOV     A,DIG_1
    787 05CF F0                             MOVX    @DPTR,A
    788 05D0 E5 4C                          MOV     A,DIG_2A
    789                         ;           MOV     A,DIG_2
    790 05D2 F0                             MOVX    @DPTR,A
    791 05D3 E5 3A                          MOV     A,DIG_3
    792 05D5 F0                             MOVX    @DPTR,A
    793 05D6 E5 3B                          MOV     A,DIG_4
    794 05D8 F0                             MOVX    @DPTR,A
    795 05D9 E5 4B                          MOV     A,DIG_5A
    796                         ;           MOV     A,DIG_5
    797 05DB F0                             MOVX    @DPTR,A
    798 05DC E5 3D                          MOV     A,DIG_6
    799 05DE F0                             MOVX    @DPTR,A
    800 05DF E5 3E                          MOV     A,DIG_7
    801 05E1 F0                             MOVX    @DPTR,A
    802 05E2 E5 4F                          MOV     A,DIG_8
    803 05E4 F0                             MOVX    @DPTR,A
    804
    805 05E5 E5 80       .D..   TIM3        MOV     A,P3
    806 05E7 44 E3                          ORL     A,#0E3h
    807 05E9 03                             RR      A
    808 05EA F5 4D                          MOV     KEYTEMP,A
    809 05EC E5 90       .D..                MOV    A,P1
    810 05EE 44 E8                          ORL     A,#0E8h
    811 05F0 C4                             SWAP    A
    812 05F1 55 4D                          ANL     A,KEYTEMP
    813 05F3 F4                             CPL     A
    814 05F4 90 07 EC    ..C.               MOV     DPTR,#KYTABL
    815 05F7 93                             MOVC    A,@A+DPTR
    816 05F8 F5 4D                          MOV     KEYTEMP,A
```

```
Er Line Addr Object        Type 817 05FA 70 1E          .R..            JNZ     KEYFND
   818 05FC 05 32                          INC     KEYUPCNT
   819 05FE C3                             CLR     C
   820 05FF E5 32                          MOV     A,KEYUPCNT
   821 0601 94 03                          SUBB    A,#3
   822 0603 40 06          .R..            JC      KEYX
   823 0605 75 4E 00                       MOV     OKEY,#0
   824 0608 75 31 00                       MOV     SCANCNT,#0
   825 060B 75 8C F0       .D.. KEYX       MOV     TH0,#0F0h
   826 060E 75 8A 00       .D..            MOV     TL0,#000h
   827 0611 D0 82          .D..            POP     DPL
   828 0613 D0 83          .D..            POP     DPH
   829 0615 D0 D0          .D..            POP     PSW
   830 0617 D0 E0          .D..            POP     ACC
   831 0619 32                             RETI
   832 061A 75 32 00            KEYFND     MOV     KEYUPCNT,#0
   833 061D 85 4D 4E                       MOV     OKEY,KEYTEMP
   834 0620 05 31                          INC     SCANCNT
   835 0622 E5 31                          MOV     A,SCANCNT
   836 0624 C3                             CLR     C
   837 0625 94 03                          SUBB    A,#3
   838 0627 60 10          .R..            JZ      KEYX2
   839 0629 40 E0          .R..            JC      KEYX
   840 062B 94 77                          SUBB    A,#119
   841 062D 40 DC          .R..            JC      KEYX
   842                                 ;   MOV     SCANCNT,#92
   843 062F 75 31 6C                       MOV     SCANCNT,#108
   844 0632 E5 4E                          MOV     A,OKEY
   845 0634 C3                             CLR     C
   846 0635 94 04                          SUBB    A,#4
   847 0637 40 D2          .R..            JC      KEYX
   848 0639 85 4E 33            KEYX2      MOV     NEWKEY,OKEY
   849 063C C1 0B                          AJMP    KEYX
   850
   851 063E 79 50               STINI      MOV     R1,#VALUE
   852 0640 77 00                          MOV     @R1,#00
   853 0642 09                             INC     R1
   854 0643 77 00                          MOV     @R1,#00
   855 0645 09                             INC     R1
   856 0646 77 00                          MOV     @R1,#00
   857 0648 09                             INC     R1
   858 0649 77 00                          MOV     @R1,#00
   859 064B 09                             INC     R1
   860 064C 77 00                          MOV     @R1,#00
   861 064E 09                             INC     R1
   862 064F 77 00                          MOV     @R1,#00
   863 0651 09                             INC     R1
   864 0652 77 00                          MOV     @R1,#00
   865 0654 09                             INC     R1
   866 0655 77 00                          MOV     @R1,#00
   867 0657 09                             INC     R1
```

```
Er Line Addr Object        Type 868 0658 77 0A                          MOV    @R1,#10
   869 065A 09                             INC    R1
   870 065B 77 0B                          MOV    @R1,#11
   871 065D 09                             INC    R1
   872 065E 77 16                          MOV    @R1,#22
   873 0660 09                             INC    R1
   874 0661 77 21                          MOV    @R1,#33
   875 0663 09                             INC    R1
   876 0664 77 2C                          MOV    @R1,#44
   877 0666 09                             INC    R1
   878 0667 77 37                          MOV    @R1,#55
   879 0669 09                             INC    R1
   880 066A 77 42                          MOV    @R1,#66
   881 066C 09                             INC    R1
   882 066D 77 4D                          MOV    @R1,#77
   883 066F 75 07 00                       MOV    STEP,#0
   884 0672 22                             RET
   885
   886 0673 B4 04 06    ..R.   KEYSET      CJNE   A,#4,kysetE
   887 0676 05 07                          INC    STEP
   888 0678 53 07 07                       ANL    STEP,#07h
   889 067B 22                             RET
   890 067C B4 05 06    ..R.   kysetE      CJNE   A,#5,kysetF
   891 067F 15 07                          DEC    STEP
   892 0681 53 07 07                       ANL    STEP,#07h
   893 0684 22                             RET
   894 0685 B4 06 0A    ..R.   kysetF      CJNE   A,#6,kysetG
   895 0688 07                             INC    @R1
   896 0689 E7                             MOV    A,@R1
   897 068A C3                             CLR    C
   898 068B 94 B9                          SUBB   A,#185
   899 068D 40 0F       .R..               JC     kysetH
   900 068F 77 B9                          MOV    @R1,#185
   901 0691 22                             RET
   902 0692 B4 07 09    ..R.   kysetG      CJNE   A,#7,kysetH
   903 0695 17                             DEC    @R1
   904 0696 E7                             MOV    A,@R1
   905 0697 C3                             CLR    C
   906 0698 94 B9                          SUBB   A,#185
   907 069A 40 02       .R..               JC     kysetH
   908 069C 77 00                          MOV    @R1,#0
   909 069E 22                 kysetH      RET
   910
   911 069F 00                 SETUP       NOP
   912 06A0 20 14 0B    .BR.               JB     MD_TEST,SETUPA
   913 06A3 75 22 00                       MOV    MODES,#0
   914 06A6 D2 14       .B..               SETB   MD_TEST
   915 06A8 75 64 4B                       MOV    FLCNT1,#4Bh
   916 06AB 75 65 03                       MOV    FLCNT2,#03h
   917                        SETUPA
   918 06AE E5 90       .D..               MOV    A,P1
```

```
Er Line Addr Object        Type 919 06B0 54 17                              ANL      A,#17h
   920 06B2 C3                                 CLR      C
   921 06B3 94 12                              SUBB     A,#12h
   922 06B5 60 04           .R..               JZ       SETUP1
   923 06B7 C2 14           .B..               CLR      MD_TEST
   924 06B9 01 AD                              AJMP     MAIN
   925 06BB E5 65                   SETUP1     MOV      A,FLCNT2
   926 06BD 45 64                              ORL      A,FLCNT1
   927 06BF 70 22           .R..               JNZ      SETUPEX1
   928 06C1 75 23 00                           MOV      LIGHTS,#0        ; SET LIGHT
   929 06C4 D2 1C           .B..               SETB     LT_TEST
   930 06C6 75 33 00                           MOV      NEWKEY,#0
   931 06C9 C2 7D                              CLR      TXOK
   932 06CB 75 07 00                           MOV      STEP,#0
   933 06CE F1 AD                              ACALL    DSPSET
   934 06D0 F1 13                   SETUPB     ACALL    SUTX
   935 06D2 F1 48                              ACALL    SRECV
   936 06D4 E5 33                              MOV      A,NEWKEY
   937 06D6 75 33 00                           MOV      NEWKEY,#0
   938 06D9 B4 01 09        ..R.               CJNE     A,#STOP_BTN,SETUPA1
   939 06DC 75 22 00                           MOV      MODES,#0
   940 06DF D2 11           .B..               SETB     MD_STOP
   941 06E1 51 E7                   SETUPEX    ACALL    DIGSET
   942 06E3 01 AD                   SETUPEX1   AJMP     MAIN
   943 06E5 D1 73                   SETUPA1    ACALL    KEYSET
   944 06E7 60 E7           .R..               JZ       SETUPB
   945 06E9 F1 AD                              ACALL    DSPSET
   946 06EB C1 D0                              AJMP     SETUPB
   947
   948 06ED E5 46                   SETUPA2    MOV      A,SPCBUF
   949 06EF C3                                 CLR      C
   950 06F0 95 50                              SUBB     A,VALUE
   951 06F2 60 08           .R..               JZ       SETUPA3
   952 06F4 75 60 0C                           MOV      TXCMDBUF,#CMD_FL_SPD
   953 06F7 85 50 61                           MOV      TXDATBUF,VALUE
   954 06FA 80 D4           .R..               SJMP     SETUPB
   955 06FC E5 47                   SETUPA3    MOV      A,CAVBUF
   956 06FE C3                                 CLR      C
   957 06FF 95 51                              SUBB     A,VALUE+1
   958 0701 60 08           .R..               JZ       SETUPC
   959 0703 75 60 0B                           MOV      TXCMDBUF,#CMD_CAL
   960 0706 85 51 61                           MOV      TXDATBUF,VALUE+1
   961 0709 80 C5           .R..               SJMP     SETUPB
   962                              SETUPC
   963 070B 75 60 0A                           MOV      TXCMDBUF,#CMD_SETUP
   964 070E 75 61 33                           MOV      TXDATBUF,#033h
   965 0711 C1 D0                              AJMP     SETUPB
   966
   967 0713 20 7D 01        ..R.   SUTX        JB       TXOK,SUTX0
   968 0716 22                                 RET
   969 0717 C2 7D                   SUTX0      CLR      TXOK
```

```
Er Line Addr Object      Type 970 0719 78 50                        MOV    R0,#VALUE
   971 071B E6                 SUTXLP    MOV    A,@R0
   972 071C 70 05      .R..              JNZ    SUTX1
   973 071E 88 60                        MOV    TXCMDBUF,R0
   974 0720 86 61                        MOV    TXDATBUF,@R0
   975 0722 22                           RET
   976 0723 E8                 SUTX1     MOV    A,R0
   977 0724 24 08                        ADD    A,#8
   978 0726 F8                           MOV    R0,A
   979 0727 86 F0      .D..              MOV    B,@R0
   980 0729 C3                           CLR    C
   981 072A 94 08                        SUBB   A,#8
   982 072C F8                           MOV    R0,A
   983 072D E6                           MOV    A,@R0
   984 072E C3                           CLR    C
   985 072F 95 F0      .D..              SUBB   A,B
   986 0731 60 05      .R..              JZ     SUTX2
   987 0733 88 60                        MOV    TXCMDBUF,R0
   988 0735 86 61                        MOV    TXDATBUF,@R0
   989 0737 22                           RET
   990 0738 08                 SUTX2     INC    R0
   991 0739 E8                           MOV    A,R0
   992 073A C3                           CLR    C
   993 073B 94 58                        SUBB   A,#VALUE+8
   994 073D 40 DC      .R..              JC     SUTXLP
   995 073F 75 60 0A                     MOV    TXCMDBUF,#CMD_SETUP
   996 0742 75 61 00                     MOV    TXDATBUF,#00
   997 0745 F1 AD                        ACALL  DSPSET
   998 0747 22                           RET
   999
  1000                         ;SRECV    MOV    A,RXCMDBUF
  1001                         ;         CJNE   A,#CMD_CAL,SRECV5
  1002                         ;         MOV    CAVBUF,RXDATBUF
  1003                         ;         RET
  1004                         ;SRECV5   CJNE   A,#CMD_FL_SPD,SRECVX
  1005                         ;         MOV    SPCBUF,RXDATBUF
  1006                         ;         RET
  1007                         ;SRECVX   RET
  1008
  1009 0748 30 7E 1C   ..R.    SRECV     JNB    RXOK,SRECVX
  1010 074B C2 7E                        CLR    RXOK
  1011 074D E5 62                        MOV    A,RXCMDBUF
  1012 074F C3                           CLR    C
  1013 0750 94 50                        SUBB   A,#50h
  1014 0752 40 13      .R..              JC     SRECVX
  1015 0754 94 08                        SUBB   A,#08h
  1016 0756 50 0F      .R..              JNC    SRECVX
  1017 0758 A8 62                        MOV    R0,RXCMDBUF
  1018 075A E6                           MOV    A,@R0
  1019 075B 70 04      .R..              JNZ    SRECVA
  1020 075D A6 63                        MOV    @R0,RXDATBUF
```

-89-

```
Er Line Addr Object        Type 1021 075F F1 AD                    ACALL   DSPSET
   1022 0761 E8           SRECVA  MOV     A,R0
   1023 0762 24 08                ADD     A,#8
   1024 0764 F8                   MOV     R0,A
   1025 0765 A6 63                MOV     @R0,RXDATBUF
   1026 0767 22           SRECVX  RET
   1027
   1028
   1029                   PRIME
   1030 0768 C2 95     .B..       CLR     P1.5
   1031 076A 75 60 52             MOV     TXCMDBUF,#52h
   1032 076D 75 61 00             MOV     TXDATBUF,#00
   1033 0770 E5 66        PRIMEB  MOV     A,COM_CNT
   1034 0772 70 02     .R..       JNZ     PRIMEA
   1035 0774 F1 8C                ACALL   ERROR
   1036 0776 30 7E F7  ..R. PRIMEA JNB    RXOK,PRIMEB
   1037 0779 C2 7E                CLR     RXOK
   1038 077B E5 62                MOV     A,RXCMDBUF
   1039 077D B4 52 F0  ..R.       CJNE    A,#52h,PRIMEB
   1040 0780 85 63 52             MOV     52h,RXDATBUF
   1041 0783 C2 7B                CLR     WARNFLG
   1042 0785 75 3C 8F             MOV     DIG_5,#08Fh
   1043 0788 75 4B 8F             MOV     DIG_5A,#08Fh
   1044 078B 22                   RET
   1045
   1046                   ERROR
   1047 078C D2 7B                SETB    WARNFLG
   1048 078E 75 38 00             MOV     DIG_1,#000h
   1049 0791 75 39 01             MOV     DIG_2,#001h
   1050 0794 75 4C 01             MOV     DIG_2A,#001h
   1051 0797 75 3A 0F             MOV     DIG_3,#00Fh
   1052 079A 75 3B 0F             MOV     DIG_4,#00Fh
   1053 079D 75 3C 0B             MOV     DIG_5,#00Bh
   1054 07A0 75 4B 0B             MOV     DIG_5A,#00Bh
   1055 07A3 75 3D 0B             MOV     DIG_6,#00Bh
   1056 07A6 75 3E 0B             MOV     DIG_7,#00Bh
   1057 07A9 75 4F 00             MOV     DIG_8,#000h
   1058 07AC 22                   RET
   1059
   1060                   S LIST
   1061
   1062 07AD E5 07        DSPSET  MOV     A,STEP
   1063 07AF 24 50                ADD     A,#VALUE
   1064 07B1 F9                   MOV     R1,A
   1065 07B2 04                   INC     A
   1066 07B3 C3                   CLR     C
   1067 07B4 94 50                SUBB    A,#VALUE
   1068 07B6 75 3B 8F             MOV     DIG_4,#08Fh
   1069 07B9 75 3A 8F             MOV     DIG_3,#08Fh
   1070 07BC 75 4F 00             MOV     DIG_8,#0h
   1071 07BF 75 F0 0A   .D..      MOV     B,#10
```

```
Er Line Addr Object        Type
   1072 07C2 84                              DIV      AB
   1073 07C3 44 80                           ORL      A,#80h
   1074 07C5 F5 38                           MOV      DIG_1,A
   1075 07C7 E5 F0          .D..             MOV      A,B
   1076 07C9 44 80                           ORL      A,#80h
   1077 07CB F5 39                           MOV      DIG_2,A
   1078 07CD 70 00          .R..             JNZ      DSP57
   1079 07CF E7                     DSP57    MOV      A,@R1
   1080 07D0 75 3C 7F                        MOV      DIG_5,#07Fh
   1081 07D3 05 3C                  DSP57A   INC      DIG_5
   1082 07D5 C3                              CLR      C
   1083 07D6 94 64                           SUBB     A,#100
   1084 07D8 50 F9          .R..             JNC      DSP57A
   1085 07DA 24 64                           ADD      A,#100
   1086 07DC 75 F0 0A       .D..  DSP57G10   MOV      B,#10
   1087 07DF 84                              DIV      AB
   1088 07E0 F5 3D                           MOV      DIG_6,A
   1089 07E2 85 F0 3E       .D..             MOV      DIG_7,B
   1090 07E5 85 39 4C             DSP57X     MOV      DIG_2A,DIG_2
   1091 07E8 85 3C 4B                        MOV      DIG_5A,DIG_5
   1092 07EB 22                              RET
   1093
   1094
   1095
   1096                             KYTABL
   1097 07EC 00 07 02 00                     DB       000h,007h,002h,000h
   1098 07F0 01 00 00 00                     DB       001h,000h,000h,000h  ;00-07
   1099 07F4 09 08 00 00                     DB       009h,008h,000h,000h
   1100 07F8 03 00 00 00                     DB       003h,000h,000h,000h  ;08-0F
   1101 07FC 04 00 00 00                     DB       004h,000h,000h,000h
   1102 0800 00 00 00 00                     DB       000h,000h,000h,000h  ;10-17
   1103 0804 00 00 00 00                     DB       000h,000h,000h,000h
   1104 0808 00 00 00 00                     DB       000h,000h,000h,000h  ;18-1F
   1105 080C 05 00 00 00                     DB       005h,000h,000h,000h
   1106 0810 00 00 00 00                     DB       000h,000h,000h,000h  ;20-27
   1107 0814 00 00 00 00                     DB       000h,000h,000h,000h
   1108 0818 00 00 00 00                     DB       000h,000h,000h,000h  ;28-2F
   1109 081C 00 00 00 00                     DB       000h,000h,000h,000h
   1110 0820 00 00 00 00                     DB       000h,000h,000h,000h  ;30-37
   1111 0824 00 00 00 00                     DB       000h,000h,000h,000h
   1112 0828 00 00 00 00                     DB       000h,000h,000h,000h  ;38-3F
   1113
   1114 082C 06 00 00 00                     DB       006h,000h,000h,000h
   1115 0830 0A 00 00 00                     DB       00Ah,000h,000h,000h  ;40-47
   1116 0834 00 00 00 00                     DB       000h,000h,000h,000h
   1117 0838 0B 00 00 00                     DB       00Bh,000h,000h,000h  ;48-4F
   1118 083C 00 00 00 00                     DB       000h,000h,000h,000h
   1119 0840 00 00 00 00                     DB       000h,000h,000h,000h  ;50-57
   1120 0844 00 00 00 00                     DB       000h,000h,000h,000h
   1121 0848 00 00 00 00                     DB       000h,000h,000h,000h  ;58-5F
   1122 084C 00 00 00 00                     DB       000h,000h,000h,000h
```

```
Er Line Addr Object        Type 1123 0850 00 00 00 00              DB      000h,000h,000h,000h ;60-67
   1124 0854 00 00 00 00              DB      000h,000h,000h,000h
   1125 0858 00 00 00 00              DB      000h,000h,000h,000h ;68-6F
   1126 085C 00 00 00 00              DB      000h,000h,000h,000h
   1127 0860 00 00 00 00              DB      000h,000h,000h,000h ;70-77
   1128 0864 00 00 00 00              DB      000h,000h,000h,000h
   1129 0868 00 00 00 00              DB      000h,000h,000h,000h ;78-7F
   1130
   1131                        ;      Cdn          01
   1132                        ;      START        02
   1133                        ;      STOP         04
   1134                        ;      FLUSH        08
   1135                        ;      Sup          10
   1136                        ;      Sdn          20
   1137                        ;      Cup          40
   1138
   1139                        ;      STOP         04     1
   1140                        ;      START        02     2
   1141                        ;      START/FLUSH  0C     3
   1142                        ;      Sup          10     4
   1143                        ;      Sdn          20     5
   1144                        ;      Cup          40     6
   1145                        ;      Cdn          01     7
   1146                        ;      STOP/Cdn     09     8
   1147                        ;      FLUSH        08     9
   1148                        ;      STOP/Cup     44    10
   1149                        ;      STOP/FLUSH/Cup 4C  11
   1150
   1151
   1152 086C                   AAAAQ   EQU    $               ; Flag for
   1153                                RDEFS program
   1154
   1155 086C                   FINISH
                                       END Assembler Errors =    0
```

-92-

Cross Reference

| Label | Value | Reference | | | | | |
|---|---|---|---|---|---|---|---|
| AAAAQ | C 086C | -1152 | | | | | |
| ALMFLAG | 007C | -4 | 490 | 637 | | | |
| BAR1 | C 050F | 690 | -695 | | | | |
| BAR2 | C 051D | 697 | -702 | | | | |
| BAR3 | C 052B | 702 | -708 | | | | |
| BAR4 | C 0536 | 708 | -713 | | | | |
| BAR5 | C 0541 | 713 | -718 | | | | |
| BAR6 | C 054C | 718 | -723 | | | | |
| BAR7 | C 055A | 723 | -729 | | | | |
| BAR8 | C 0565 | 729 | -734 | | | | |
| BAR9 | C 0570 | 734 | -739 | | | | |
| BARB | C 0500 | 675 | -677 | | | | |
| BARC | C 04FA | 670 | -675 | | | | |
| BARD | C 04ED | 666 | -668 | | | | |
| BARD1 | C 04F5 | 668 | -671 | 678 | | | |
| BARS | 0037 | -4 | 144 | 291 | 325 | 327 | 648 | 677 |
| BARSBUF | 0045 | -4 | 296 | 323 | 324 | | | |
| BARSET | C 04D5 | 147 | 195 | 267 | 480 | -659 | |
| BARX | C 051A | -700 | | | | | |
| BAR_HORN | B 0021 | 116 | 137 | 167 | 205 | 256 | -355 | 655 |
| | | 672 | | | | | |
| | | 691 | 698 | 703 | 709 | 714 | 719 | 724 |
| | | 735 | 740 | | | | |
| BEGIN | C 00A3 | 51 | -110 | | | | |
| BLINK | B 0022 | -356 | | | | | |
| CAVBUF | 0047 | -4 | 221 | 280 | 308 | 311 | 636 | 652 |
| | | 955 | | | | | |
| CAVITY | 0036 | -4 | 127 | 202 | 218 | 224 | 249 | 282 |
| | | 285 | | | | | |
| | | 309 | 311 | 401 | 402 | 406 | 410 | 412 |
| | | 413 | | | | | |
| | | 417 | 421 | 423 | 427 | 461 | 506 | 522 |
| | | 634 | | | | | |
| | | 650 | | | | | |
| CMD_BARS | 0004 | 322 | -345 | | | | |
| CMD_CAL | 000B | -352 | 959 | | | | |
| CMD_CAV | 0001 | 223 | 284 | 307 | -342 | | |
| CMD_ERRS | 0003 | -344 | | | | | |
| CMD_FLUSH | 0007 | 197 | -348 | | | | |
| CMD_FL_SPD | 000C | -353 | 952 | | | | |
| CMD_IDLE | 0005 | 235 | -346 | | | | |
| CMD_MODE | 0008 | -349 | | | | | |
| CMD_SETUP | 000A | -351 | 963 | 995 | | | |
| CMD_SPC | 0002 | 214 | 277 | 314 | -343 | | |
| CMD_START | 0009 | 290 | -350 | | | | |
| CMD_STOP | 0006 | 140 | 143 | -347 | | | |
| COM_CNT | 0066 | -4 | 121 | 124 | 608 | 776 | 778 | 1033 |
| DEC_CAV | C 02A9 | 384 | -401 | | | | |
| DEC_SPC | C 028B | 380 | -387 | | | | |
| DIG14A | C 02FA | 434 | -439 | | | | |
| DIG14B | C 0309 | 440 | -446 | | | | |

-93-

| Symbol | Addr | | | | | | |
|---|---|---|---|---|---|---|---|
| DIG14C | C 0314 | 447 | -450 | | | | |
| DIG14X | C 031A | 438 | 445 | 449 | -452 | | |
| DIG57 | C 032E | 459 | -461 | | | | |
| DIG57A | C 0333 | -463 | 466 | | | | |
| DIG57G10 | C 0342 | 468 | -470 | | | | |
| DIG57X | C 0357 | 475 | 477 | -479 | | | |
| DIGSET | C 02E7 | 312 | 320 | 328 | 399 | 429 | -431 513 |
| | | 523 | | | | | |
| | | 941 | | | | | |
| DIGSG2 | C 02E9 | -432 | | | | | |
| DIG_1 | 0038 | -4 | 457 | 460 | 660 | 720 | 725 786 |
| | | | 1048 | | | | |
| | | | 1074 | | | | |
| DIG_2 | 0039 | -4 | 458 | 484 | 661 | 726 | 731 736 |
| | | | 739 | | | | |
| | | | 1049 | 1077 | 1090 | | |
| DIG_2A | 004C | -4 | 484 | 487 | 788 | 1050 | 1090 |
| DIG_3 | 003A | -4 | 437 | 444 | 448 | 451 | 662 715 |
| | | | 791 | | | | |
| | | | 1051 | 1069 | | | |
| DIG_4 | 003B | -4 | 433 | 439 | 446 | 450 | 663 704 |
| | | | 710 | | | | |
| | | | 793 | 1052 | 1068 | | |
| DIG_5 | 003C | -4 | 177 | 462 | 463 | 468 | 469 476 |
| | | | 485 | | | | |
| | | 645 | 664 | 692 | 699 | 705 | 1042 1053 |
| | | | 1080 | | | | |
| | | | 1081 | 1091 | | | |
| DIG_5A | 004B | -4 | 178 | 485 | 488 | 646 | 795 1043 |
| | | | 1054 | | | | |
| | | | 1091 | | | | |
| DIG_6 | 003D | -4 | 180 | 472 | 474 | 478 | 669 798 |
| | | | 1055 | | | | |
| | | | 1088 | | | | |
| DIG_7 | 003E | -4 | 186 | 473 | 665 | 676 | 696 800 |
| | | | 1056 | | | | |
| | | | 1089 | | | | |
| DIG_8 | 004F | -4 | 667 | 802 | 1057 | 1070 | |
| DIG_PTR | 0020 | -4 | 432 | 434 | 435 | 440 | 441 447 |
| | | | 452 | | | | |
| DISCNT | 0030 | -4 | 749 | 756 | 772 | | |
| DSP57 | C 07CF | 1078 | -1079 | | | | |
| DSP57A | C 07D3 | -1081 | 1084 | | | | |
| DSP57G10 | C 07DC | -1086 | | | | | |
| DSP57X | C 07E5 | -1090 | | | | | |
| DSPSET | C 07AD | 933 | 945 | 997 | 1021 | -1062 | |
| D_C1 | C 02B7 | 405 | -408 | | | | |
| D_S | C 0291 | 388 | -390 | | | | |
| ERROR | C 078C | 123 | 1035 | -1046 | | | |
| ERRS | 0042 | -4 | | | | | |
| ERR_OPEN | 0002 | -370 | | | | | |
| ERR_RUNAWAY | 0004 | -372 | | | | | |
| ERR_SHORT | 0003 | -371 | | | | | |
| ERR_STUCK | 0001 | -369 | | | | | |
| FINISH | C 086C | -1154 | | | | | |
| FLASH | C 035B | 129 | -483 | | | | |
| FLASH1 | C 036C | 186 | -489 | | | | |
| FLASH2 | C 0372 | 190 | -492 | | | | |
| FLCNT1 | 0064 | -4 | 173 | 181 | 189 | 269 | 761 763 |
| | | | 767 | | | | |
| | | 915 | 926 | | | | |
| FLCNT2 | 0065 | -4 | 174 | 176 | 187 | 236 | 247 248 |
| | | | 270 | | | | |
| | | 301 | 302 | 762 | 768 | 770 | 916 925 |
| FLUSH_KEY | B 00B4 | -336 | | | | | |

-94-

| | | | | | | | | |
|---|---|---|---|---|---|---|---|---|
| INC_CAV | C | 02C0 | 382 | -412 | | | | |
| INC_SPC | C | 028F | 378 | -389 | | | | |
| INIT | C | 0461 | 114 | -613 | | | | |
| INT1V | C | 0013 | -24 | | | | | |
| I_C1 | C | 02CE | 416 | -419 | | | | |
| I_C8 | C | 02D7 | 409 | 420 | -423 | | | |
| I_C9 | C | 02DE | 424 | -426 | | | | |
| I_CX | C | 02E3 | 407 | 411 | 418 | 422 | 425 | 426 | -428 |
| I_S2 | C | 0296 | 391 | -392 | | | | |
| I_S3 | C | 029D | 392 | -395 | | | | |
| I_S4 | C | 02A0 | 395 | -396 | | | | |
| I_SX | C | 02A5 | 394 | 396 | -398 | | | |
| KEYACT | C | 026F | 133 | -374 | | | | |
| KEYFND | C | 061A | 817 | -832 | | | | |
| KEYSET | C | 0673 | -886 | 943 | | | | |
| KEYTEMP | | 004D | -4 | 808 | 812 | 816 | 833 | |
| KEYUPCNT | | 0032 | -4 | 629 | 818 | 820 | 832 | |
| KEYX | C | 060B | 822 | -825 | 839 | 841 | 847 | 849 |
| KEYX2 | C | 0639 | 838 | -848 | | | | |
| KYACTE | C | 027B | 377 | -379 | | | | |
| KYACTF | C | 0280 | 379 | -381 | | | | |
| KYACTG | C | 0285 | 381 | -383 | | | | |
| KYACTX | C | 028A | 375 | 383 | -385 | | | |
| KYSETE | C | 067C | 886 | -890 | | | | |
| KYSETF | C | 0685 | 890 | -894 | | | | |
| KYSETG | C | 0692 | 894 | -902 | | | | |
| KYSETH | C | 069E | 899 | 902 | 907 | -909 | | |
| KYTABL | C | 07EC | 814 | -1096 | | | | |
| LIGHTS | | 0023 | -4 | 145 | 193 | 265 | 363 | 364 | 365 |
| | | | 366 | | | | | |
| | | | 367 | 928 | | | | |
| LOOP | C | 005A | -60 | 72 | | | | |
| LT_FLUSH | B | 001B | 194 | -365 | 666 | | | |
| LT_IDLE | B | 001D | -367 | | | | | |
| LT_RUN | B | 001A | 266 | -364 | 675 | | | |
| LT_STOP | B | 0019 | 146 | -363 | 668 | | | |
| LT_TEST | B | 001C | -366 | 929 | | | | |
| MAIN | C | 00AD | -116 | 143 | 240 | 657 | 924 | 942 |
| MAIN1 | C | 00D1 | -134 | | | | | |
| MAIN1A | C | 00DD | 134 | -139 | | | | |
| MAIN2 | C | 0107 | 139 | -155 | | | | |
| MAIN2A | C | 0110 | 155 | -158 | | | | |
| MAIN3 | C | 0116 | 158 | -160 | | | | |
| MAIN3A | C | 012F | 170 | -175 | | | | |
| MAIN3A1 | C | 0159 | 190 | -196 | | | | |
| MAIN3B | C | 0162 | 166 | -201 | | | | |
| MAIN4 | C | 0171 | 201 | -208 | | | | |
| MAIN5 | C | 0182 | 213 | -217 | | | | |
| MAIN5A | C | 017A | 210 | -214 | | | | |
| MAIN6 | C | 0193 | 222 | -226 | | | | |
| MAIN6A | C | 018B | 219 | -223 | | | | |
| MAIN7 | C | 019C | 229 | -231 | | | | |
| MAIN8 | C | 00CF | 131 | -133 | | | | |

```
MAINA          C 00B4    116  -119
MAINB          C 00B6    118  -121
MAINB1         C 00BC   -124   125
MAINC          C 00C6    122  -128
MAINX          C 01B0    188   192   200   206   216   225   234
                               239
                         -240  261   279   286   292
MD_FLUSH       B 0013    170   172   201  -360
MD_IDLE        B 0015    150   238   255  -362
MD_RUN         B 0012    158   243   264   272   289   295  -359
MD_STOP        B 0011    136   139   204   259  -358   654   940
MD_TEST        B 0014    131  -361   912   914   923
MODE             0043     -4
MODEBUF          0044     -4
MODES            0022     -4   113   135   149   171   203   237
                               258
                         288   331   358   359   360   361   362
                               653
                         913   939
NEWKEY           0033     -4   156   374   376   631   848   930
                               936
                         937
OKEY             004E     -4   632   823   833   844   848
PRIME          C 0768    656 -1029
PRIMEA         C 0776   1034 -1036
PRIMEB         C 0770  -1033  1036  1039
RECV           C 0222    130  -295
RECV5          C 024C    307  -314
RECV6          C 025D    314  -322
RECV7          C 0269    325  -327
RECVA          C 0234    295   297  -303
RECVX          C 0268    304   310   317   322  -326
RESUME         C 004D    -53
RSTART1        C 0030      9   -40
RTIX           C 00A2     14    24  -106
RX             C 0096     53    56    60   -99   101
RXCMDBUF         0062     -4   142   151   306   593   603  1011
                              1017
                         1038
RXDATBUF         0063     -4   152   308   315   323   597   604
                              1020
                         1025  1040
RXINT          C 0422    543  -582
RXINT1         C 0434    585  -591
RXINT2         C 043E    592  -596
RXINT3         C 0447    596  -600
RXINT4         C 045D    600  -610
RXINTX         C 042D   -587   595   599   606   609   611
RXOK             007E     -4   304   305   607  1009  1010  1036
                              1037
RXOKT            007F     -4   755
SCANCNT          0031     -4   630   824   834   835   843
SECCNT           0021     -4   486   773   774   780
SECCNTR          0034     -4   495   514   516   748
SECS             0040     -4
SECS1            0041     -4
SERINT         C 03D4     33  -542
SERINTS        C 0023    -33
SETUP          C 069F    132   230  -911
```

-96-

| Symbol | Type | Addr | Col1 | Col2 | Col3 | Col4 | Col5 | Col6 |
|---|---|---|---|---|---|---|---|---|
| SETUP1 | C | 06BB | 922 | -925 | | | | |
| SETUPA | C | 06AE | 912 | -917 | | | | |
| SETUPA1 | C | 06E5 | 938 | -943 | | | | |
| SETUPA2 | C | 06ED | -948 | | | | | |
| SETUPA3 | C | 06FC | 951 | -955 | | | | |
| SETUPB | C | 06D0 | -934 | 944 | 946 | 954 | 961 | 965 |
| SETUPC | C | 070B | 958 | -962 | | | | |
| SETUPEX | C | 06E1 | -941 | | | | | |
| SETUPEX1 | C | 06E3 | 927 | -942 | | | | |
| SHWTBL | C | 03AC | 496 | -526 | | | | |
| SPACE | | 0035 | -4 | 126 | 209 | 215 | 253 | 260 | 275 |
| | | | | 278 | | | | |
| | | | 316 | 318 | 387 | 389 | 390 | 393 | 397 |
| | | | | 431 | | | | |
| | | | 432 | 511 | 521 | 633 | 649 | |
| SPCBUF | | 0046 | -4 | 212 | 273 | 315 | 318 | 635 | 651 |
| | | | | 948 | | | | |
| SRECV | C | 0748 | 935 | -1009 | | | | |
| SRECVA | C | 0761 | 1019 | -1022 | | | | |
| SRECVX | C | 0767 | 1009 | 1014 | 1016 | -1026 | | |
| START | C | 01B3 | 157 | 159 | -242 | | | |
| START1 | C | 01DE | 243 | 255 | -262 | | | |
| START1A | C | 01EE | 264 | -268 | | | | |
| START2 | C | 0205 | 276 | -280 | | | | |
| START3 | C | 0214 | 283 | -287 | | | | |
| STARTEX | C | 01CF | 252 | 254 | -256 | 262 | 263 | 271 |
| STARTUP | C | 0373 | -495 | 647 | | | | |
| START_KEY | B | 00B2 | -334 | | | | | |
| STEP | | 0007 | -4 | 883 | 887 | 888 | 891 | 892 | 932 |
| | | | | 1062 | | | | |
| STINI | C | 063E | 112 | -851 | | | | |
| STLPD | C | 0394 | -514 | 515 | | | | |
| STOP | B | 0011 | -331 | | | | | |
| STOP_BTN | | 0001 | 134 | -332 | 938 | | | |
| STOP_KEY | B | 00B3 | -335 | | | | | |
| STPLP1 | C | 037C | -498 | 520 | | | | |
| SUTX | C | 0713 | 934 | -967 | | | | |
| SUTX0 | C | 0717 | 967 | -969 | | | | |
| SUTX1 | C | 0723 | 972 | -976 | | | | |
| SUTX2 | C | 0738 | 986 | -990 | | | | |
| SUTXLP | C | 071B | -971 | 994 | | | | |
| TEMP1 | | 0048 | -4 | 497 | 498 | 502 | 503 | 507 | 508 |
| | | | | 512 | | | | |
| | | | | 517 | | | | |
| TEMP2 | | 0049 | -4 | | | | | |
| TEMP3 | | 004A | -4 | 501 | | | | |
| TEST | | 0002 | -108 | | | | | |
| TIM0X | C | 05BD | 777 | -779 | | | | |
| TIM1A | C | 05C7 | 779 | 780 | -783 | | | |
| TIM1B | C | 05C9 | 782 | -784 | | | | |
| TIM3 | C | 05E5 | 774 | -805 | | | | |
| TMR0A | C | 0594 | 750 | -758 | | | | |
| TMR0B | C | 0597 | 758 | -759 | | | | |
| TMR0C | C | 059A | 759 | -760 | | | | |
| TMR0D | C | 05AD | 763 | -771 | | | | |
| TMR0V | C | 000B | -19 | | | | | |
| TMR0_INT | C | 0578 | 19 | -744 | | | | |

-97-

| Symbol | Addr | | | | | | | |
|---|---|---|---|---|---|---|---|---|
| TX | C 008E | 55 | 58 | 74 | 78 | 81 | 83 | 87 |
| | | | 90 | | | | | |
| TXCMDBUF | 0060 | -94 | 94 | | | | | |
| | | -4 | 140 | 153 | 197 | 214 | 223 | 235 |
| | | | 277 | | | | | |
| | | 284 | 290 | 556 | 565 | 627 | 952 | 959 |
| | | | 963 | | | | | |
| | | 973 | 987 | 995 | 1031 | | | |
| TXDATBUF | 0061 | -4 | 141 | 154 | 198 | 215 | 224 | 236 |
| | | | 278 | | | | | |
| | | 285 | 291 | 560 | 566 | 628 | 953 | 960 |
| | | | 964 | | | | | |
| | | 974 | 988 | 996 | 1032 | | | |
| TXINT | C 03DB | 542 | -545 | | | | | |
| TXINT1 | C 0402 | 559 | -563 | | | | | |
| TXINT2 | C 03F9 | 555 | -559 | | | | | |
| TXINT3 | C 03F0 | 549 | -555 | | | | | |
| TXINT4 | C 03E7 | -551 | 551 | | | | | |
| TXINTX | C 0414 | 548 | 563 | -574 | | | | |
| TXINTX1 | C 0416 | -575 | 575 | | | | | |
| TXINTX2 | C 041B | 554 | 558 | 562 | 573 | -577 | | |
| TXOK | 007D | -4 | 572 | 931 | 967 | 969 | | |
| VALUE | 0050 | -4 | 851 | 950 | 953 | 957 | 960 | 970 |
| | | | 993 | | | | | |
| | | 1063 | 1067 | | | | | |
| WARNFLG | 007B | -4 | 138 | 168 | 257 | 638 | 779 | 1041 |
| | | | 1047 | | | | | |
| WARNS | 0024 | -4 | 355 | 356 | | | | |

Many other objects, features and advantages of the invention will be more fully realized and understood from the foregoing detailed description when taken in conjunction with the accompanying drawings wherein like reference numerals throughout the various drawings are intended to designate similar elements and components.

The invention is claimed as follows:

1. A control system for a mobile planting permitting discrete plant spacing to be determined and maintained independent of any wheel rotation on said planting apparatus or any towing apparatus, comprising;
    (A) a ground speed sensor wherein the rate of movement relative to the ground is determined independent of wheel rotation of said planting apparatus or of wheel rotation of any towing apparatus, wherein said ground speed sensor is a Doppler effect radar;
    (B) an input display device for inputting desired linear planting spacing;
    (C) a variation speed motor for mechanically driving seed metering devices on said planting apparatus at varying rates independent of any wheel rotation of said planting apparatus or of said towing apparatus, wherein said variable speed motor is capable of changing speeds directly or indirectly in response to an electronic signal; and
    (D) a programmable control circuit which communicates electronically with said input/display device, and with said ground speed sensor, wherein said programmable control circuit:
        (i) determines the discrete number of seeds to be dispensed by said seed metering devices per linear unit of distance traveled by said planting apparatus based upon the desired linear plant spacing received from the input/display device;
        (ii) determines directly or indirectly the number of units of distance traveled by the planting apparatus based upon electronic communications received form said ground speed sensor; and
        (iii) determines the rate at which said variable speed motor should operate in order to cause said seed metering devices to dispense seeds to achieve said desired linear plant spacing per linear unit of distance traveled by said planting apparatus, and further determines and sends an electronic signal in order to directly or indirectly cause the rate of said variable speed motor to vary in order to correspond to said determined rate at which said variable speed motor is to operate in order to cause said seed metering devices to dispense seeds in order to achieve said desired linear planting spacing; wherein, interposed between said ground speed sensor and said programmable control circuit, and in electronic communication with both, is a signal conditioning circuit.

2. The control system for a mobile planting apparatus of claim 1 wherein said signal conditioning circuit is capable of refining said electronic communications from said ground speed sensor such that ground speed may be accurately determined to within 0.01 miles per hour or less based upon the aforesaid refined electronic communications from said ground speed sensor and said signal conditioning circuit.

3. The control system for a mobile planting apparatus of claim 1 wherein said input/display device is capable of being operated while said planting apparatus is in motion, permitting linear plant spacing to be varied while said planting apparatus is in motion.

4. The control system for a mobile planting apparatus of claim 3 further comprising an active speed sensor for sensing directly or indirectly the rate at which said variable speed motor is operating to cause said seed metering devices to dispense seeds, and which communicates electronically with said programmable control circuit, wherein said programmable control circuit further determines whether the electronic signal from the active speed sensor indicates whether the rate at which said variable speed motor is operating to cause said seed metering devices to dispense seeds corresponds to said determined rate at which said variable speed motor is to operate in order to achieve said desired linear plant spacing, and, if not, sends an electronic signal in order to directly or indirectly cause the rate of operation of said variable speed motor to vary in order to correspond to said determined rate at which said variable speed motor is to operate in order to achieve said desired linear plant spacing.

5. The control system for a mobile planting apparatus of claim 4 wherein said variable speed motor is a hydraulic motor.

6. The control system for a mobile planting apparatus of claim 5 further comprising a hydraulic motor circuit, said hydraulic motor circuit comprising:
    (A) a hydraulic pump;
    (B) the aforesaid hydraulic motor;
    (C) a hydraulic proportional valve interposed between said hydraulic pump and said hydraulic motor, and in hydraulic communication with both, said hydraulic proportional valve being in electronic communication with said programmable control circuit and responsive thereto, wherein said hydraulic proportional valve is designed to proportionally open, close, or maintain its then-current hydraulic valve opening in response to said electronic communications from said programmable control circuit to said hydraulic proportional valve.

7. The control system for a mobile planting apparatus of claim 6 wherein said hydraulic motor circuit further comprises a safety valve interposed between said hydraulic pump and said hydraulic motor, said hydraulic safety valve being in electronic communication with said programmable control circuit and responsive thereto, wherein said hydraulic safety valve opens to allow hydraulic fluid to pass therethrough in response to an electronic signal from said programmable control circuit when said programmable control circuit determines that said planting apparatus is moving in a positive direction relative to the ground as a result of electronic communications from said ground speed sensor, and said hydraulic safety valve closes in response to an electronic signal from said programmable control circuit when said programmable control circuit determines that said planting apparatus is not moving in a positive direction relative to the ground as a result of electronic communications from said ground speed sensor.

8. The control system for a mobile planting apparatus of claim 7 wherein said hydraulic motor circuit further comprises hydraulic communications capable of returning hydraulic fluid directly or indirectly to the hydraulic pump, wherein said hydraulic fluid to be returned to said hydraulic pump is hydraulic fluid:
    (A) which has passed through said hydraulic motor; or
    (B) which has not passed through said hydraulic safety valve as a result of said hydraulic safety valve being closed; or
    (C) which has not passed through said hydraulic proportional valve as a result of said hydraulic proportional valve being partially or fully closed.

9. The control system for a mobile planting apparatus of claim 8 wherein said signal conditioning circuit further comprises a phase-locked loop including a voltage controlled oscillator.

10. The control system for a mobile planting apparatus of claim 9 wherein said signal conditioning circuit further comprises electronic communications for preventing the operating frequency of the voltage controlled oscillator from migrating in the event that the electronic communications from the ground speed sensor intermittently fade or disappear.

11. The control system for a mobile planting apparatus of claim 10 wherein said signal conditioning circuit further comprises:

(A) an electronic signal squaring circuit and a phase detector circuit in electronic communication with said ground speed sensor; and (B) a positive and a negative signal magnitude threshold comparator circuit, with the electronic outputs of both threshold comparator circuits combined to gate the outputs to a loop filter circuit when the absolute value of the electronic signal so conditioned is above a predetermined level, and in electronic communication with said voltage controlled oscillator via said loop filter circuit, and wherein said loop filter circuit controls the frequency of the electronic signal of the aforesaid voltage controlled oscillator.

12. The control system for a mobile planting apparatus of claim 11 wherein said ground speed sensor is mounted on said planting apparatus.

13. The control system for a mobile planting apparatus of claim 11 wherein said ground speed sensor is mounted on said towing apparatus.

14. The control system for a mobile planting apparatus of claim 11 wherein said input/display device further comprises inputs for inputting the number of seeds planted per rotation of said seed metering devices, and wherein that input is electronically communicated to said programmable control circuit.

15. The control system for a mobile planting apparatus of claim 14 wherein said input/display device further comprises a display that shows the desired linear plant spacing.

16. The control system for a mobile planting apparatus of claim 15 wherein said input/display device further comprises a display that shows the number of seeds to be planted per rotation of said seed metering devices.

17. A mobile planting apparatus for planting discrete number of seeds per unit of distance traveled independent of any wheel rotation of said planting apparatus, or of any towing apparatus, comprising:

(A) a frame;

(B) one or more seed dispensers mounted on said frame, wherein said seed dispensers further comprise seed metering devices;

(C) a ground speed sensor wherein ground speed is determined independent of any wheel rotation of said planting apparatus or of any wheel rotation of any towing apparatus, wherein said ground speed sensor is a Doppler effect radar;

(D) a variable speed motor mechanically connected to said seed dispensers, and capable of driving said seed metering devices at varying rates, wherein, as the motor drives the seed metering devices at faster rate, the discrete number of seeds dispensed by the seed metering devices per unit of time is increased, and wherein said variable speed motor changes speeds directly or indirectly in response to an electronic signal;

(E) an input/display device for inputting desired linear plant spacing;

(F) a programmable control circuit which communicates electronically with said input/display device, and said ground speed sensor, wherein said programmable control circuit:

(i) determines the discrete number of seeds to be dispensed by said seed metering devices per linear unit of distance traveled by said planting apparatus based upon the desired linear planting spacing electronic communication received from the input/display device;

(ii) determines directly or indirectly the number of units of distance traveled by the planting apparatus based upon electronic communication received from said ground speed sensor; and (iii) determiners the rate at which said variable speed motor should operate in order to cause said seed metering devices to dispense seeds in order to achieve said desired linear plant spacing per linear unit of distance traveled by said planting apparatus, and further determines and sends an electronic signal in order to directly or indirectly cause the rate of said variable speed motor to vary in order to correspond to said determined rate at which said variable speed motor is to operate in order to cause said seed metering devices to dispense seeds in order to achieve said desired linear plant spacing; wherein, interposed between said ground speed sensor and said programmable control circuit, and in electronic communication with both, is a signal conditioning circuit.

18. The mobile planting apparatus of claim 17 further comprising an active speed sensor for sensing directly or indirectly the rate at which said variable speed motor is operating to cause said seed metering devices to dispense seeds, and which communicates electronically with said programmable control circuit, wherein said programmable control circuit further determines whether the electronic signal from the active speed sensor indicates whether the rate at which said variable speed motor is operating to cause said seed metering devices to dispense seeds corresponds to said determined rate at which said variable speed motor is to operate in order to achieve said desired linear plant spacing, and, if not, sends an electronic signal in order to directly or indirectly cause the rate of operation of said variable speed motor to vary in order to correspond to said determined rate at which said variable speed motor is to operate in order to achieve said desired linear plant spacing.

19. The mobile planting apparatus of claim 18 wherein said variable speed motor is a hydraulic motor, and wherein said mobile planting apparatus further comprises a hydraulic motor circuit, said hydraulic motor circuit comprising:

(A) a hydraulic pump;

(B) the aforesaid hydraulic motor;

(C) a hydraulic proportional valve interposed between said hydraulic pump and said hydraulic motor, and in hydraulic communication with both, said hydraulic proportional valve being in electronic communication with said programmable control circuit and responsive thereto, wherein said hydraulic proportional valve is designed to proportionally open, close, or maintain its then-current hydraulic valve opening in response to said electronic communications from said programmable control circuit to said hydraulic proportional valve.

20. The control system for a mobile planting apparatus of claim 19 wherein said hydraulic motor circuit further comprises a safety valve interposed between said hydraulic pump and said hydraulic motor, said hydraulic safety valve being in electronic communication with said programmable control circuit and responsive thereto, wherein said hydraulic safety valve opens to allow hydraulic fluid to pass therethrough in response to an electronic signal from said programmable control circuit when said programmable control circuit determines that said planting apparatus is moving in a positive direction relative to the ground as a result of electronic communication from said ground speed sensor, and said hydraulic safety valve closes in response to an electronic signal from said programmable control circuit when said programmable control circuit determines that said planting apparatus is not moving in a positive direction relative to the ground as a result of electronic communications from said ground speed sensor.

21. The mobile planting apparatus of claim 20 wherein said signal conditioning circuit further comprises a phase-locked loop including a voltage controlled oscillator.

22. The mobile planting apparatus of claim 21 wherein said signal conditioning circuit further comprises electronic communications for preventing the operating frequency of the voltage controlled oscillator from migrating in the event that the electronic communications from the ground speed sensor intermittently fade or disappear.

23. The mobile planting apparatus of claim 22 wherein said signal conditioning circuit further comprises:

(A) an electronic signal squaring circuit and a phase detector circuit in electronic communication with said ground speed sensor; and (B) a positive and a negative signal magnitude threshold comparator circuit, with the electronic outputs of both threshold comparator circuits combined to gate the outputs to a loop filter circuit when the absolute value of the electronic signal so conditioned is above a predetermined level, and in electronic communication with said voltage controlled oscillator via said loop filter circuit, and wherein said loop filter controls the frequency of the electronic signal of the aforesaid voltage controlled oscillator.

24. The mobile planting apparatus of claim 23 wherein said input/display device further comprises:

(A) inputs for inputting the number of seeds planted per rotation of said seed metering devices;

(B) a display which shows the desired linear plant spacing; and (C) a display which shows the number of seeds to be planted per rotation of said seed metering devices.

25. The mobile planting apparatus of claim 24 wherein said input/display device permits the desired plant spacing to be changed while the planting apparatus is in motion.

* * * * *

UNITED STATES PATENT AND TRADEMARK OFFICE
CERTIFICATE OF CORRECTION

PATENT NO. : 5,598,794
DATED : February 4, 1997
INVENTOR(S) : Louis C. Harms and Richard Rosenbrock
ASSIGNEE: Fluid Power Industries, Inc.

It is certified that error appears in the above-indentified patent and that said Letters Patent is hereby corrected as shown below:

In Claim 1, column 129, line 8, please insert the word "apparatus" between the words "planting" and "permitting".

In Claim 1(B), column 129, line 17, please insert a "/" between the words "input" and "display".

In Claim 17, column 131, line 47, please insert the word "a" between the words "planting" and "discrete".

Signed and Sealed this

Twenty-ninth Day of April, 1997

Attest:

BRUCE LEHMAN

Attesting Officer

Commissioner of Patents and Trademarks